(12) United States Patent
Jeon et al.

(10) Patent No.: US 10,734,941 B2
(45) Date of Patent: Aug. 4, 2020

(54) COMPACT, SELF-DEPLOYING STRUCTURES AND METHODS FOR DEPLOYING FOLDABLE, STRUCTURAL ORIGAMI ARRAYS USING A COMPRESSION COLUMN

(71) Applicants: Sungeun K. Jeon, Albuquerque, NM (US); Joseph N. Footdale, Albuquerque, NM (US)

(72) Inventors: Sungeun K. Jeon, Albuquerque, NM (US); Joseph N. Footdale, Albuquerque, NM (US)

(73) Assignee: LOADPATH, Albuquerque, NM (US)

( * ) Notice: Subject to any disclaimer, the term of this patent is extended or adjusted under 35 U.S.C. 154(b) by 63 days.

(21) Appl. No.: 16/147,729

(22) Filed: Sep. 29, 2018

(65) Prior Publication Data

US 2019/0044475 A1    Feb. 7, 2019

Related U.S. Application Data

(62) Division of application No. 15/466,731, filed on Mar. 22, 2017, now abandoned.

(51) Int. Cl.
*H02S 30/20* (2014.01)
*F16M 11/20* (2006.01)
*F16M 11/38* (2006.01)

(52) U.S. Cl.
CPC ......... *H02S 30/20* (2014.12); *F16M 11/2085* (2013.01); *F16M 11/38* (2013.01); *F16M 2200/065* (2013.01)

(58) Field of Classification Search
None
See application file for complete search history.

(56) References Cited

U.S. PATENT DOCUMENTS

| | | | | |
|---|---|---|---|---|
| 5,131,955 A | * | 7/1992 | Stern | B64G 1/443 136/245 |
| 5,865,904 A | * | 2/1999 | Tanda | H01L 25/042 136/244 |
| 6,288,326 B1 | * | 9/2001 | Hayashi | B32B 17/10009 136/244 |
| 2003/0164186 A1 | * | 9/2003 | Clark | B64G 1/44 136/245 |
| 2008/0163921 A1 | * | 7/2008 | Leong | H01L 31/0547 136/246 |

(Continued)

FOREIGN PATENT DOCUMENTS

JP    2003309279 A  * 10/2003  ............. H02S 30/20

*Primary Examiner* — Eli S Mekhlin
(74) *Attorney, Agent, or Firm* — Robert D. Watson

(57) ABSTRACT

The Structural Origami ARray (SOAR) concept is an extremely high performance, deployable solar array system that delivers high power output and exceeds state-of-the-art packaging efficiencies. Unlike existing Z-folding panels or rolled architectures, this approach utilizes an origami-inspired two-dimensional packaging scheme of a flexible blanket/substrate that is coupled with a simple and compact deployable supporting structure that stabilizes the array by external tension or internal support. This enables large deployed areas populated with high efficiency photovoltaic (PV) cells or antenna elements, which compactly stows in a square form factor with thin stack height that minimizes impingement on spacecraft bus internal volume.

30 Claims, 78 Drawing Sheets

(56) References Cited

U.S. PATENT DOCUMENTS

| | | | |
|---|---|---|---|
| 2008/0223431 A1* | 9/2008 | Chu | H02S 30/20 |
| | | | 136/245 |
| 2011/0221203 A1* | 9/2011 | Miller | F03D 9/11 |
| | | | 290/55 |

* cited by examiner

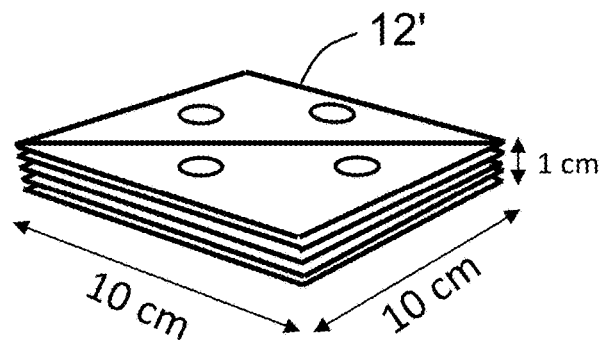
FIG. 1
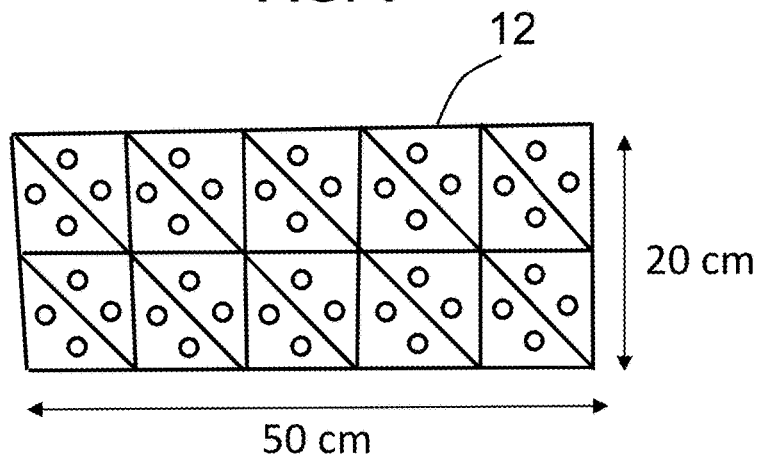
FIG. 2
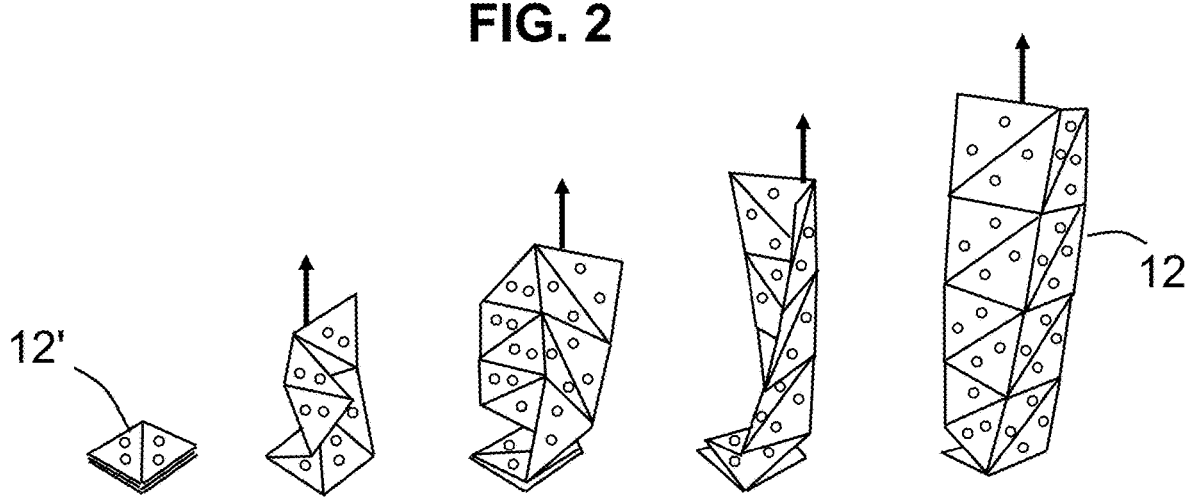
FIG. 3  FIG. 4  FIG. 5  FIG. 6  FIG. 7

N=1

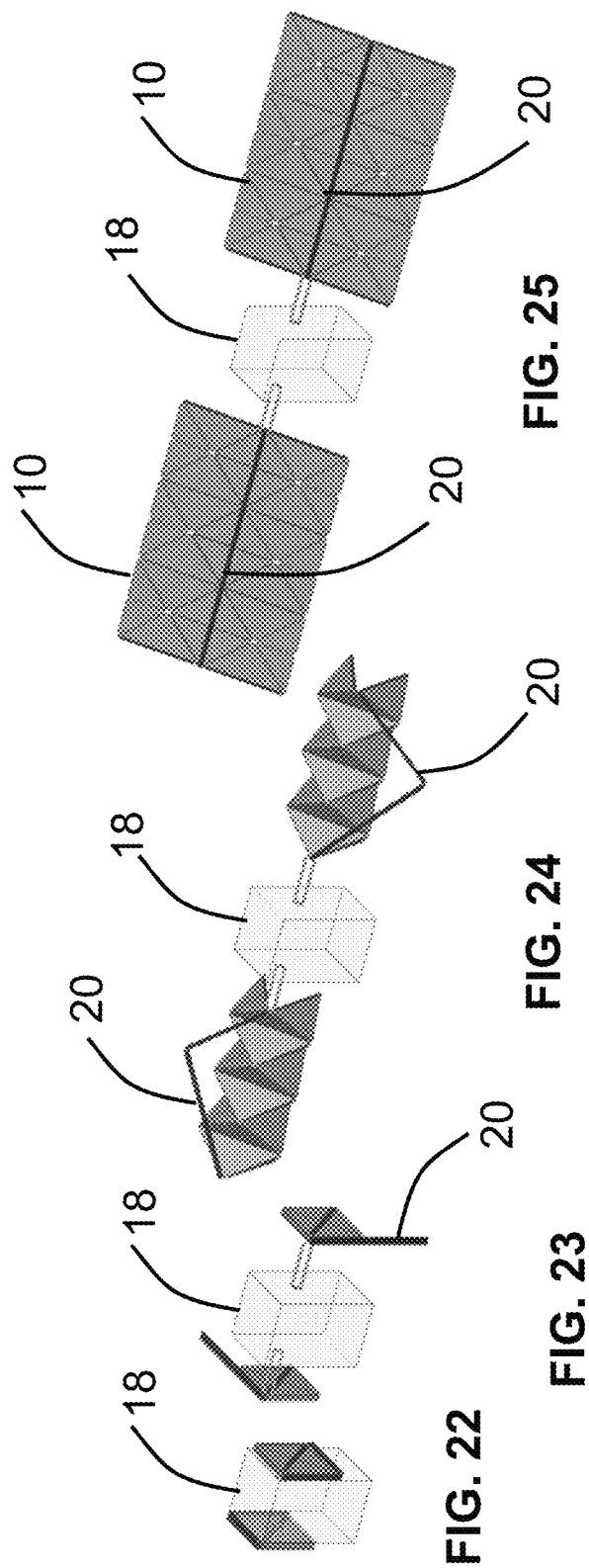

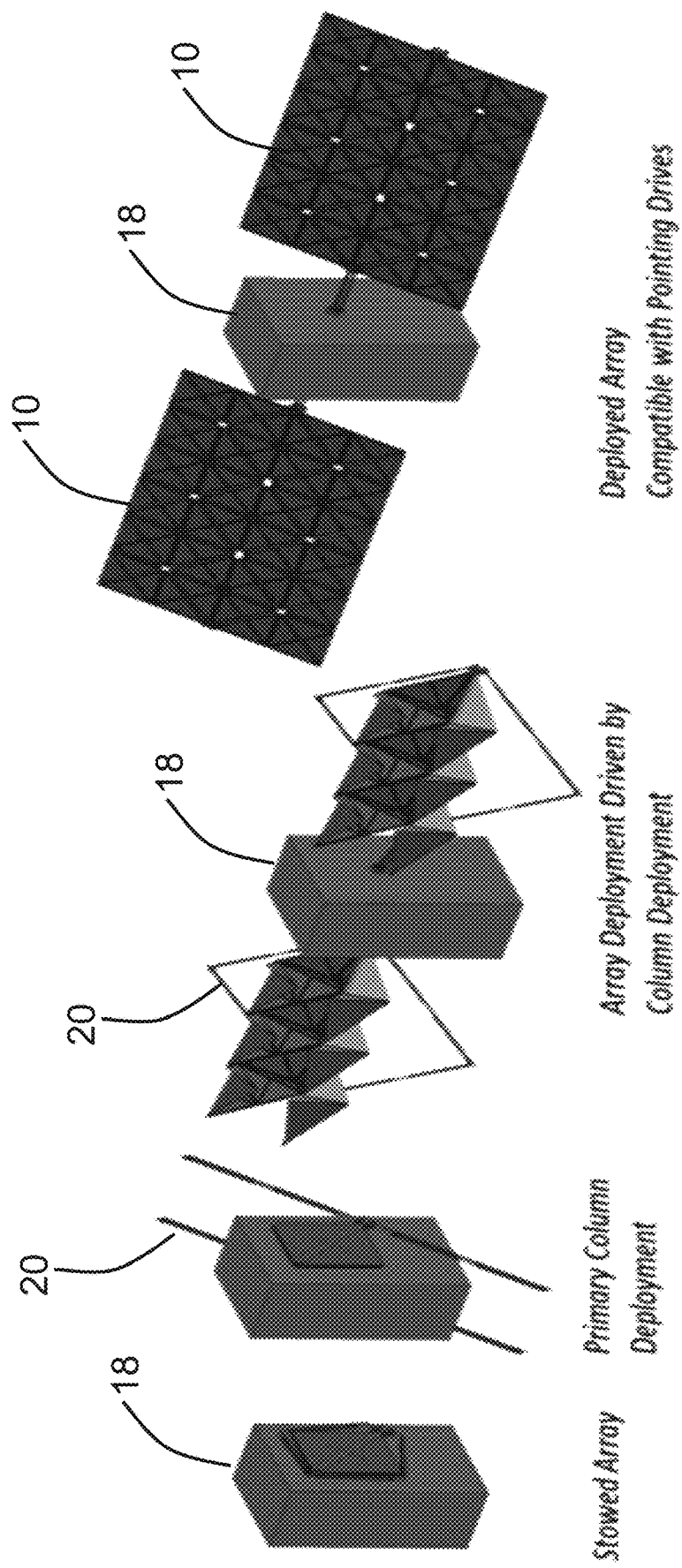
FIG. 26 Stowed Array
FIG. 27 Primary Column Deployment
FIG. 28 Array Deployment Driven by Column Deployment
FIG. 29 Deployed Array Compatible with Pointing Drives

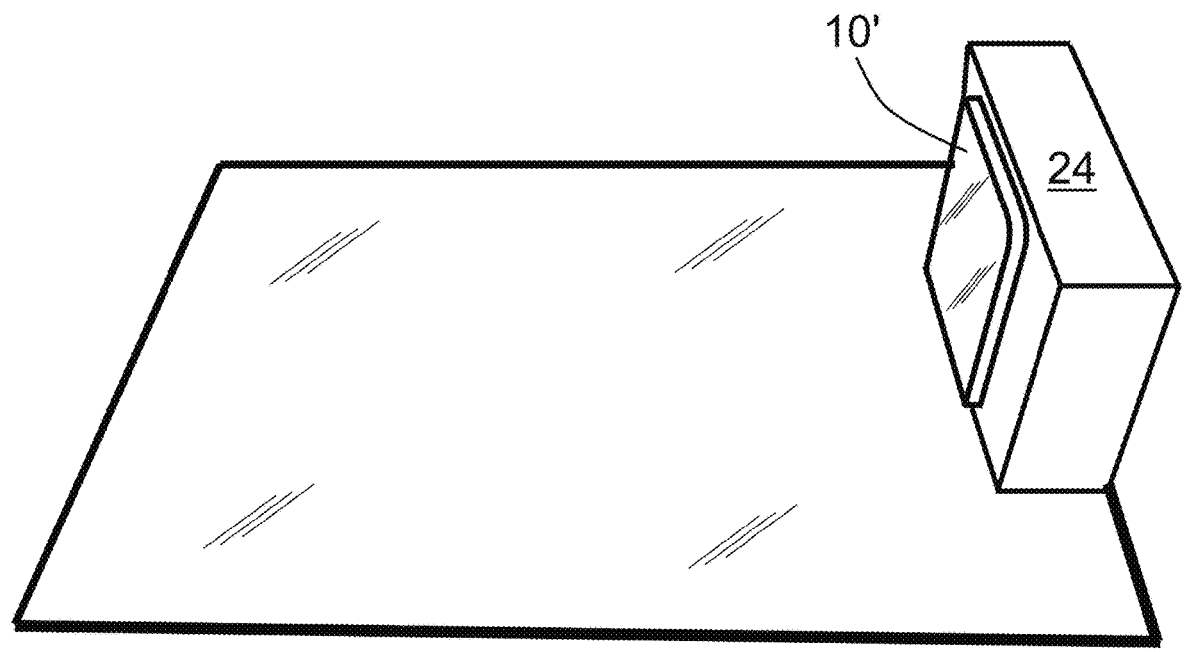
FIG. 35-B
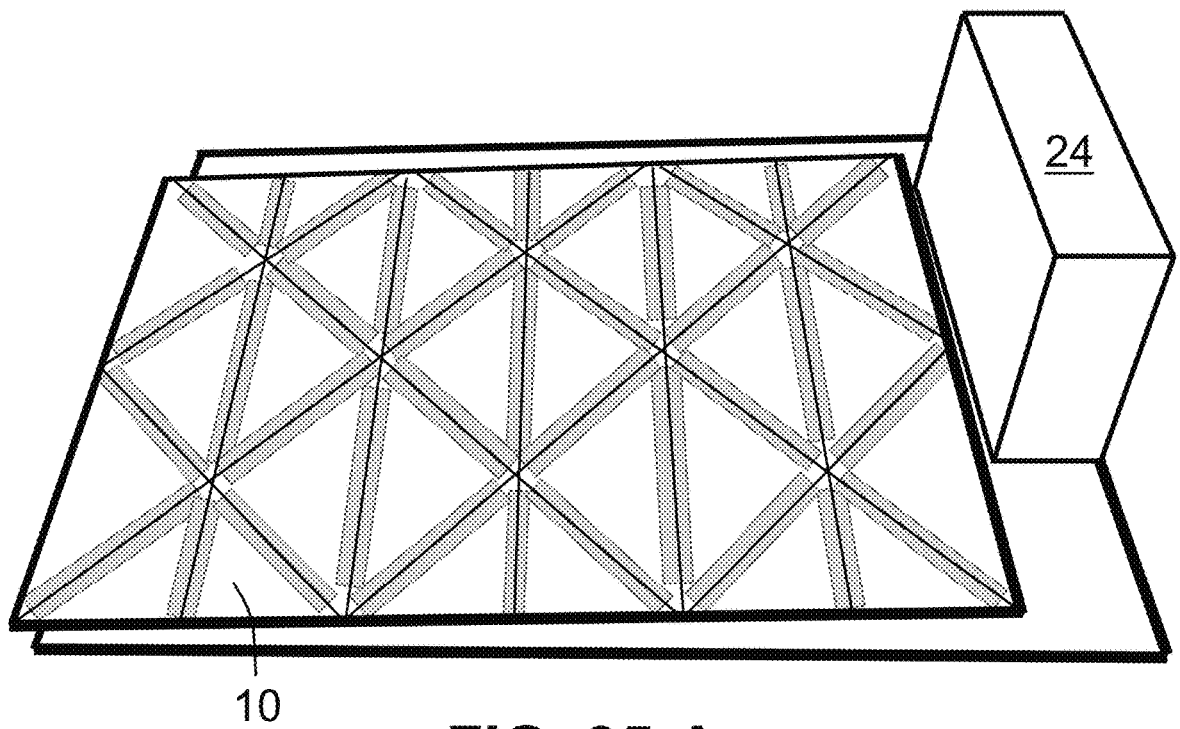
FIG. 35-A

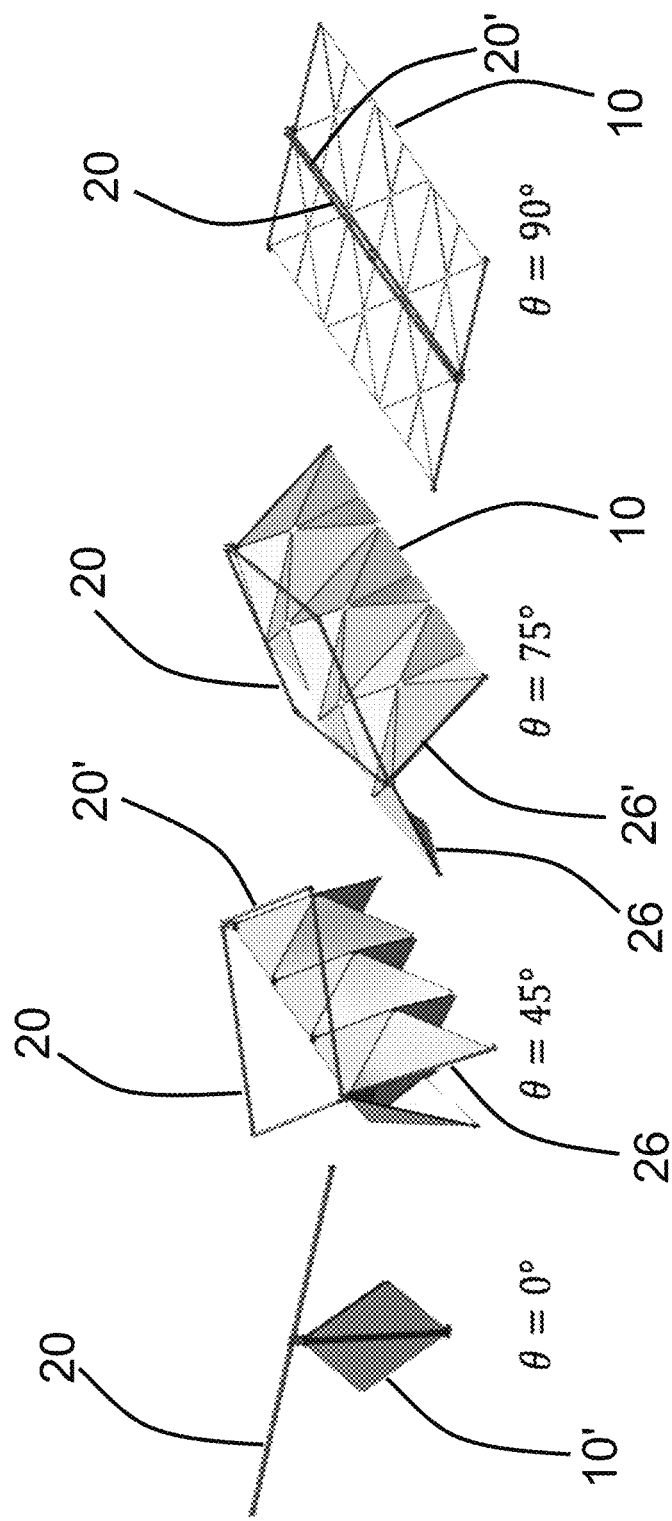

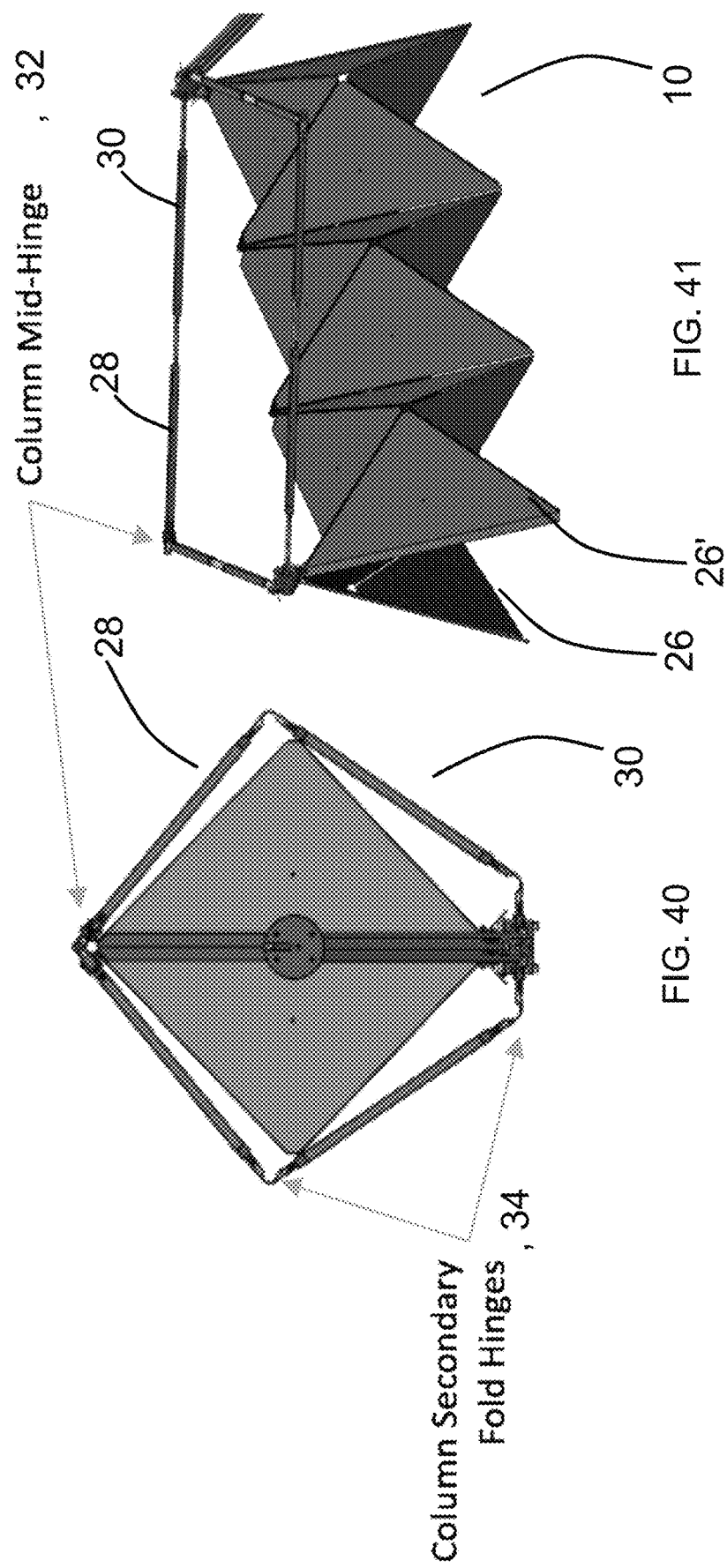

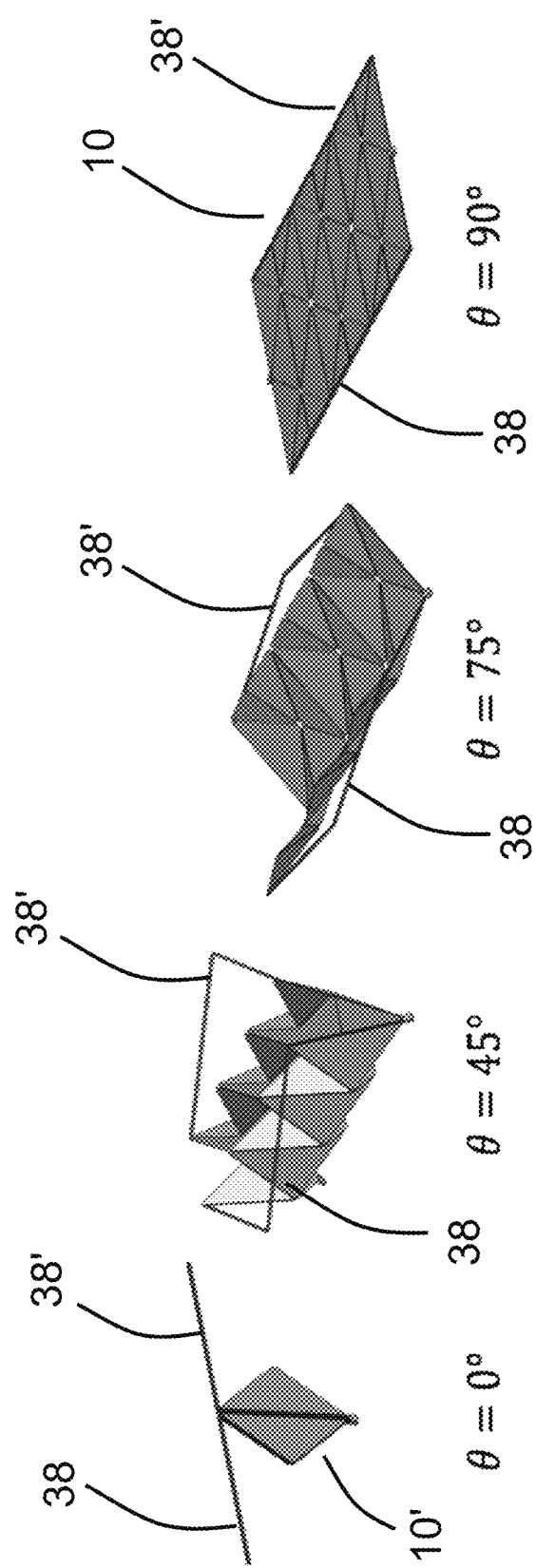

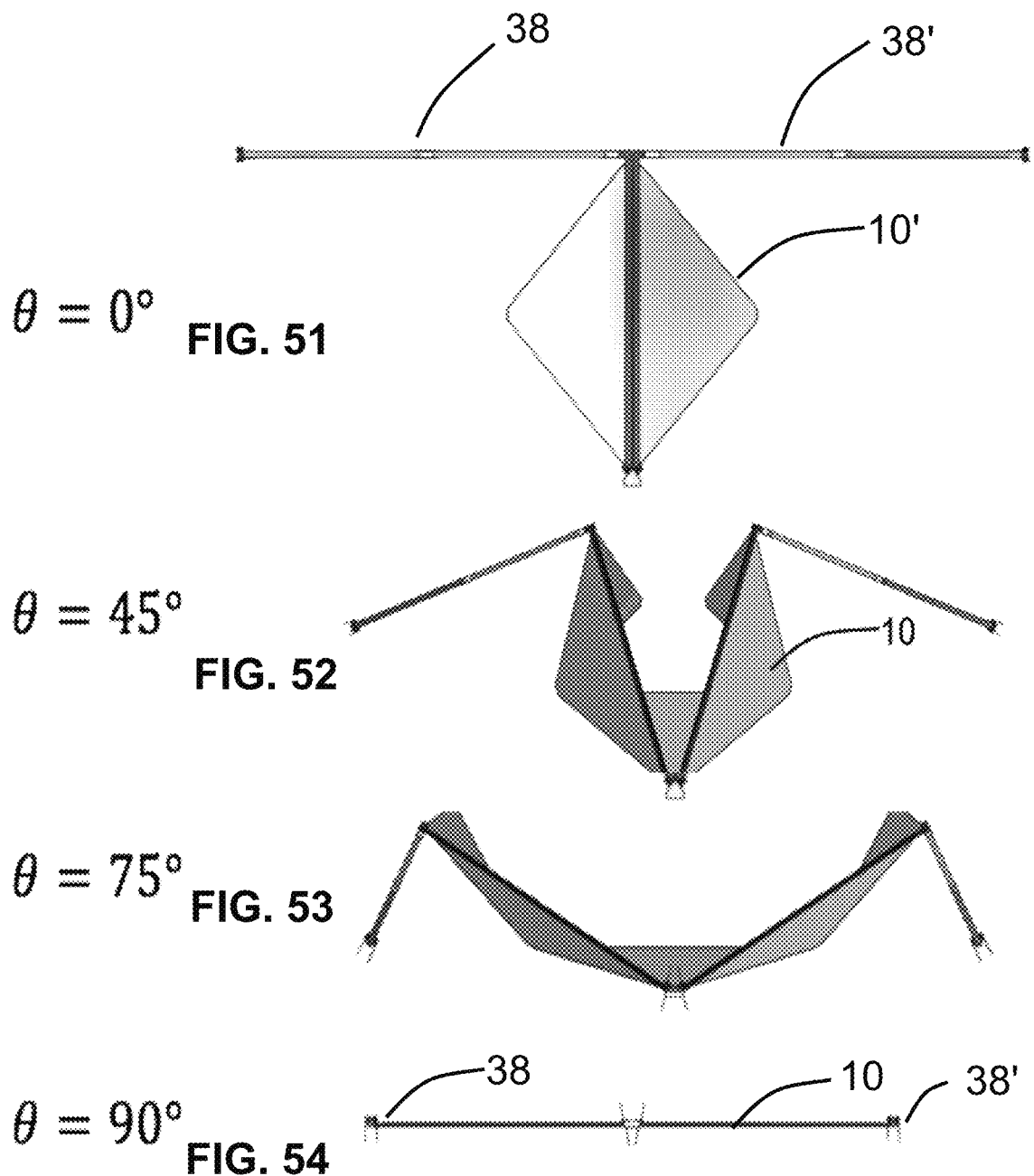

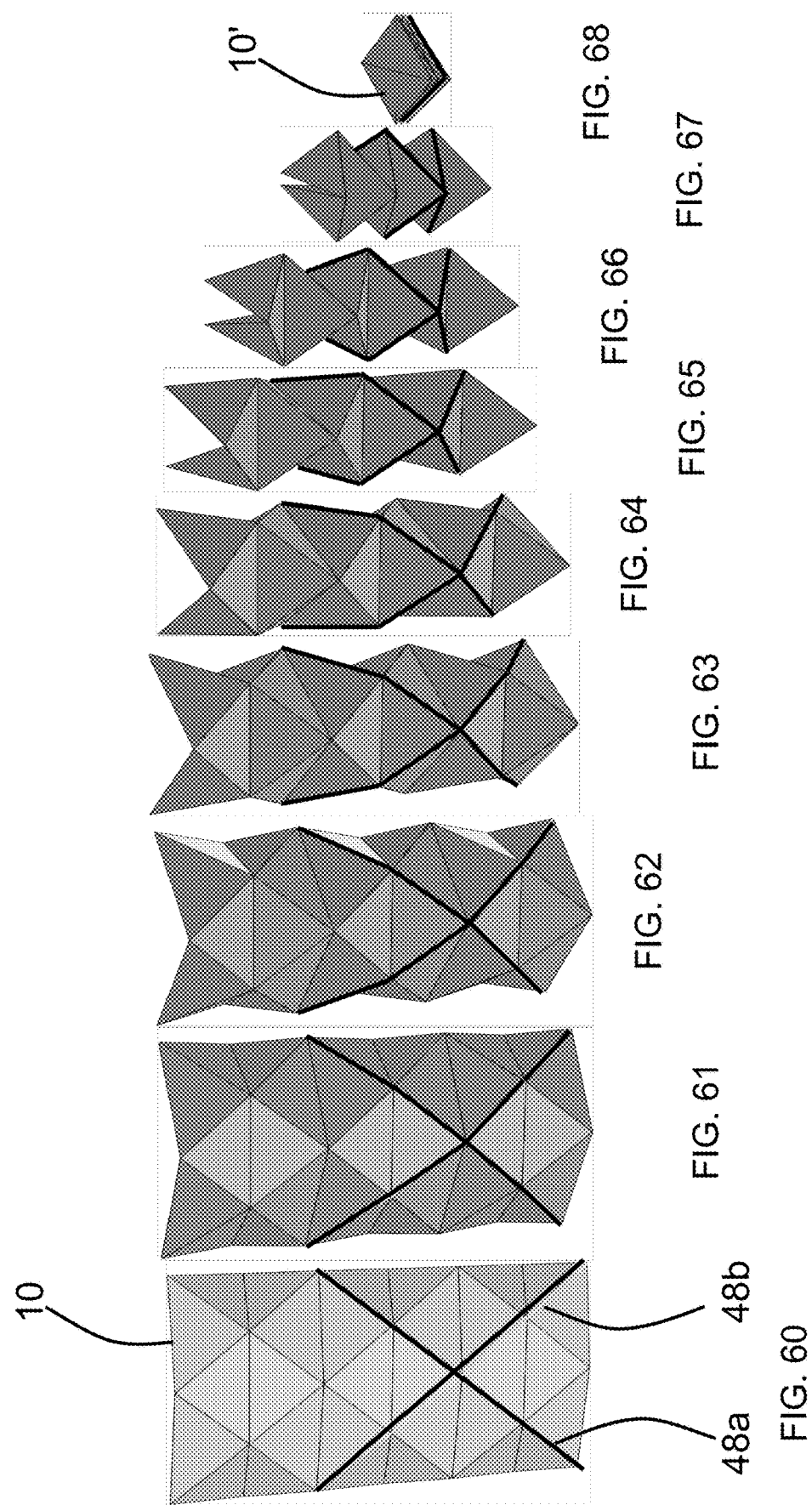

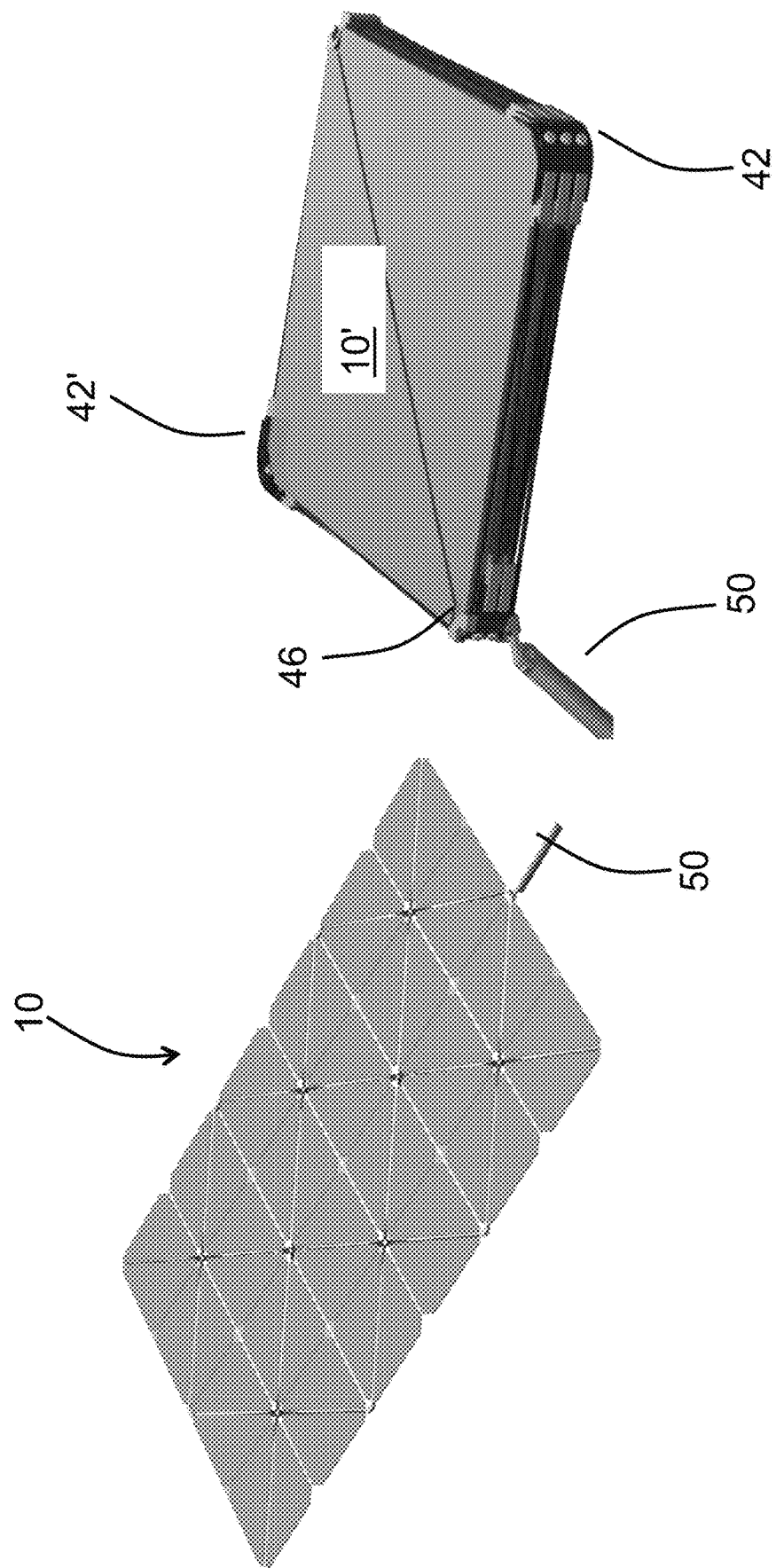
FIG. 69-B
FIG. 69-A

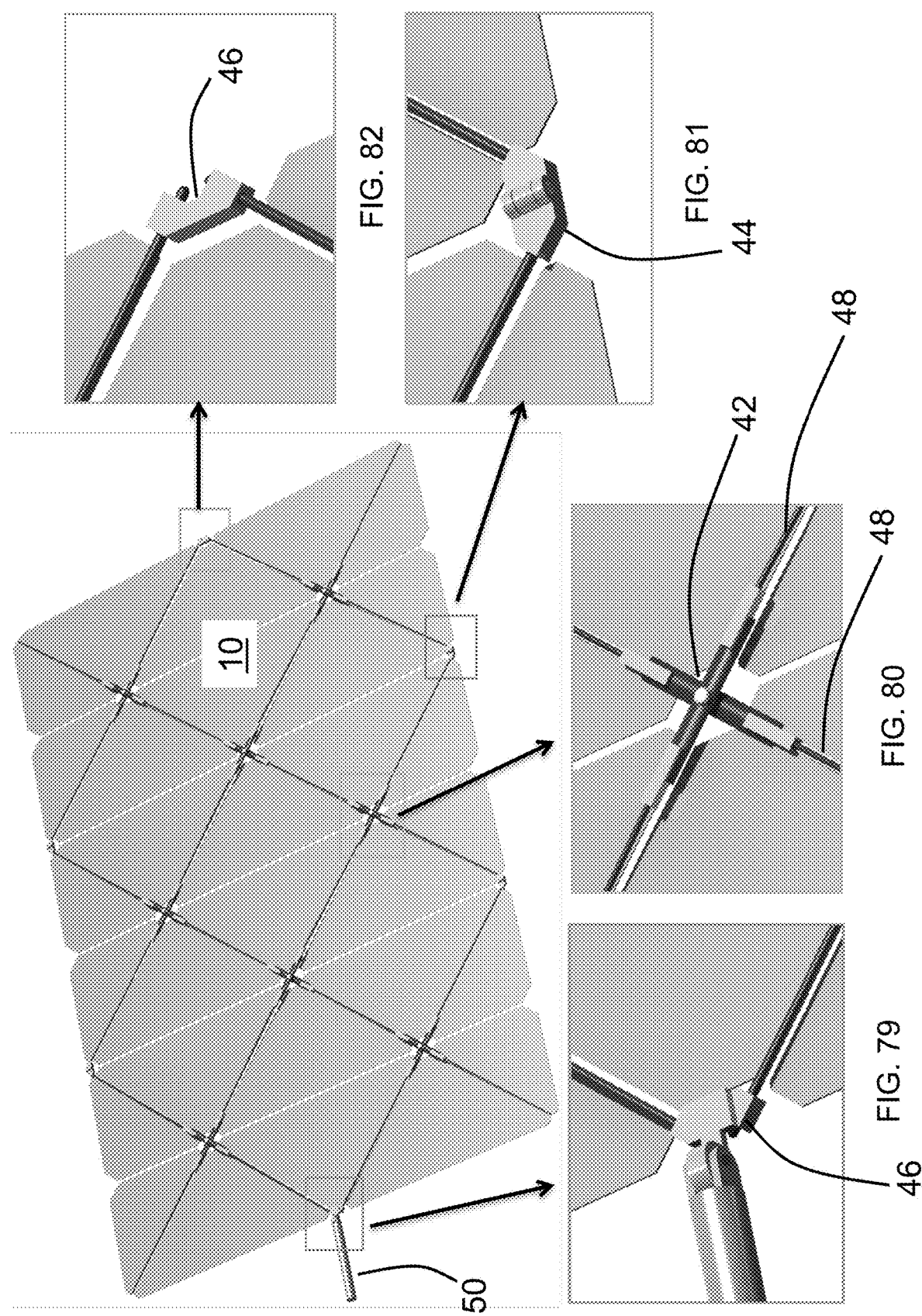

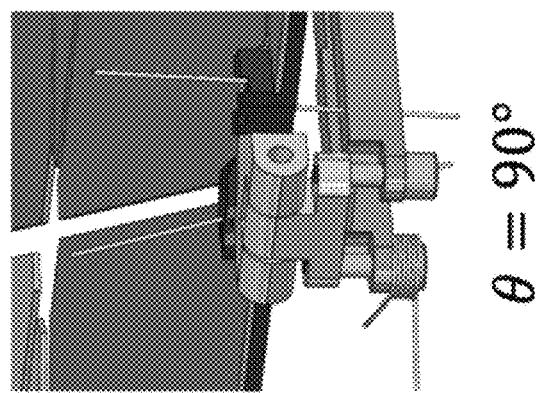
FIG. 94  θ = 90°
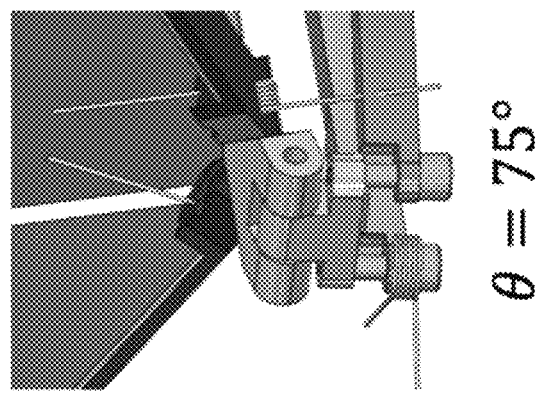
FIG. 93  θ = 75°
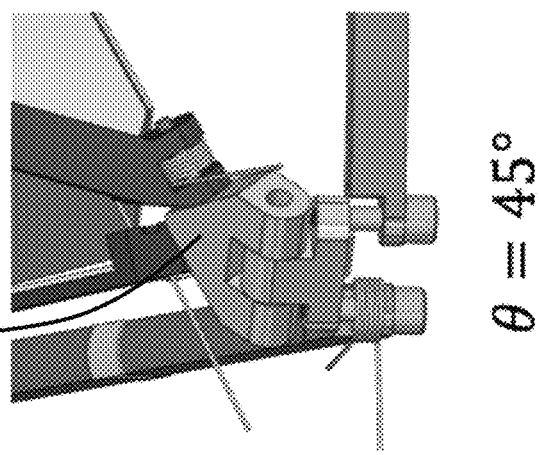
FIG. 92  θ = 45°
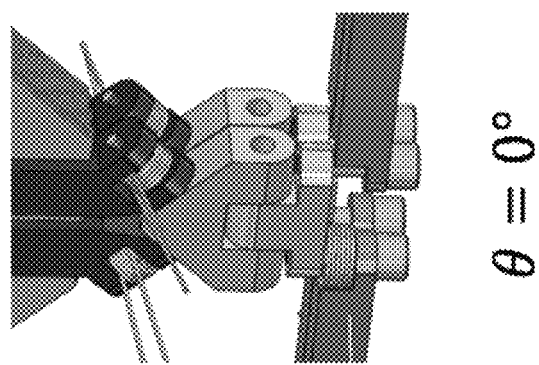
FIG. 91  θ = 0°

Mid-Deployment Band Routing

Mid-Deployment

Stowed

*Kapton Backplane*

*PV Side*

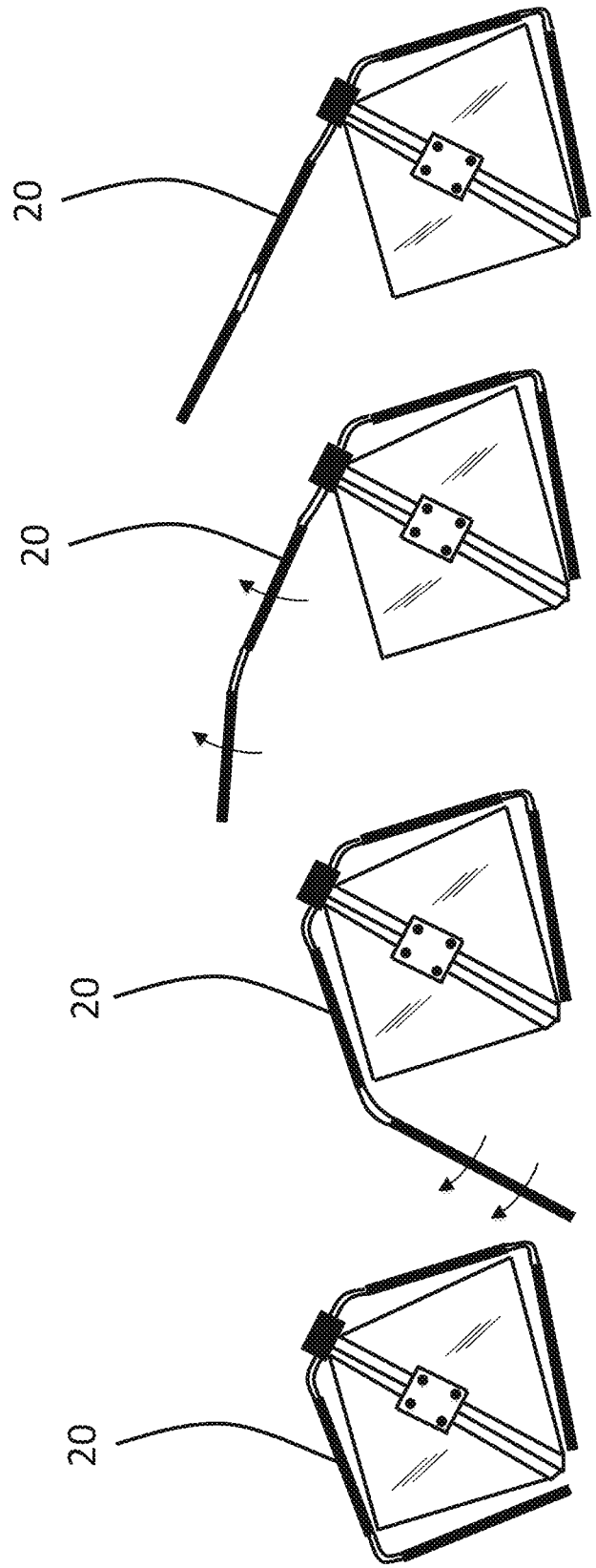

SEC A-A

SEC A-A

*Balanced*

COMPACT, SELF-DEPLOYING STRUCTURES AND METHODS FOR DEPLOYING FOLDABLE, STRUCTURAL ORIGAMI ARRAYS USING A COMPRESSION COLUMN

CROSS-REFERENCE TO RELATED APPLICATIONS

This application is a Divisional Application of pending U.S. application Ser. No. 15/466,731 by S. K. Jeon et al., filed Mar. 22, 2017, which is incorporated herein by reference.

STATEMENT REGARDING FEDERALLY SPONSORED RESEARCH OR DEVELOPMENT

This invention was made, in part, with US government support under a NASA contract No. NNX16CM16P. The US government has certain rights in the invention.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention pertains to innovative structures for tensioning arrays of solar photovoltaic (PV) cells, solar sails, and antenna elements that have been folded into compact shapes using principles of origami, for satellite and spacecraft applications, as well as terrestrial applications.

Introduction and Related Art

Recently, a variety of researchers have investigated origami and folding techniques for their value in efficiently packing large deployable space structures. For example, the Air Force Research Laboratory (AFRL) has been investigating and developing foldable membranes and arrays [1,2], retractable solar sails [3], foldable parabolic surfaces [4], and spiral-wrapped reflectors with a flexible laminate gore concept [5]. Another relevant example is from the Japan Aerospace Exploration Agency (JAXA) and their IKAROS experimental spacecraft, a 20-meter spinning solar sail. The folding pattern for the sail was relatively simple, consisting of an accordion fold of each quadrant of the sail, which is then wrapped around a central hub. Thickness-accumulation effects in the 7.5 micron sail material was significant enough that the wrapping and the management of the unfolding had to be carefully engineered to prevent tearing or binding of the sail material [6].

Most deployable space structures utilizing origami techniques have varying degrees of success and equal share of developmental challenges. Often, engineering resources are heavily invested into lowering the risks in stowage and deployment of these structures, as in mitigating tearing and binding, synchronizing a complex deployment with several degrees of freedom, managing potential bifurcation of certain areas of a structure, and maintaining structural efficiency when having to make technical trades.

The packaging and deployment of membranes and flat arrays, such as solar sails and solar arrays, is often a topic of research in deployable space structures. Thickness accumulation effects of fold patterns can create unexpected complications with packaging. For example, the two-directional Z-folding pattern, which has a perfect packaging efficiency if the fold regions are discounted, is based on an accordion fold, where it is first accordion folded in one direction, and then in the perpendicular direction. The secondary fold can often be problematic, as each fold must span the entire thickness of the first accordion fold [7].

An AFRL experiment [8,9] on studying tensioned precision structures (TPS) developed a folding pattern to have a perfect packaging efficiency (in a square shape) and cancelled-out thickness accumulation effects. FIGS. 1-7 show the sequential deployment of a $1/100^{th}$ scale model of the helical triangular folding pattern of the 5 m×2 m tensioned TPS array 8, which folds and stows to a 1 m by 1 m stack 8'. When folded, each set of fold edges and panels along the length of the TPS array exist in their own plane perpendicular to the stacked pattern direction and they never coincide, which effectively cancels any interaction between panel thickness and the folding pattern. A drawback of TPS folding pattern 12 is its helical twisting behavior when being unfolded, and non-deterministic deployment process, which may not be simple to deal with when deploying a space structure, for example. For terrestrial applications, this twisting behavior may not be a problem.

The AFRL TPS folding pattern 12 was discovered to be a spiral sub-pattern of a global folding pattern [10]. The global pattern folds with the same thickness canceling properties, but closes into a cylinder. If allowed to intersect, the global folding pattern continues to collapse into a stacked square package. The TPS pattern 12 is rotated 45 degrees from the Structural Origami ARray (SOAR) pattern 10. Both the AFRL TPS helical sub-pattern and the SOAR pattern collapse into a cylinder, and then into a square with no self-intersections. The alternative SOAR pattern 10 is torsion-free during deployment, which makes the deployment process deterministic in both directions.

Both of these rectangular sub-patterns (TPS and SOAR) are limited in extent only by their respective unfolded widths, and they may fold in arbitrary length. FIG. 2 show sequential perspective views of the unfolding sequence of a folded package comprising a SOAR triangular folding pattern 10 with 3 repeating units (N=3), perfect packaging efficiency, and deterministic, non-helical deployment.

One difficulty with the TPS and SOAR triangular folding patterns is that each fold vertex has three degrees of freedom, which results in a "floppy" (not fully controlled) structure throughout folding and unfolding. If the sequence is altered by simply using trapezoids in place of triangles, this reduces the folding pattern to one degree of freedom (DOF) at each fold vertex, and the fold structure exhibits a synchronized, deterministic folding behavior from stowed to fully deployed.

For small satellite program managers and integrators, who must contend with increasing power consumption of small spacecraft with advanced electric propulsion and/or science instrumentation, the SOAR system is an extremely high performance, deployable solar array system that delivers high power output and exceeds state-of-the-art packaging efficiencies. Unlike existing Z-folding panel or rolled architectures, this approach utilizes a two-dimensional packaging scheme of the flexible blanket/substrate that is coupled with a simple and compact supporting structure that stabilizes the array (tension/compression columns or internal lattice structure). This enables large deployed areas populated with high efficiency photovoltaic (PV) cells or antenna elements, which compactly stows in a square form factor with thin stack height, and minimizes impingement on spacecraft bus internal volume.

Patents have been issued relating to foldable arrays of solar panels for spacecraft using traditional accordion or Z-folding patterns, including: U.S. Pat. Nos. 4,880,188; 5,131,955; 5,520,747; 6,423,895; 6,478,261; 6,609,683; 6,637,702; 7,211,722; 8,616,502; and 9,444,394. Patents and applications have been issued/published relating to origami folding patterns for solar arrays, solar sails, and parabolic antennas, including: U.S. Pat. Nos. 8,356,774; 8,384,613; 9,496,436; 9,214,722; 2008/0223431; 2014/0001247; U.S. Pat. Nos. 5,296,044; 8,462,078; 8,462,078; and 9,156,568. Patents have been issued/published for large-strain fiber-reinforced composite hinges, including: U.S. Pat. Nos. 5,239,793; 6,321,503; 6,343,442; 6,374,565; 7,354,033; 8,074,324; 7,365,266; 7,895,795; 2015/0131237; and 8,434,196.

Against this background, the present invention was developed.

SUMMARY OF THE INVENTION

The Structural Origami ARray (SOAR) concept is an extremely high performance, deployable solar array system that delivers high power output and exceeds state-of-the-art packaging efficiencies. Unlike existing Z-folding panels or rolled architectures, this approach utilizes an origami-inspired two-dimensional packaging scheme of a flexible blanket/substrate that is coupled with a simple and compact deployable supporting structure that stabilizes the array by external tension or internal support. This enables large deployed areas populated with high efficiency photovoltaic (PV) cells or antenna elements, which compactly stows in a square form factor with thin stack height that minimizes impingement on spacecraft bus internal volume.

BRIEF DESCRIPTION OF THE SEVERAL VIEWS OF THE DRAWING(S)

FIGS. 1-7 show sequential perspective views of the deployment of a helical TPS triangular folding pattern with perfect packaging efficiency and helical twist.

FIGS. 22-25 show sequential perspective views of a deployment sequence of a pair of opposed SOAR solar arrays on a nano-satellite (Cube Sat) with a supporting compression column structure, where the array transitions from a compact, thin, square stack to a large deployed area.

FIGS. 26-29 show sequential perspective views of a deployment sequence of a pair of opposed SOAR solar arrays on a nano-satellite (Cube Sat) with a supporting compression column structure, where the array transitions from a compact, thin, square stack to a large deployed area.

FIGS. 35A,B show sequential perspective views of a SOAR triangular pattern solar cell layout 10 for a solar array with $L_S$=20 cm and N=3, in the stowed and deployed states, respectively, with a 6U CubeSat bus simulator 24 on the side.

FIGS. 36-39 show sequential perspective views of a SOAR triangular pattern solar cell layout for a solar array with $L_S$=20 cm and N=3, in the stowed and deployed states, respectively, with a 6U CubeSat bus simulator on the side.

FIGS. 40-41 show sequential perspective views of a deployment sequence of a SOAR solar array with a dual compression column supporting structure, where the array transitions from a compact, thin, square stack to a large deployed area, with balanced kinematics that enables free-deployment by strain energy.

Figure 44:
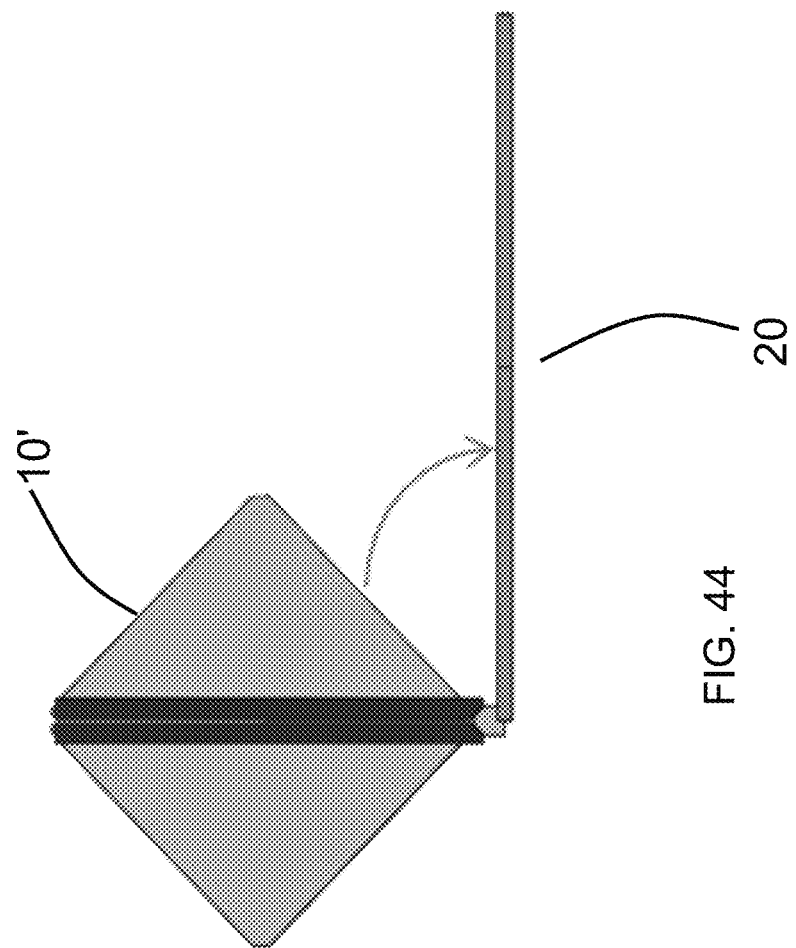
Figure 43:
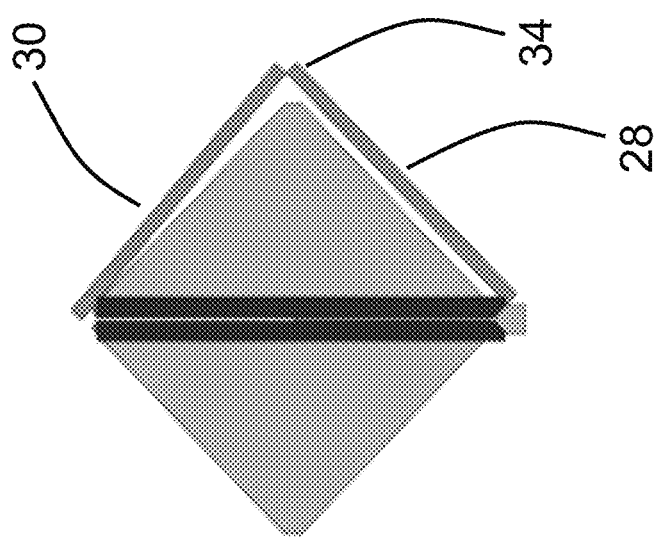
Figure 42:

FIGS. 42-44 show sequential perspective views of a deployment sequence of a SOAR solar array with a dual compression column supporting structure, where the compression column comprises a mid-hinge for array deployment, and secondary hinges for compact packaging.

Figure 45:
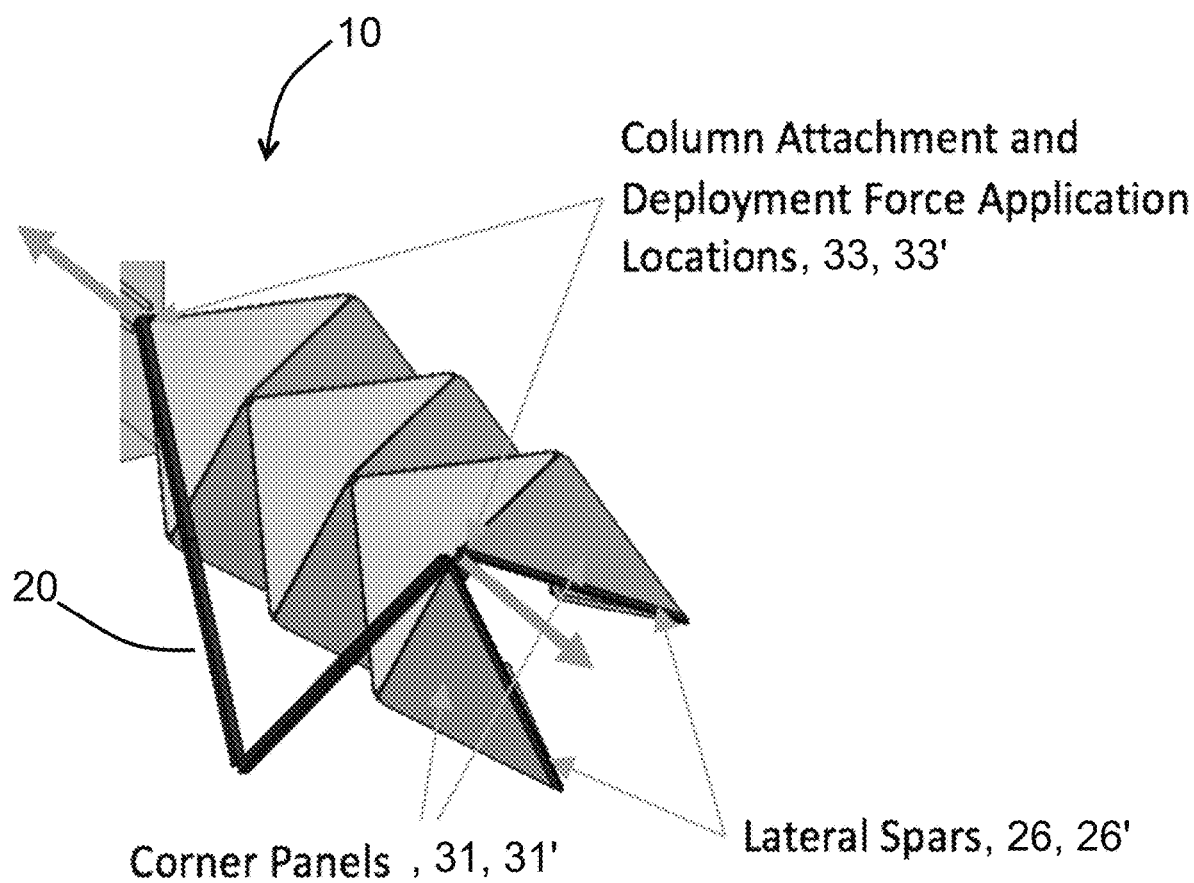

FIG. 45 shows a perspective view of a partially-deployed SOAR solar array indicating that simply deploying the array at column attachment points does not deploy the corner panels; additional forces are necessary applied to lateral spars.

Figure 46:
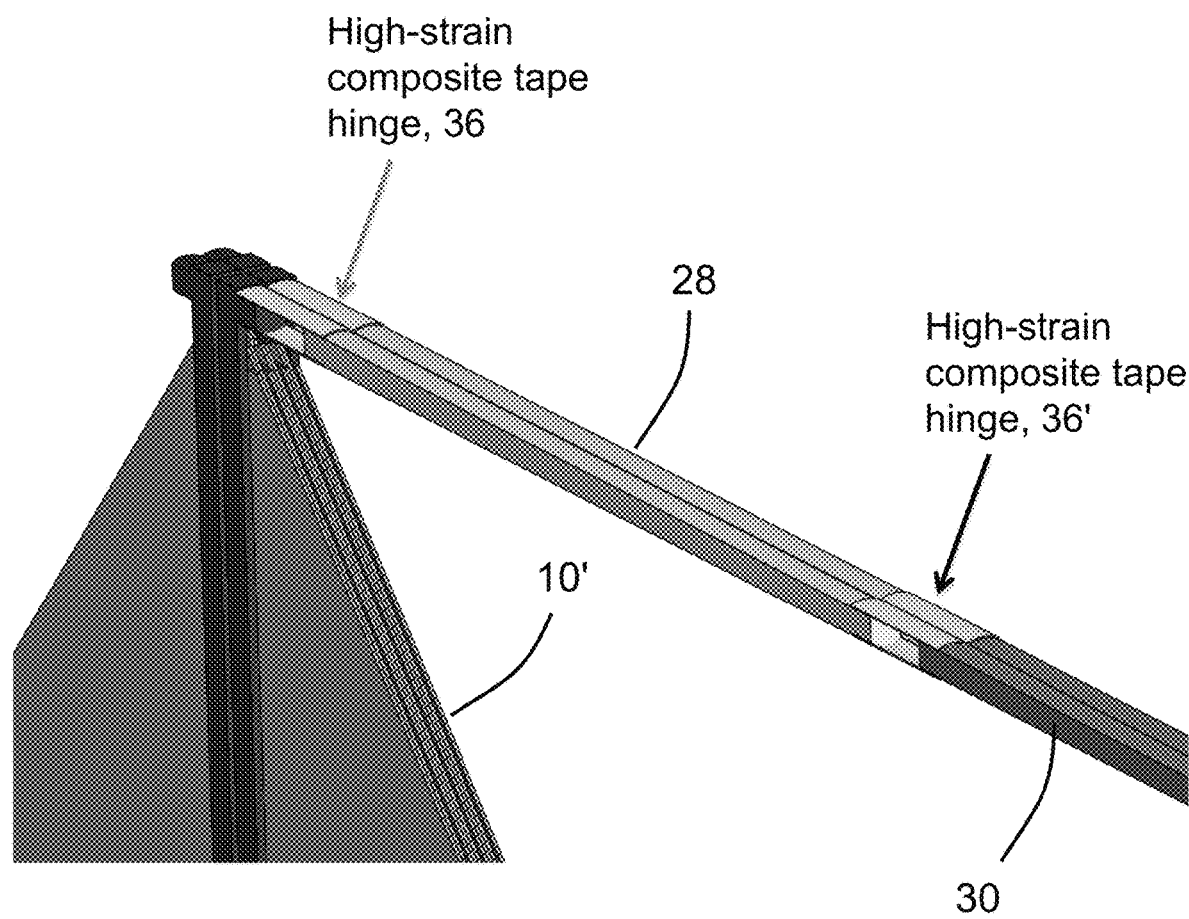

FIG. 46 shows a perspective view of dual compression columns with high-strain composite flexure hinges that provide the deployment energy, and that lock-out at end of travel for the initial column deployment.

FIGS. 47-50 show sequential perspective views of deployment of a SOAR solar array with dual compression columns arranged in a picture frame configuration on the perimeter of the array.

FIGS. 51-54 shows sequential end views of deployment of a SOAR solar array with dual compression columns arranged in a picture frame configuration on the perimeter of the array.

Figures 55, 56:
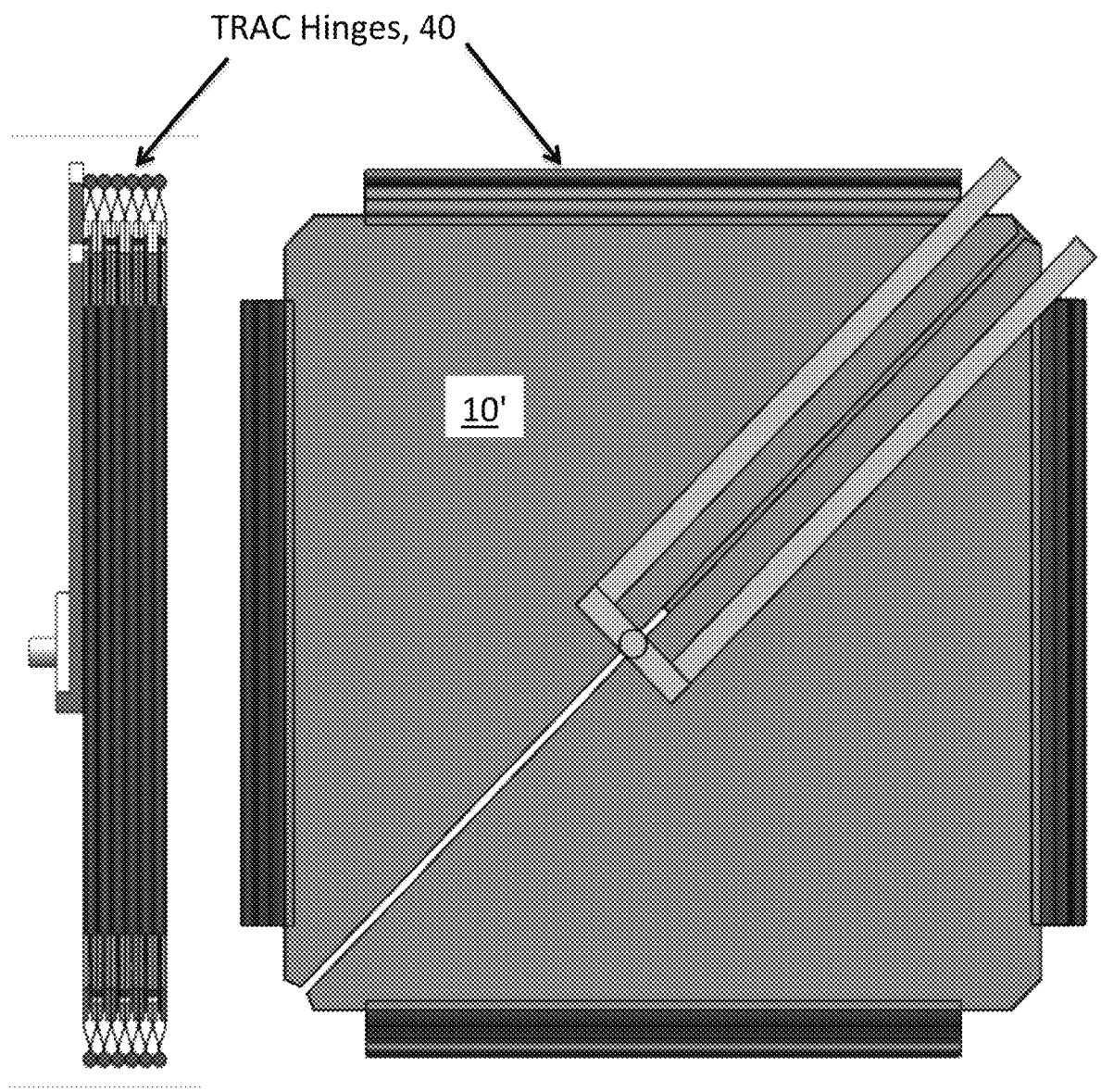

FIGS. 55-56 show an end view and plan view, respectively, of a packaged lattice support structure concept featuring flexible composite hinge lines and multi-axis compliant hinges at the intersections.

Figure 57:
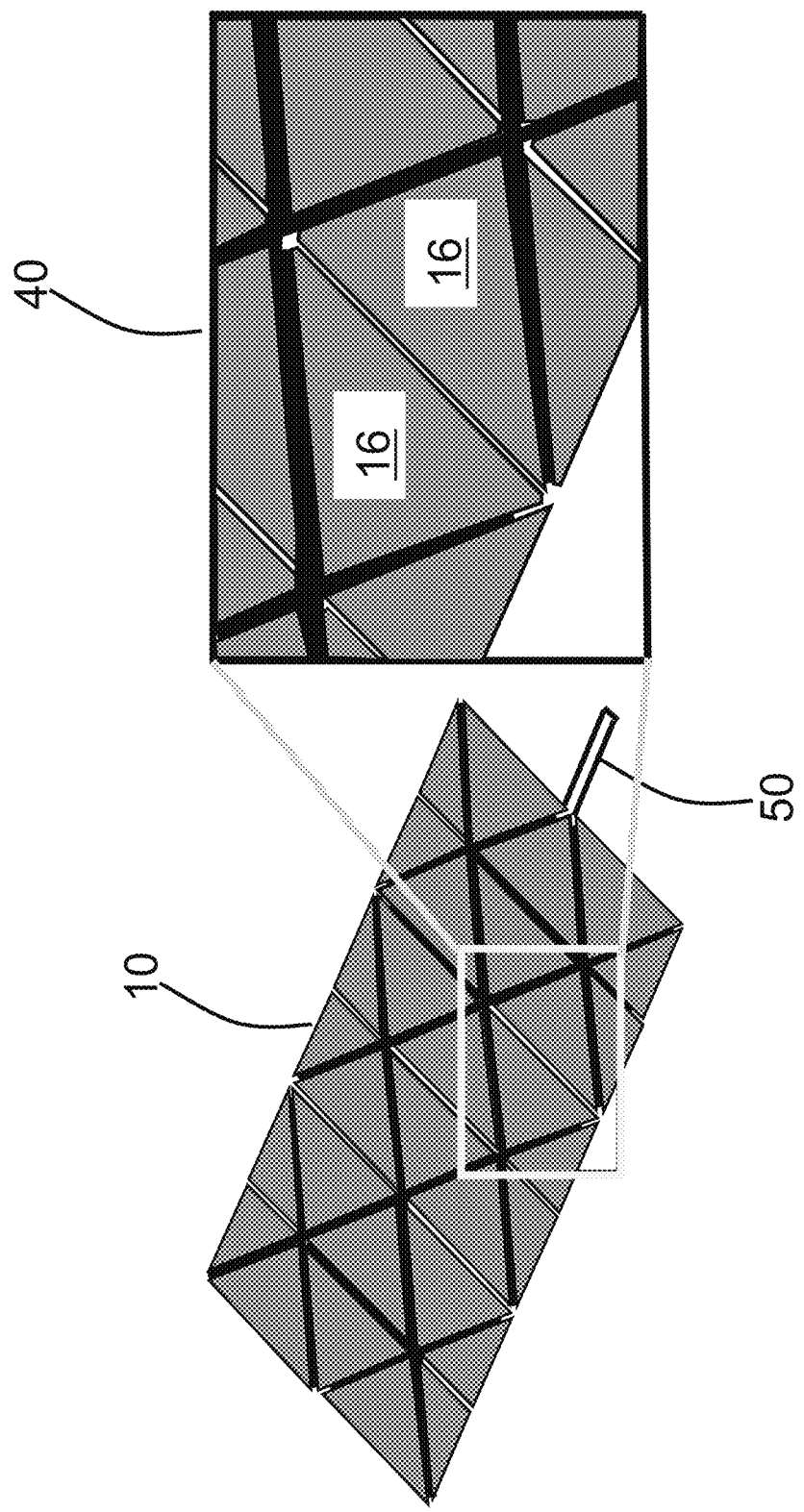

FIG. 57 shows a perspective view of a lattice support structure concept featuring flexible composite hinge lines and multi-axis compliant hinges at the intersections.

Figure 58:
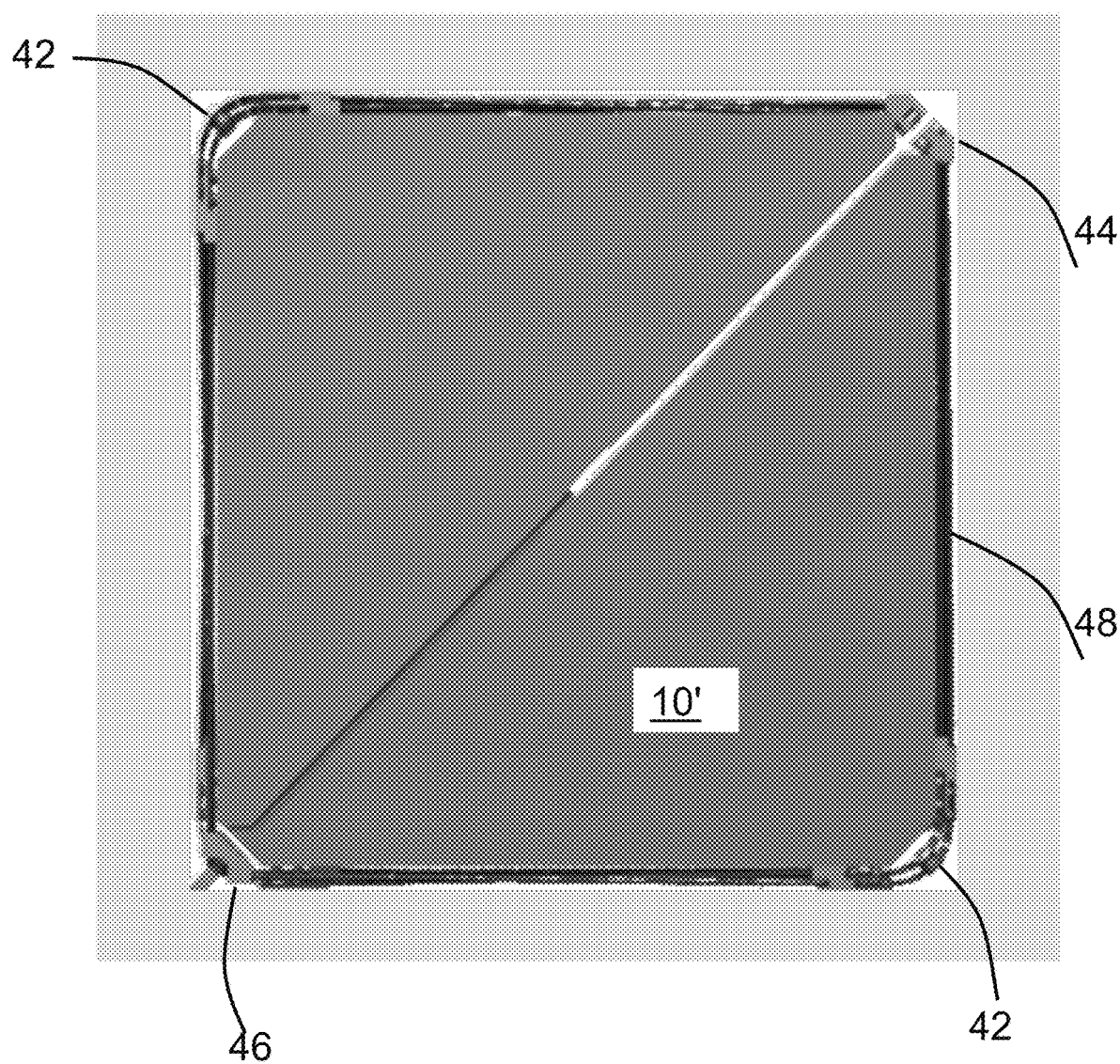

FIG. 58 shows a plan view of a stowed lattice support structure concept.

Figure 59:
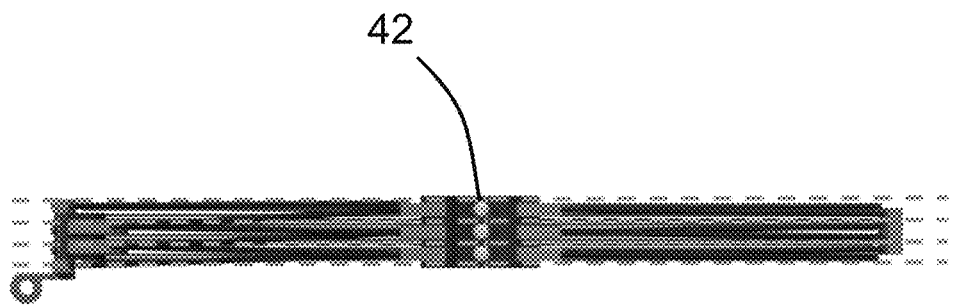

FIG. 59 shows an end view of a stowed lattice support structure concept.

FIGS. 60-68 show sequential perspective views of deployment of a SOAR solar array with a pair of helical lattice beams between deployed and stowed states.

FIGS. 69-A,B show perspective views of a SOAR solar array with high-strain composite hinges between deployed and stowed states.

Figure 70:
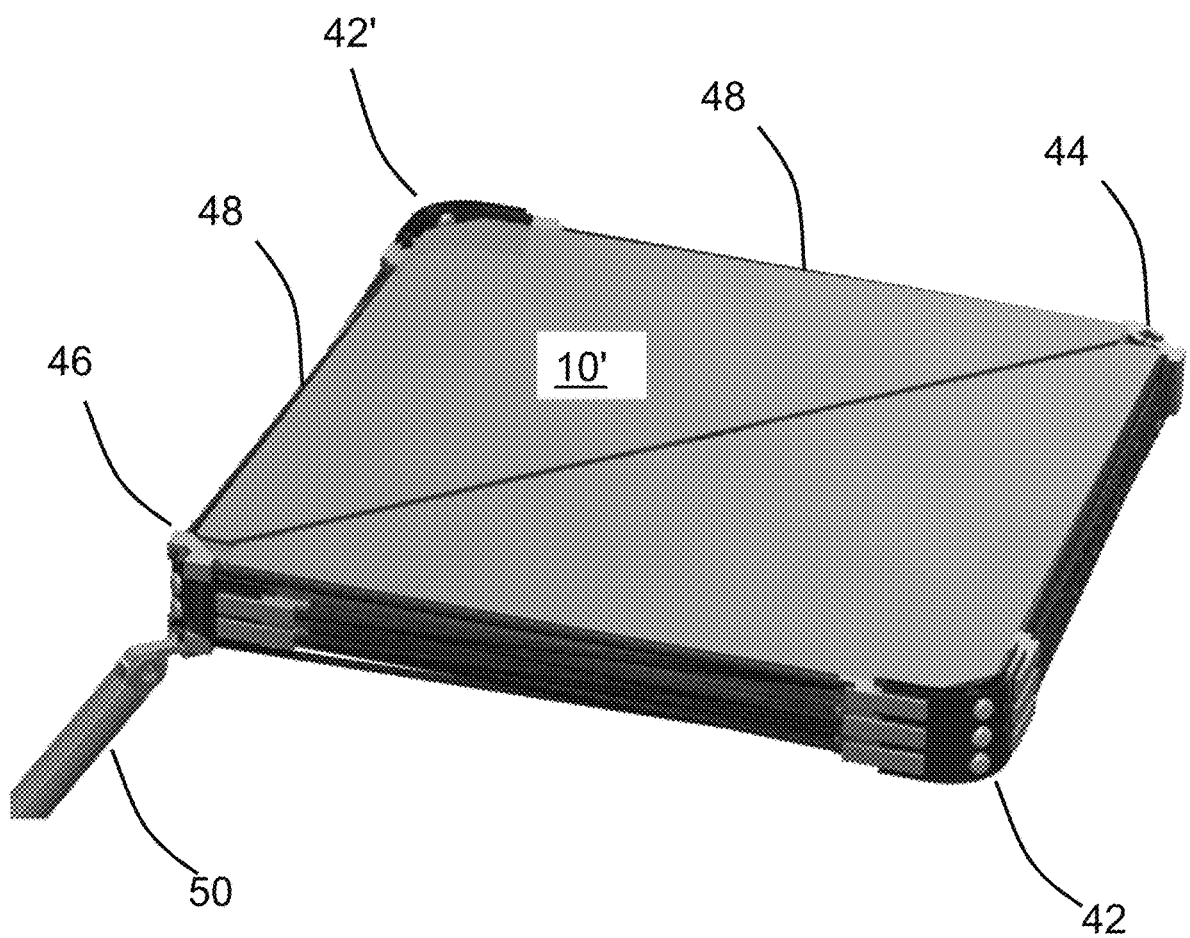

FIG. 70 shows a perspective view of a stowed SOAR solar array with collapsible, multi-axis compliant hinges at the intersections.

Figure 71:
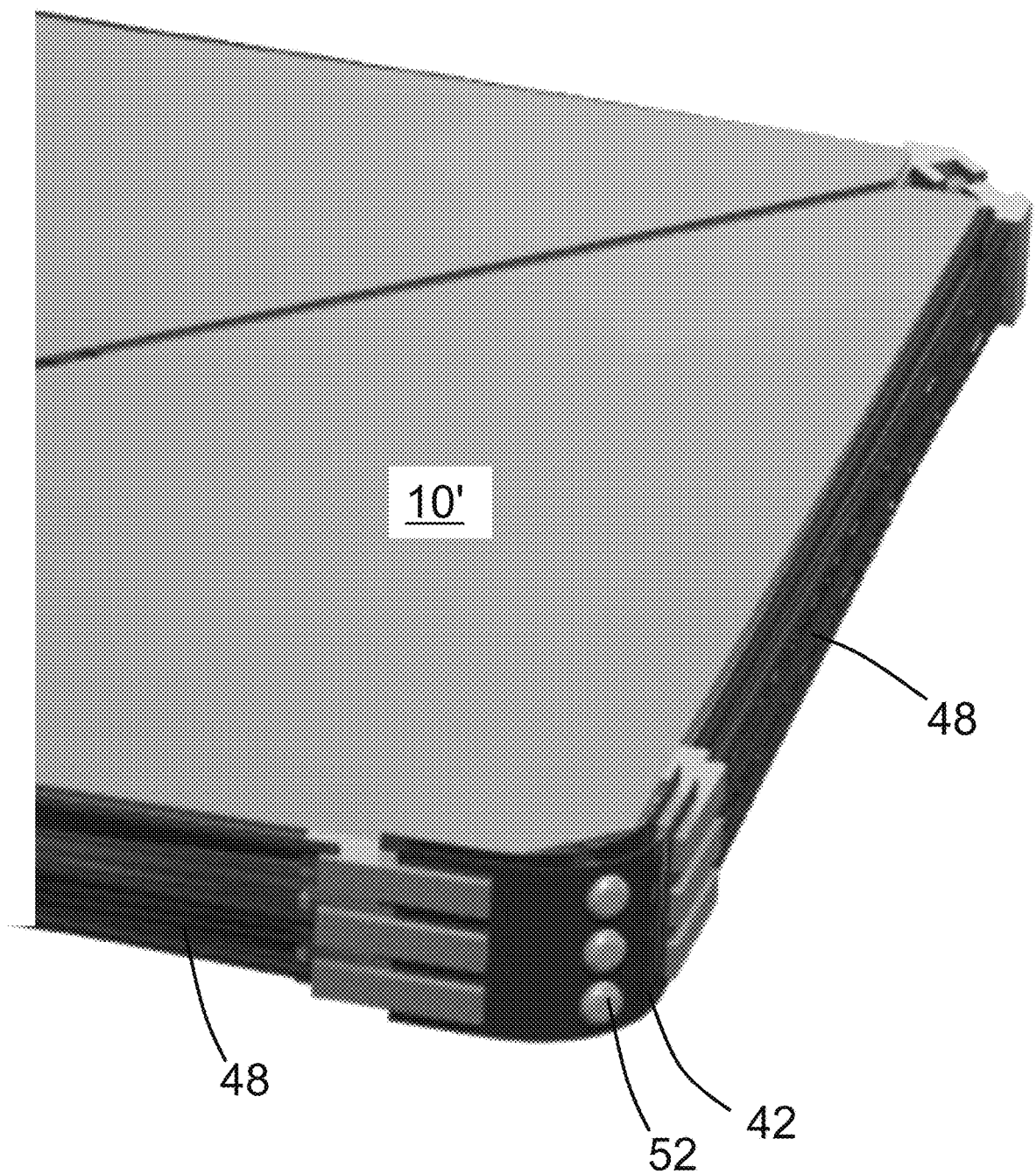

FIG. 71 shows a magnified perspective view of a stowed SOAR solar array with collapsible, multi-axis compliant hinges at the intersections.

Figure 72:
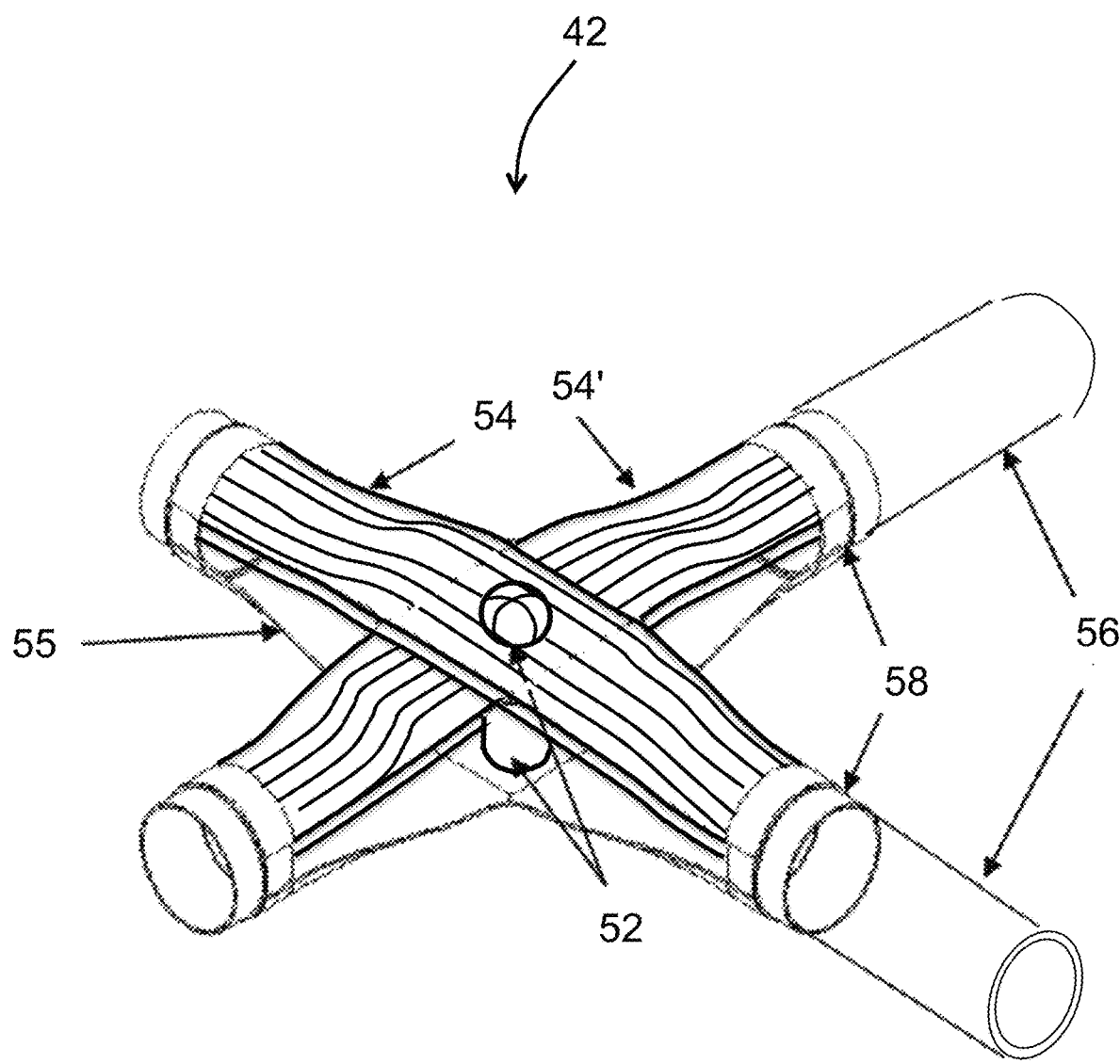

FIG. 72 shows a perspective view of a multi-axis compliant composite hinge with mid-span hinge pin, in the deployed state.

Figure 73:
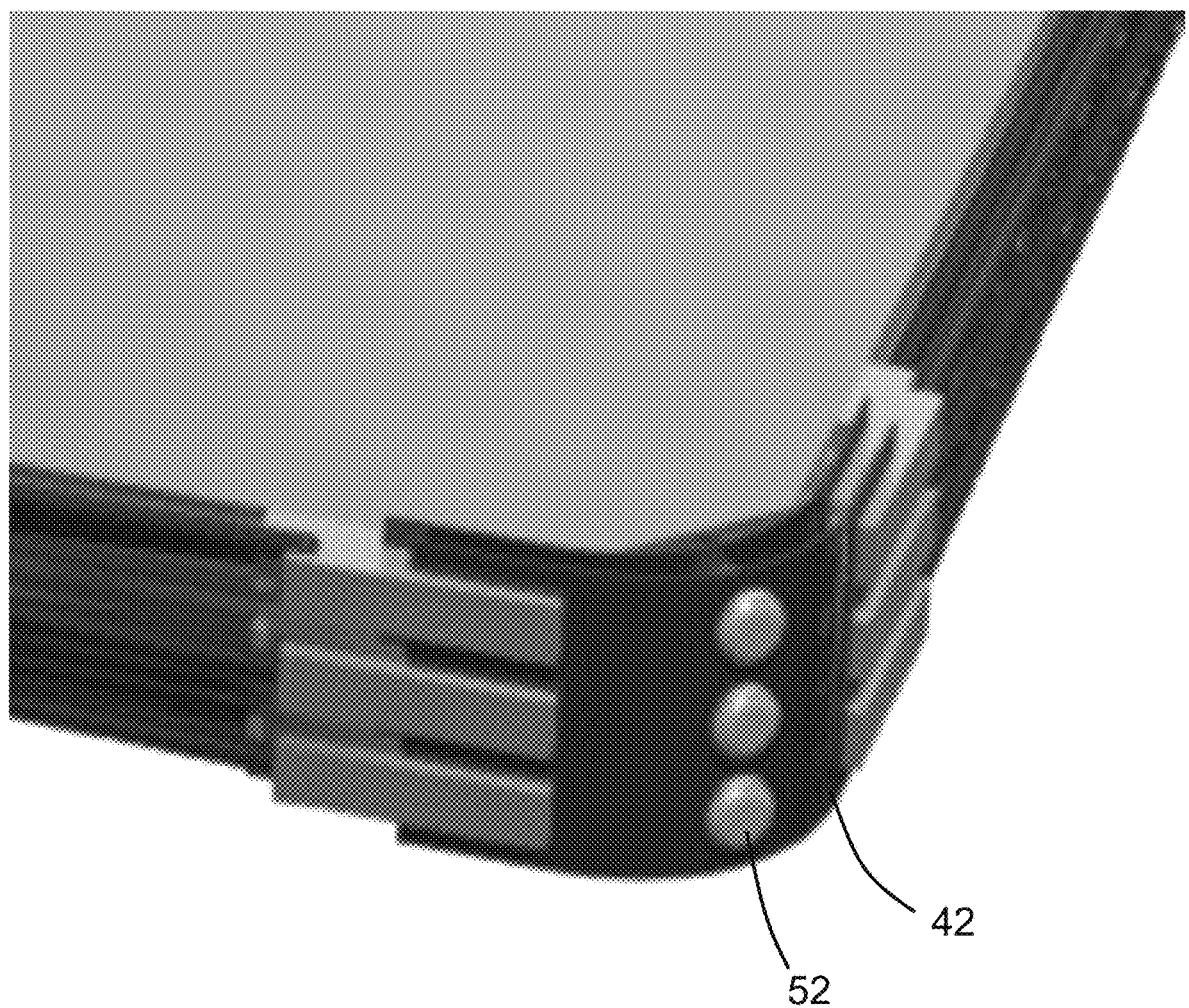

FIG. 73 shows a perspective view of a multi-axis compliant composite hinge with mid-span hinge pin, in the stowed state.

Figure 74:
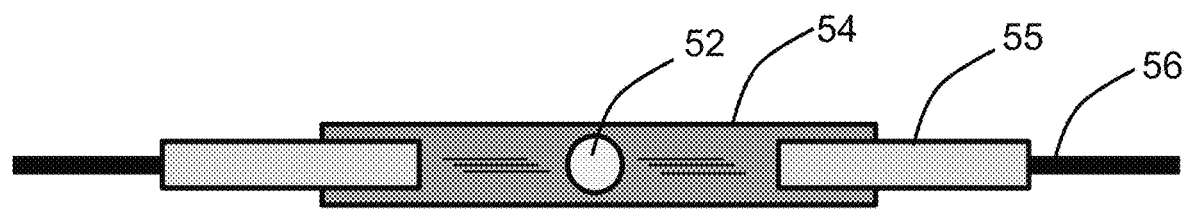

FIG. 74 shows an elevation view of a multi-axis compliant composite hinge with mid-span hinge pin, in the stowed state.

Figure 75:
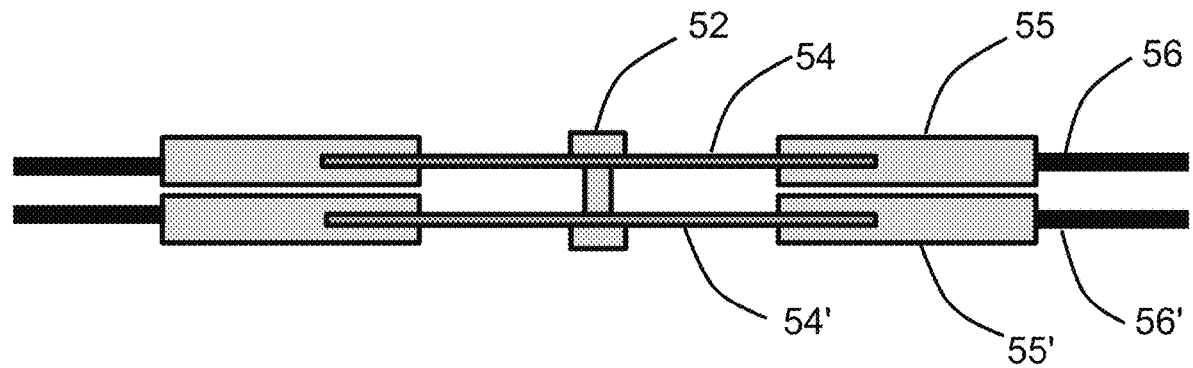

FIG. 75 shows an end view of a multi-axis compliant composite hinge with mid-span hinge pin, in the stowed state.

Figure 76:
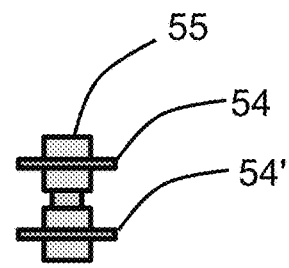

FIG. 76 shows a plan view of a multi-axis compliant composite hinge with mid-span hinge pin, in the deployed state.

Figure 77:
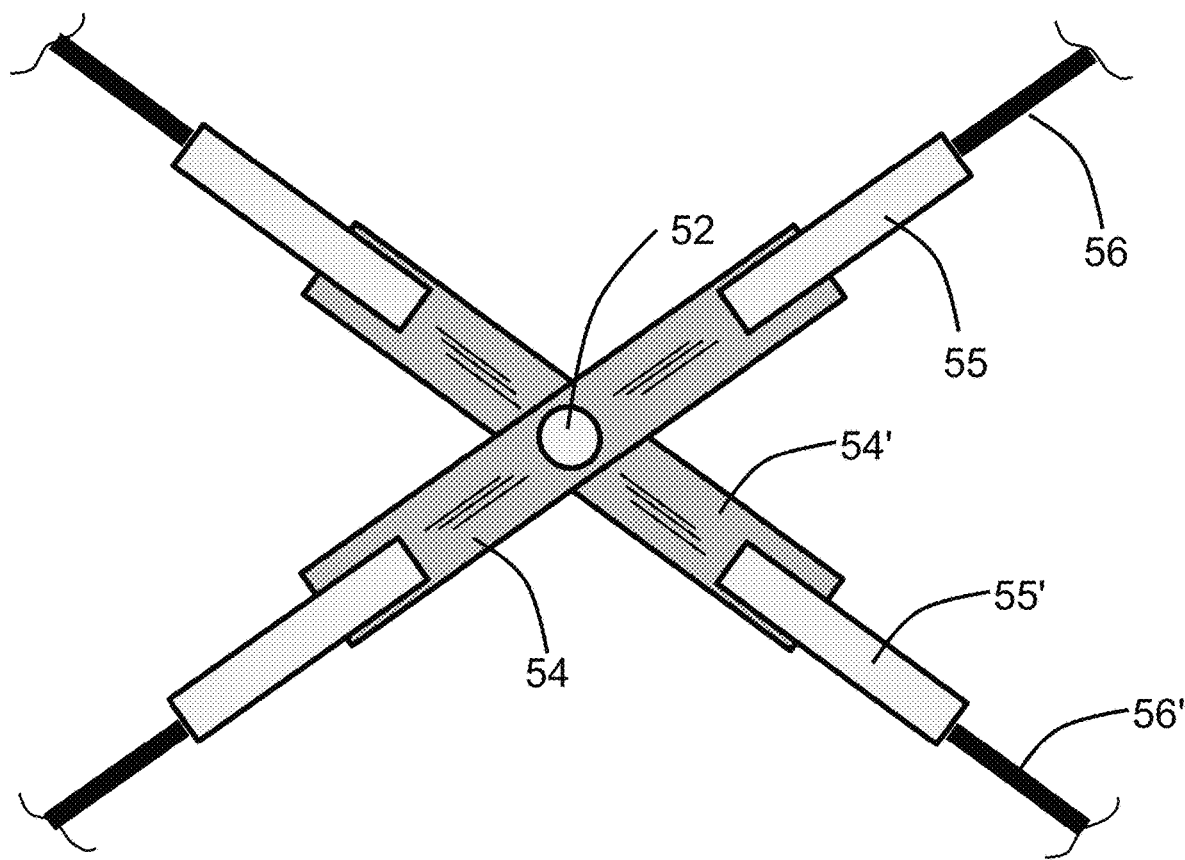

FIG. 77 shows a plan view of a multi-axis compliant composite hinge with mid-span hinge pin, in the stowed state.

Figure 78:
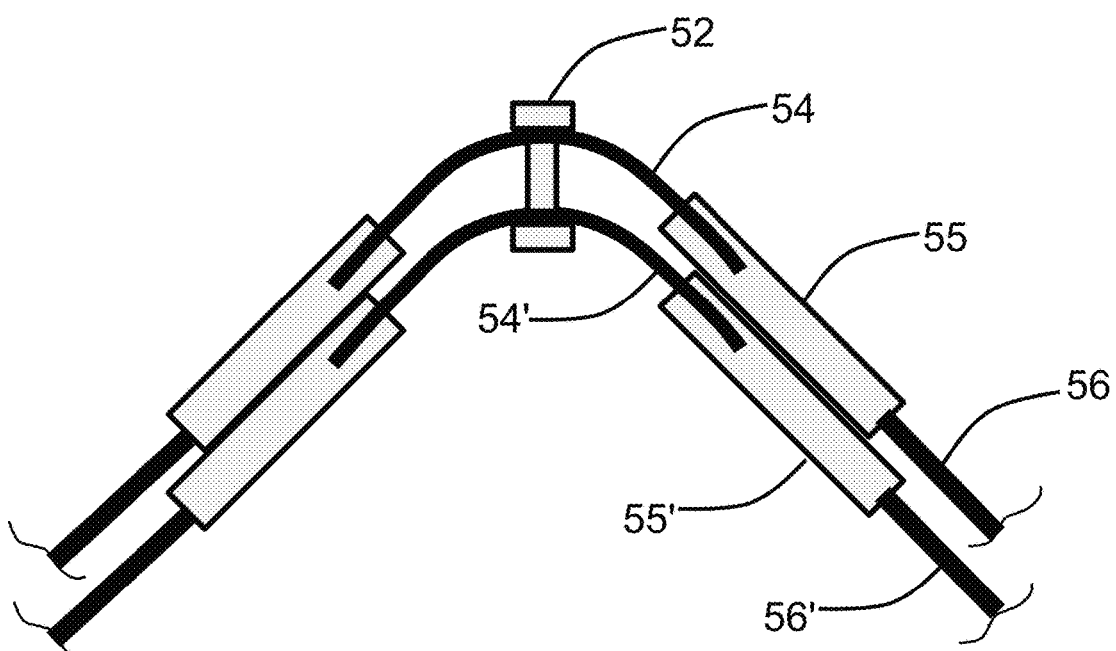

FIG. 78 shows a plan view of a multi-axis compliant composite hinge with mid-span hinge pin, in the stowed state.

FIGS. 79-82 show perspective views of a SOAR solar array with high-strain composite hinges at interior intersections; pin/clevis hinges; and fixed hinge plates.

Figure 83:
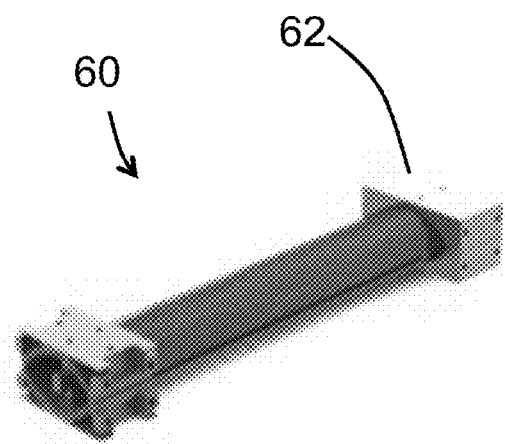
Figure 84:
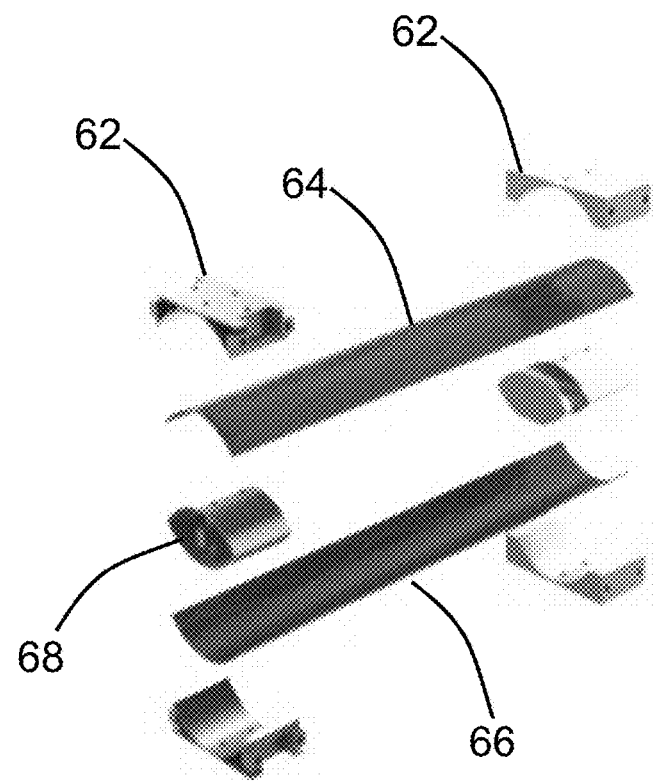
Figure 87:
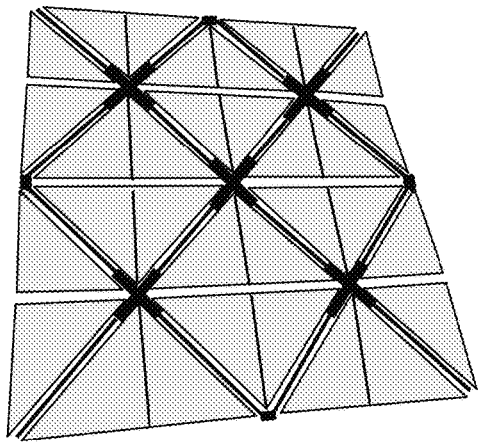
Figure 88:
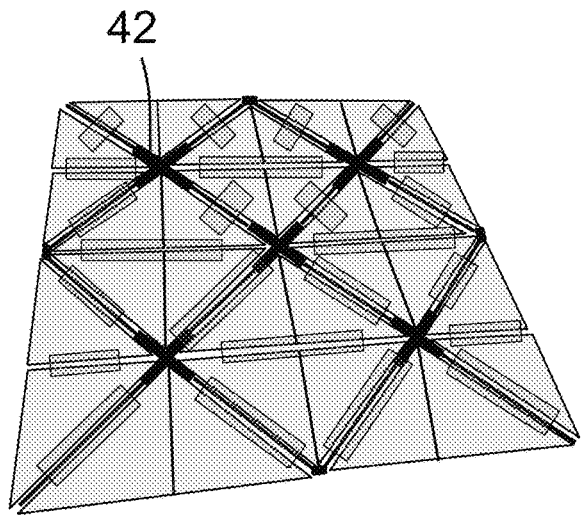
Figure 85:
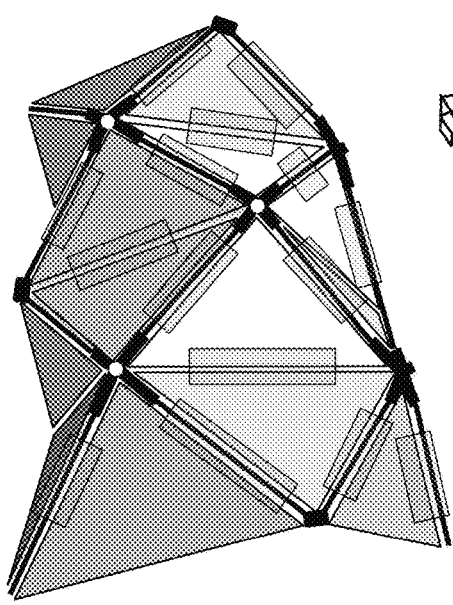
Figure 86:
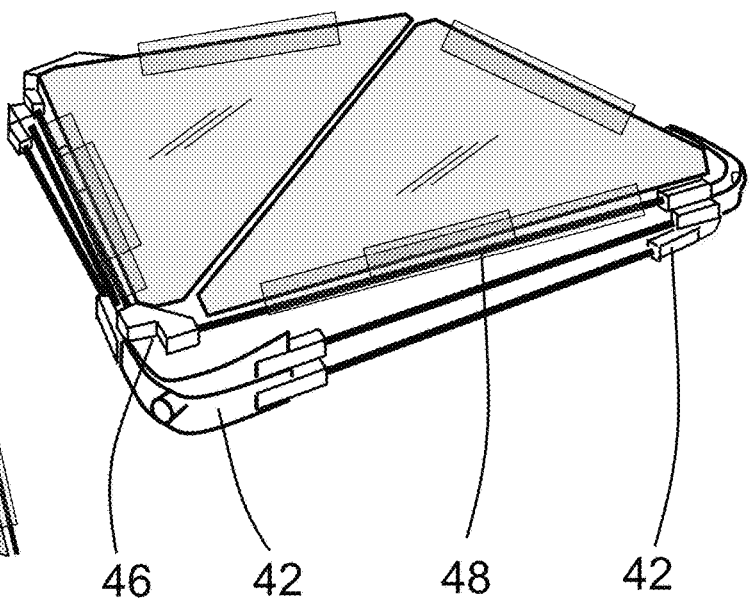

FIGS. 83-84 show perspective views of a concave composite tape hinge.

FIGS. 85-88 show perspective views of a model of a SOAR solar array with high-strain composite hinges at interior intersection, in the folded and unfolded states.

Figure 89:
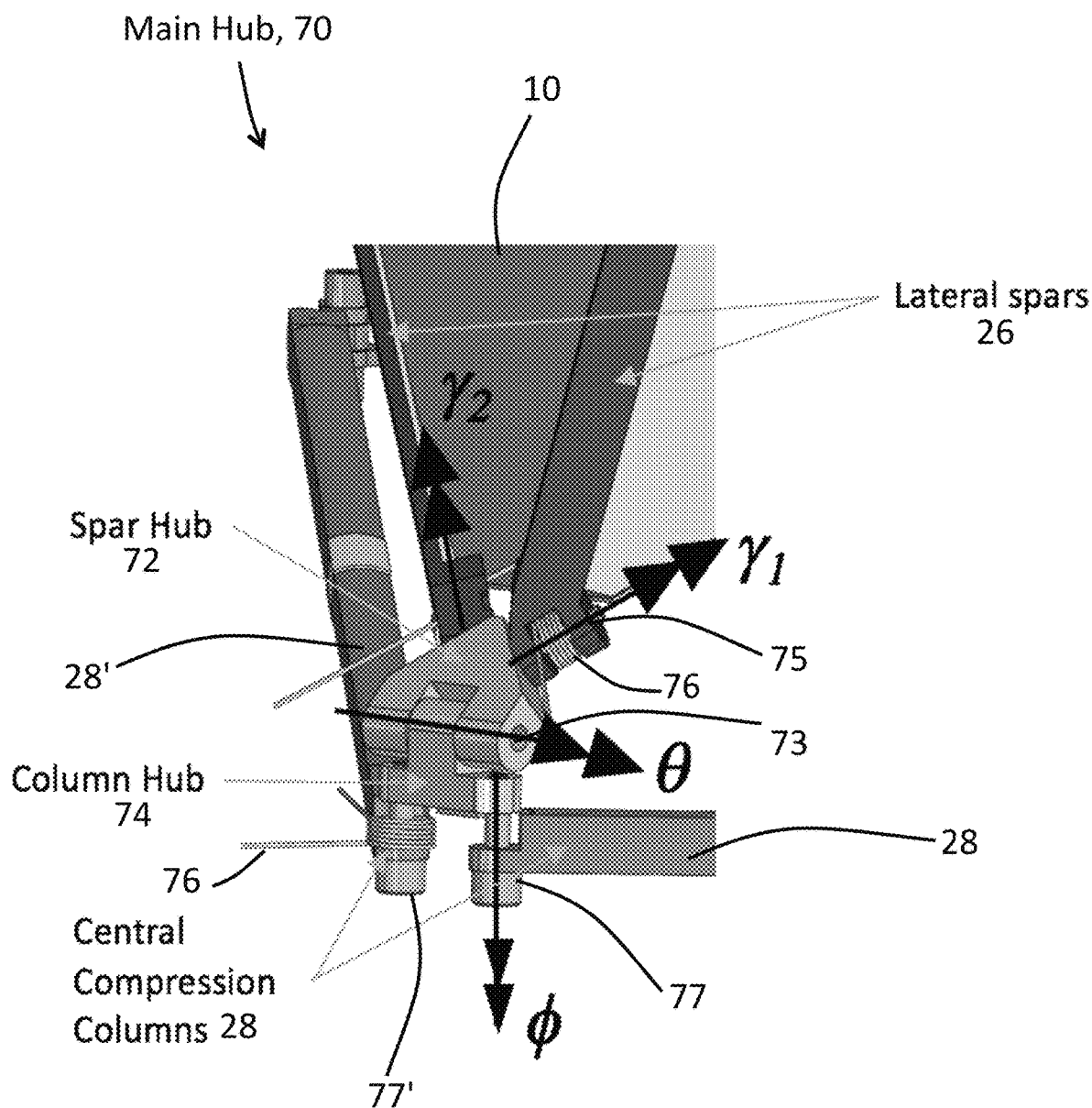

FIG. 89 shows a perspective view of a 5-axis Main Hub.

Figure 90:
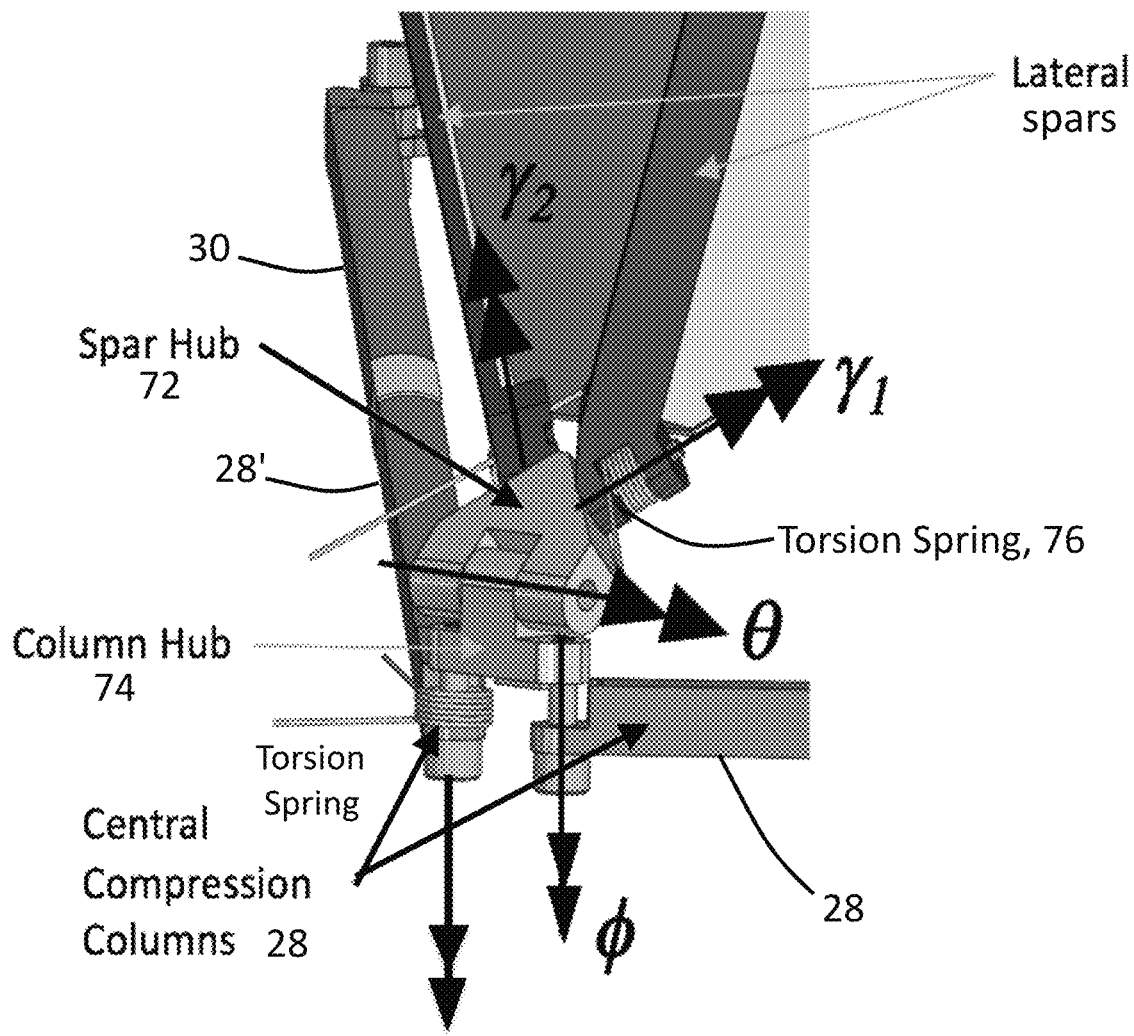

FIG. 90 shows a magnified perspective view of a 5-axis Main Hub.

FIGS. 91-94 show sequential perspective views of the deployment of the 5-axis Main Hub from the packaged to the deployed state.

Figure 97:
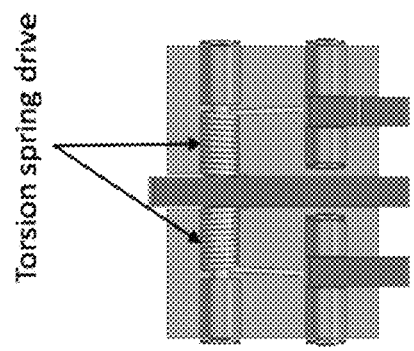
Figure 96:
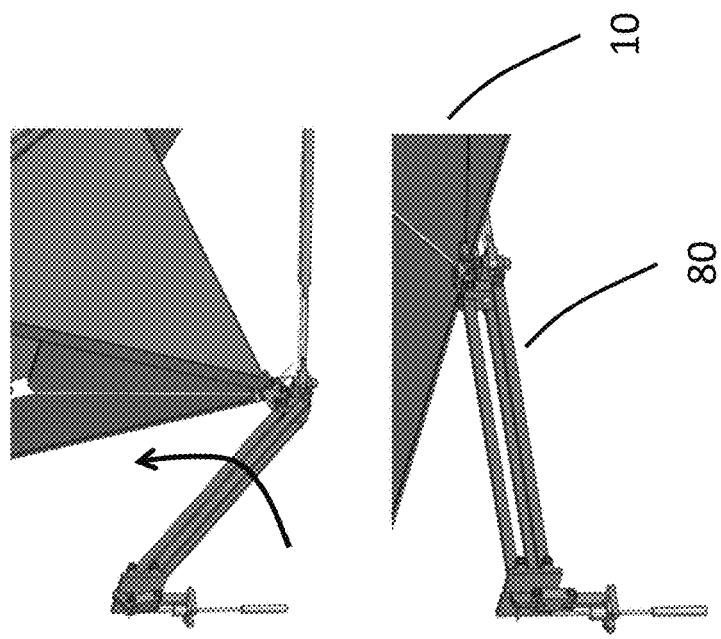
Figure 95:
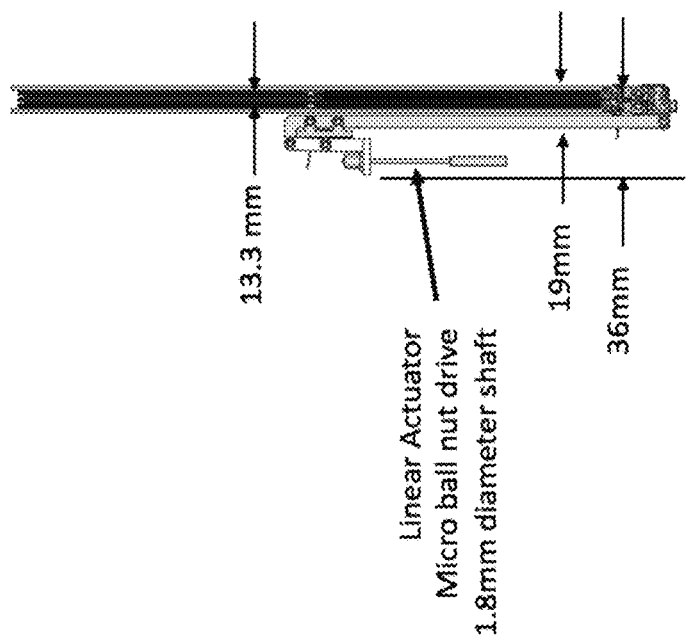

FIGS. 95-97 show perspective views of a parallel four-bar linkage coupling the yoke and compression column elements.

Figure 100:
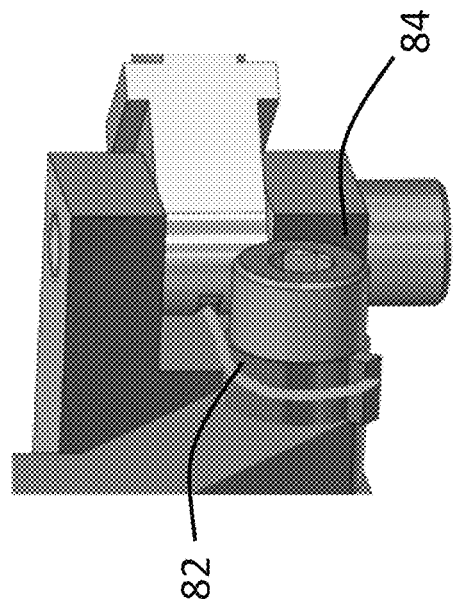
Figure 99:
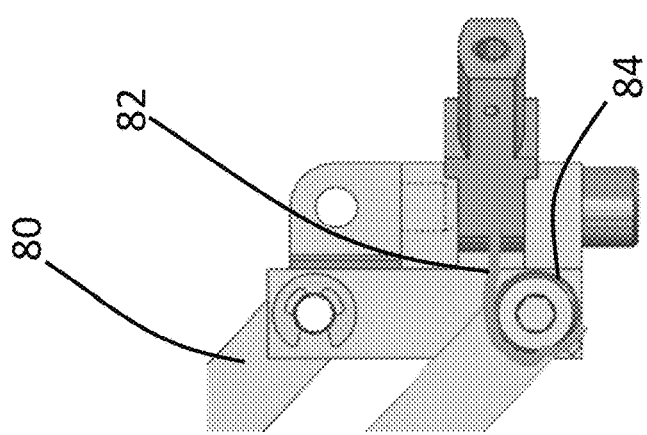
Figure 98:
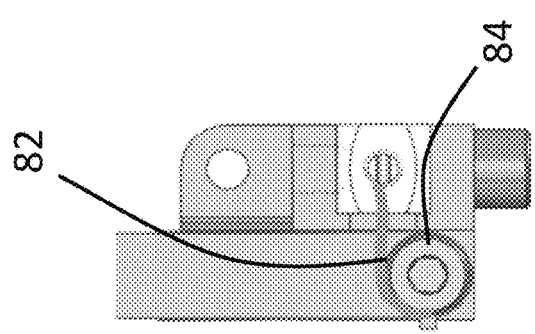

FIGS. 98-100 show perspective views of a parallel four-bar linkage that couples the yoke deployment to the compression column deployment via a flexible torsion band.

Figure 102:
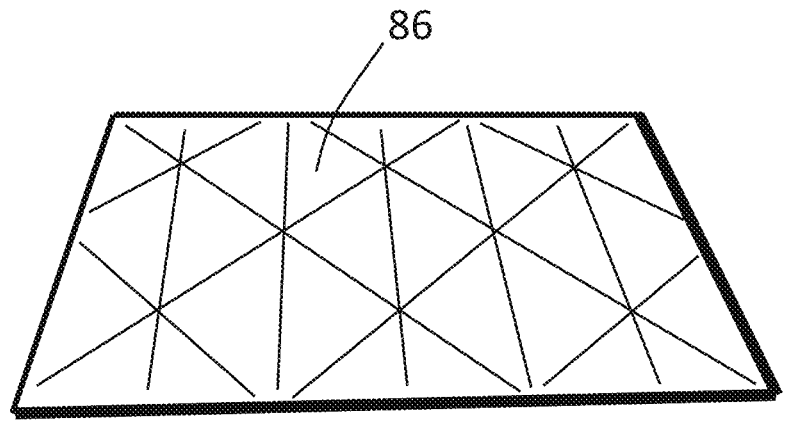
Figure 101:
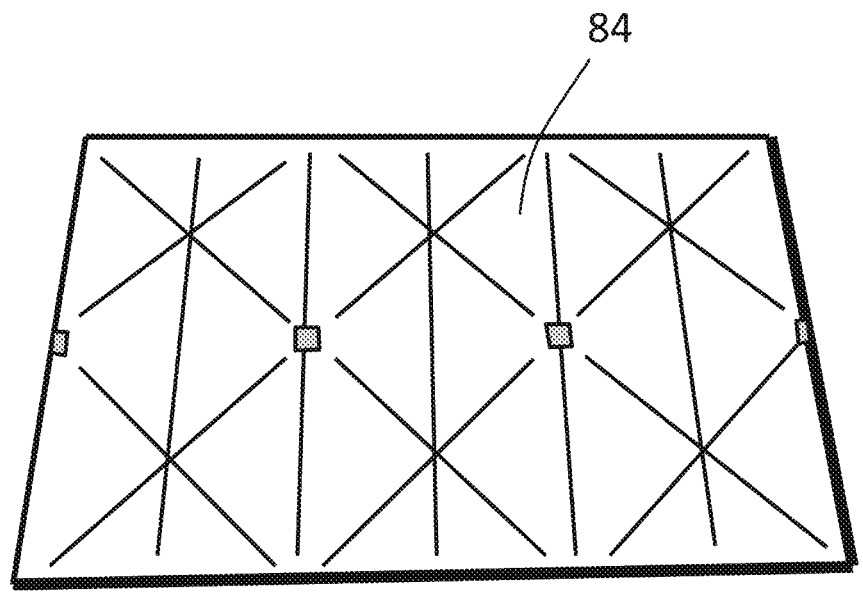

FIGS. 101-102 show perspective views of a the front and backside of a SOAR solar array prototype carbon fiber composite support sheet; and Kapton® backplane.

Figure 103:
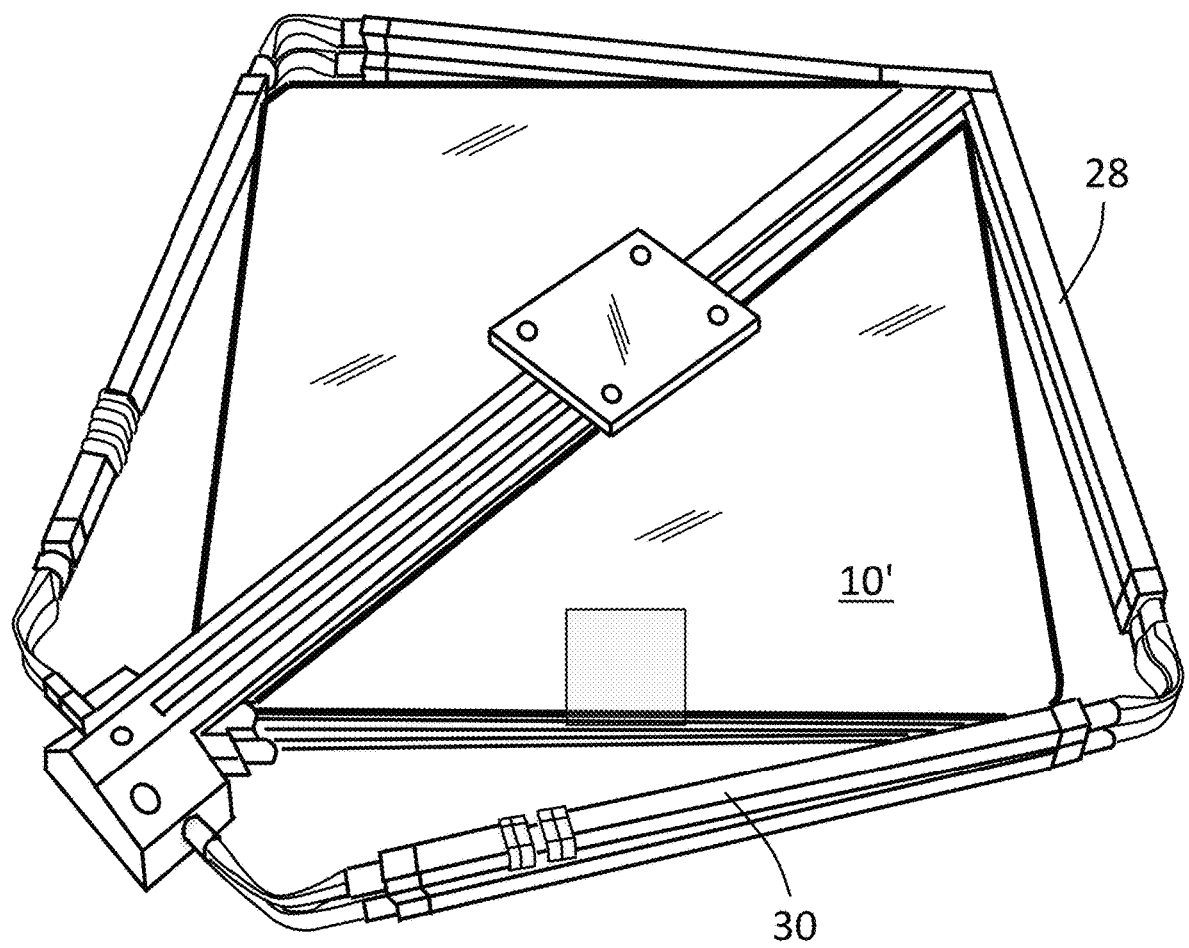

FIG. 103 shows a perspective view of a SOAR solar array prototype with a dual compression column in the packaged (stowed) state.

Figure 104:
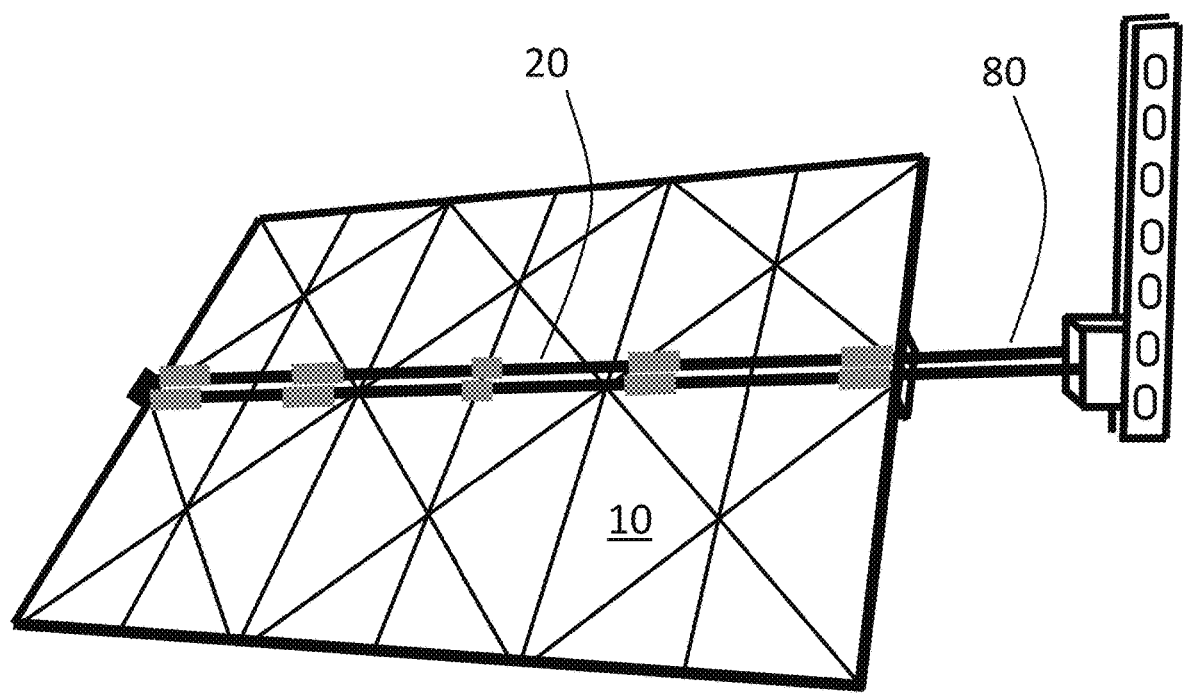

FIG. 104 shows a perspective view of a SOAR solar array prototype with a dual compression column in the deployed (unfolded) state.

FIGS. 105-108 show perspective views of the prototype SOAR solar array showing still images captured from video recording of compression column primary deployment; illustrating that the tape spring hinges successfully deployed the column.

Figure 109:
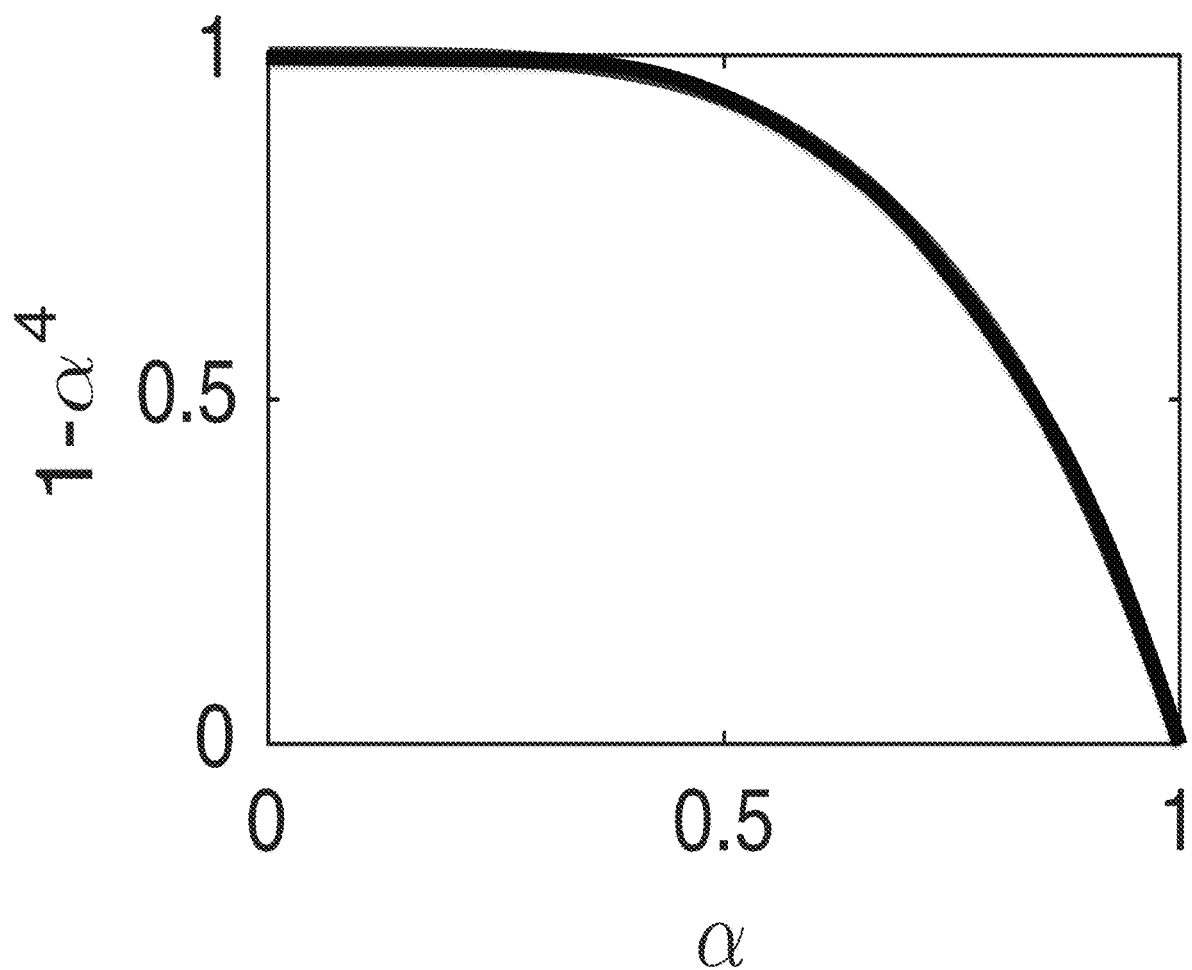

FIG. 109 shows the compression column wall thickness ratio curve.

Figures 110, 111, 112:
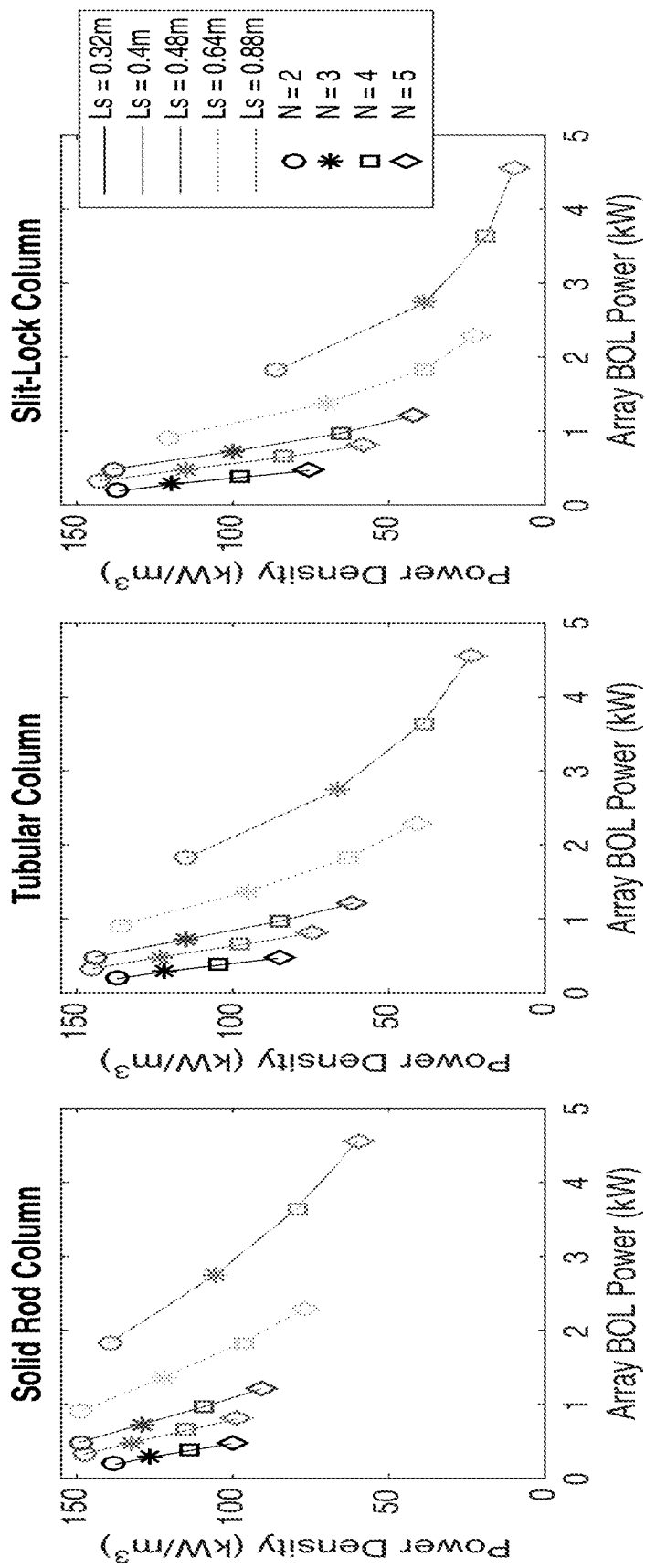

FIGS. 110-112 show performance plots of Power Density versus Array BOL Power for a Solid Rod Column, Tubular Column, and Slit-Lock Column.

Figures 113, 114, 115:
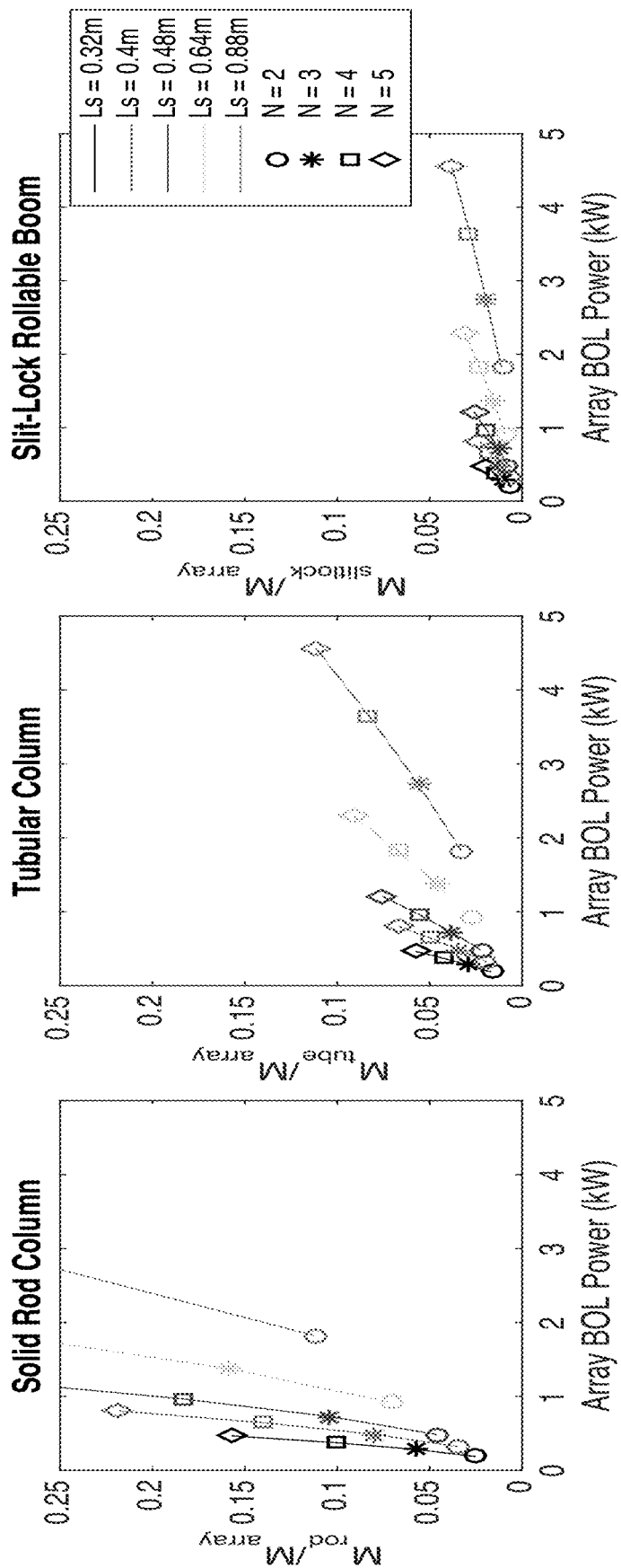

FIGS. 113-115 show performance plots of Mass Ratio versus Array BOL Power for a Solid Rod Column, Tubular Column, and Slit-Lock Column.

Figures 116, 117, 118:
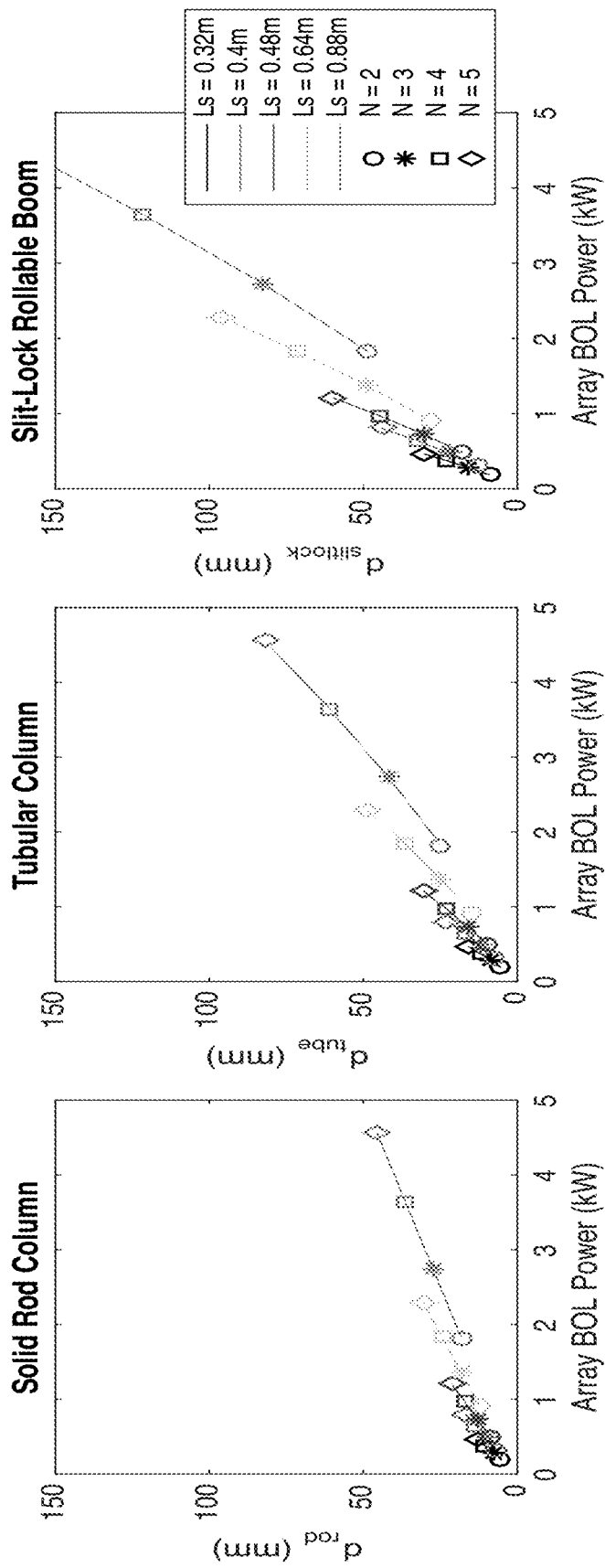

FIGS. 116-118 show performance plots of Boom Column Diameter versus Array BOL Power for a Solid Rod Column, Tubular Column, and Slit-Lock Column.

Figure 119:
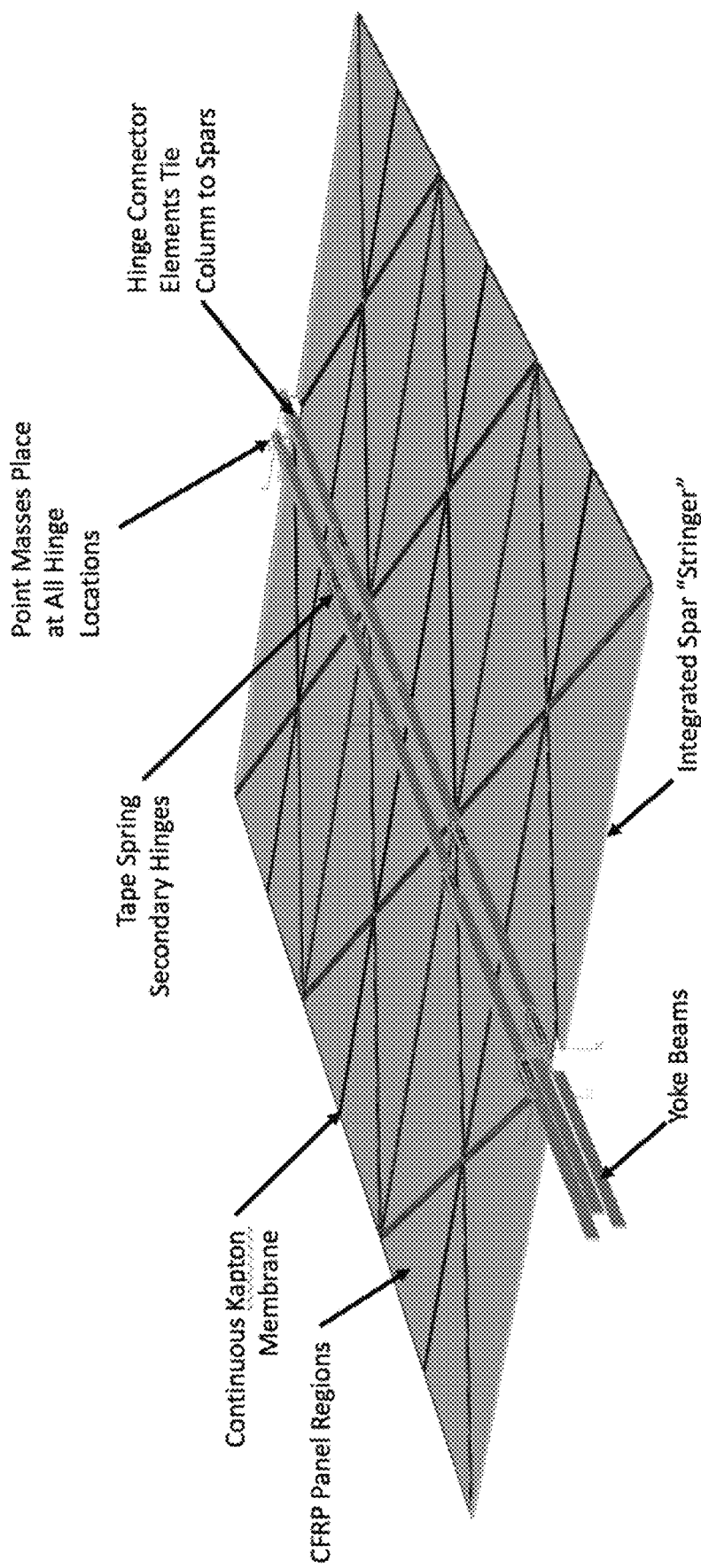

FIG. 119 shows a perspective view of a finite element model of a N=3 SOAR array.

Figure 120:
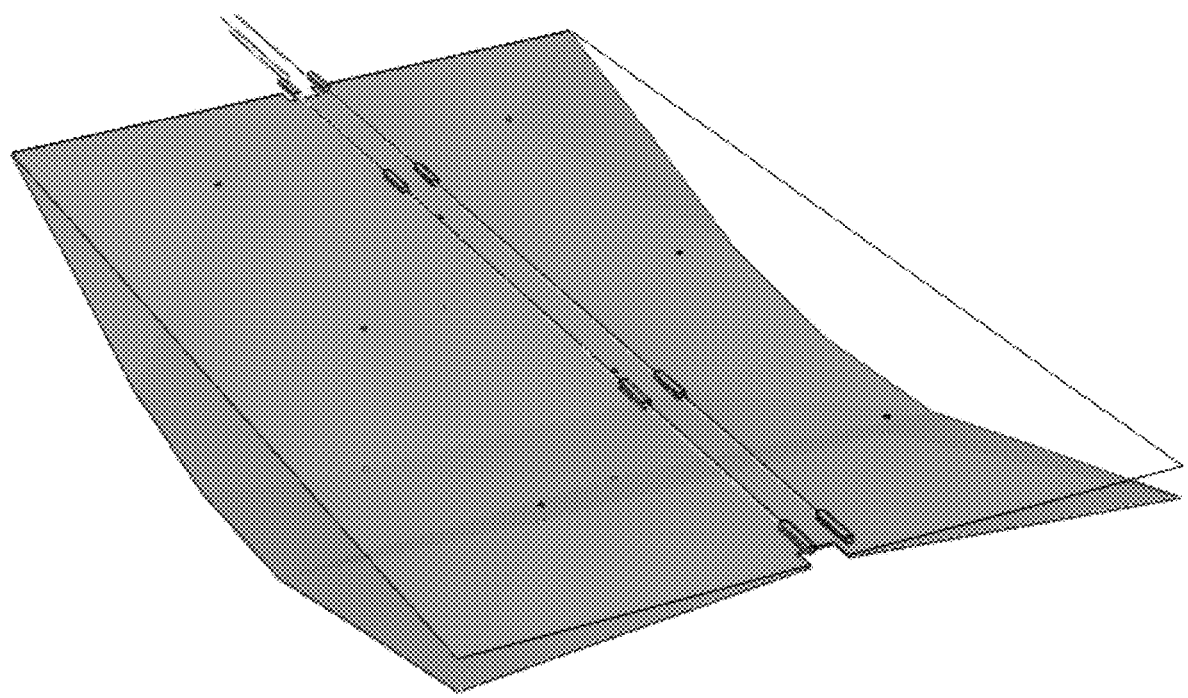

FIG. 120 shows a perspective view of the deflected shape (magnified) finite element model of a N=3 SOAR array illustrating the fundamental mode of vibration.

Figure 121:
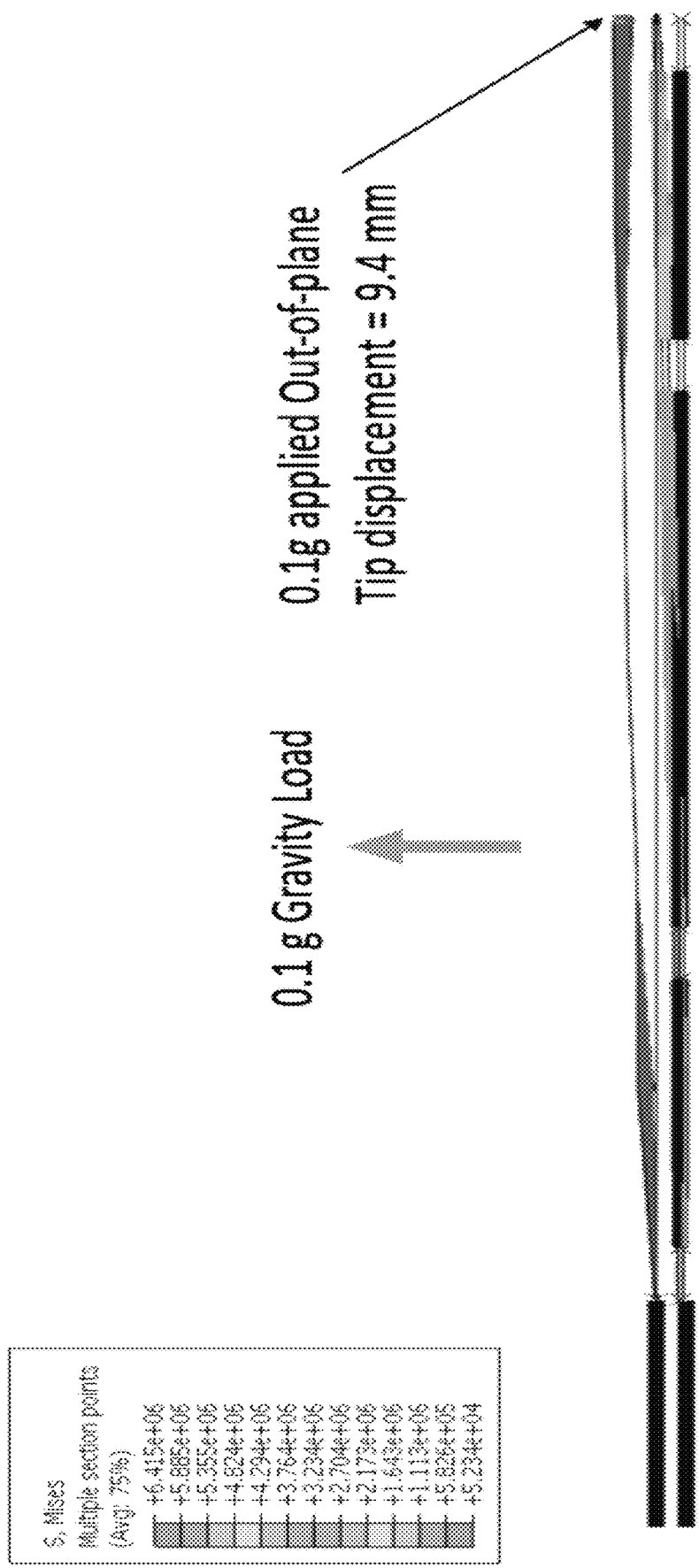

FIG. 121 shows a edge view of the deflected shape (magnified) finite element model of a N=3 SOAR array illustrating the tip deflection due to gravity loads.

Figure 122:
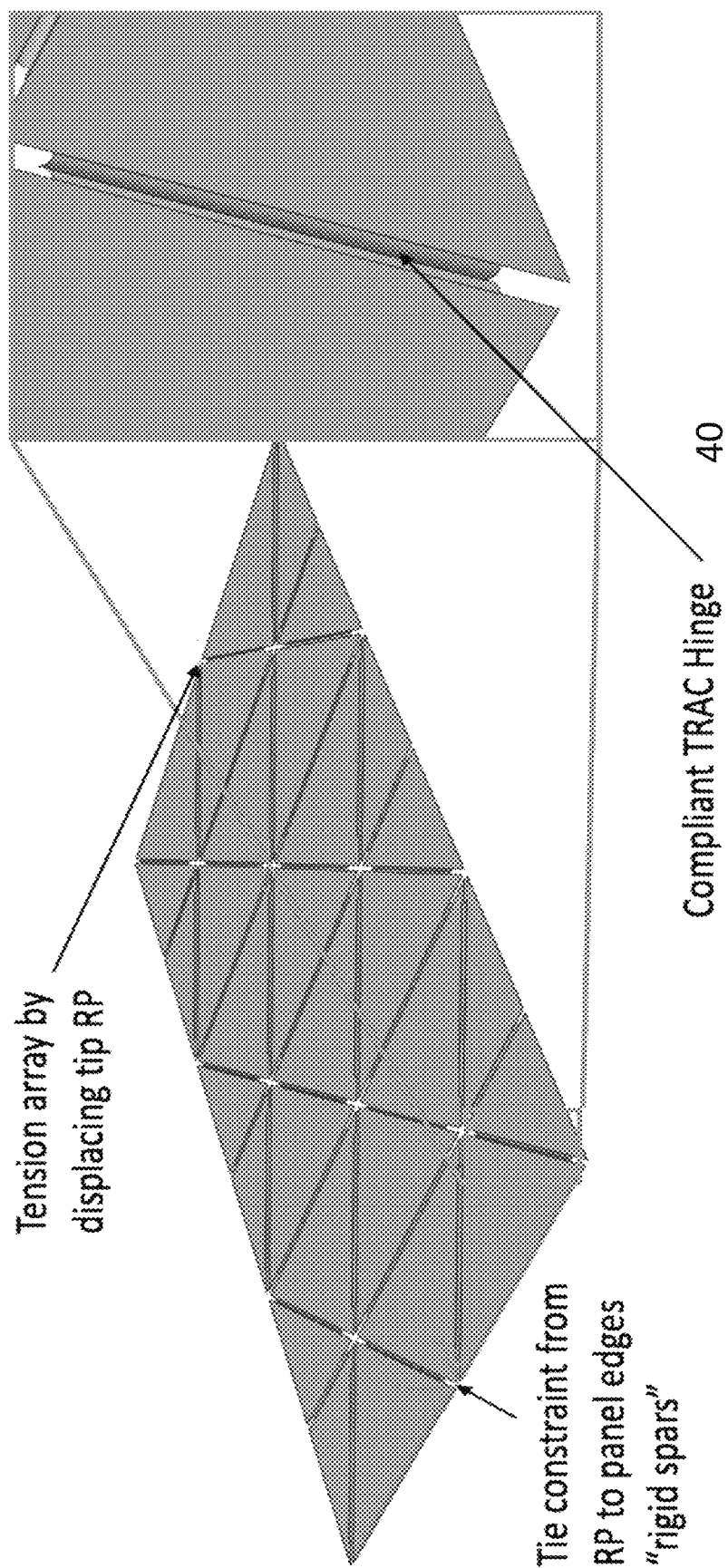

FIG. 122 shows a perspective view of a finite element model of a N=3 SOAR array using compliant Z-folding hinges.

Figure 123:
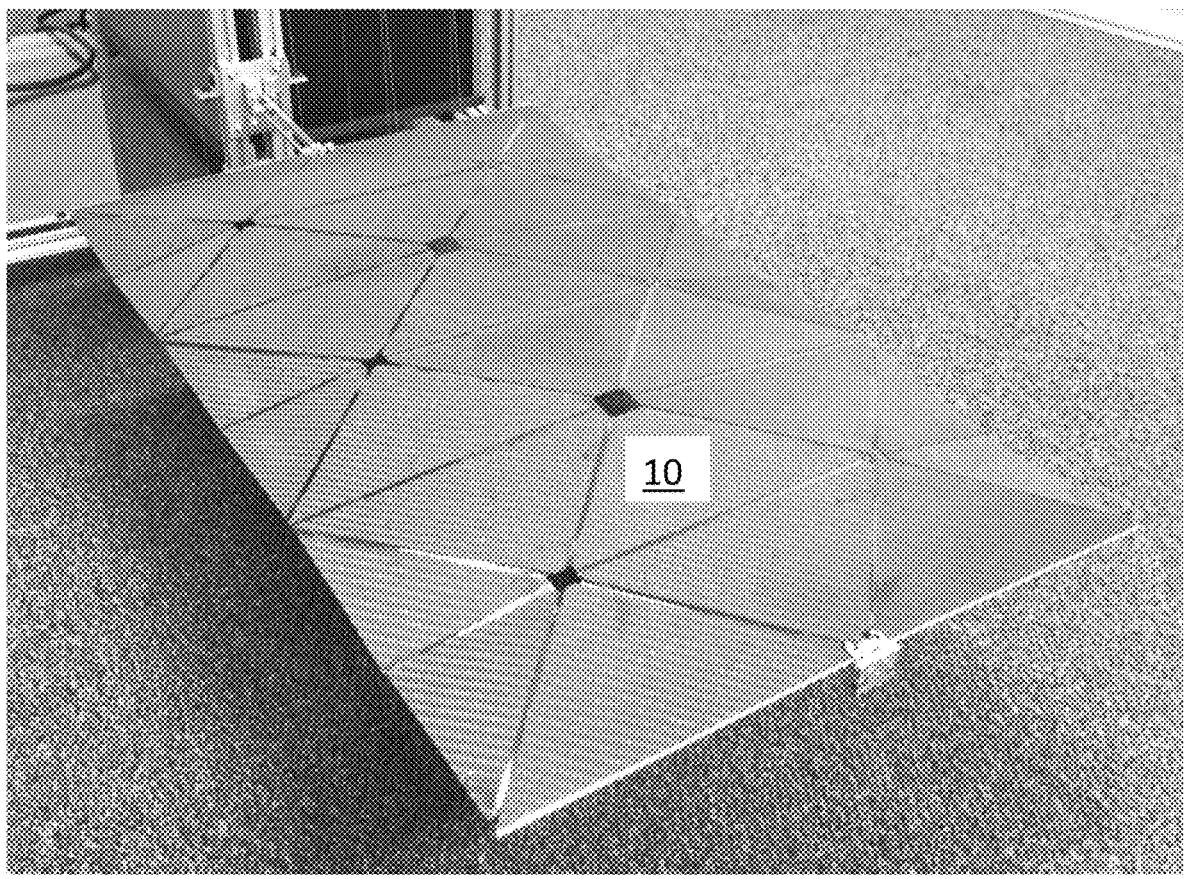

FIG. 123 shows the test article in a horizontal deployed state attached to a gravity-offload system, where the mass of each panel is negated using soft vertical extension springs.

Figure 124:
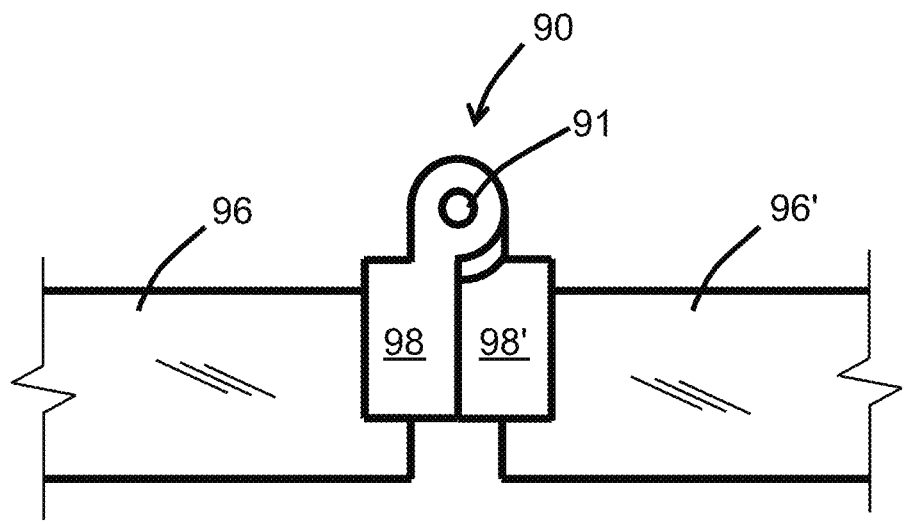

FIG. 124 shows a plan view of an example of a hinge block in a collapsed position, according to the present invention.

Figure 125:
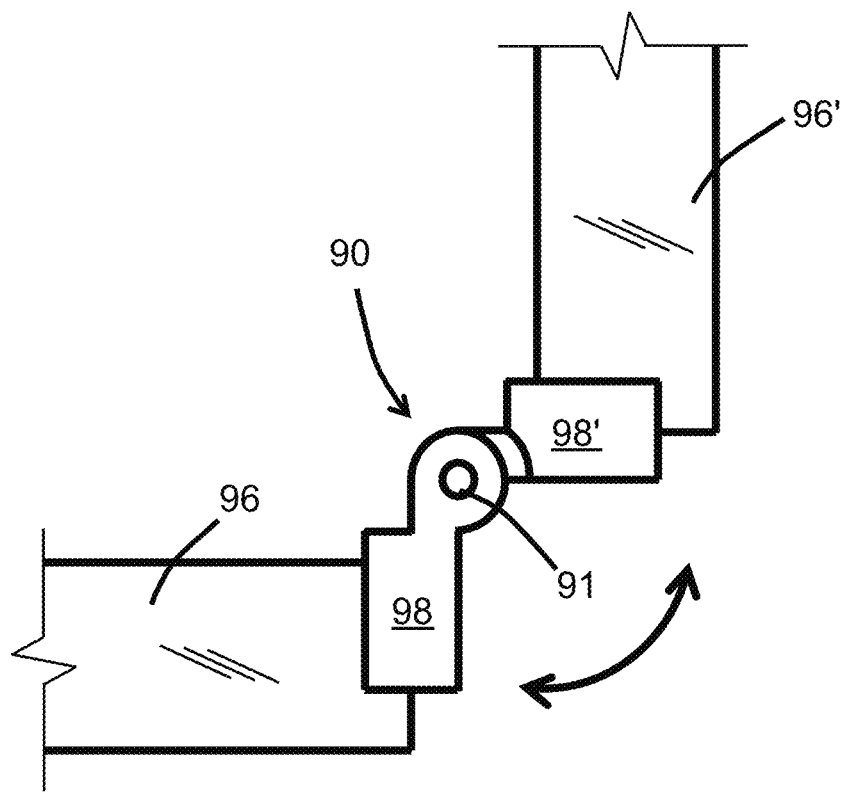

FIG. 125 shows a plan view of an example of a hinge block in an extended position, according to the present invention.

Figure 126:
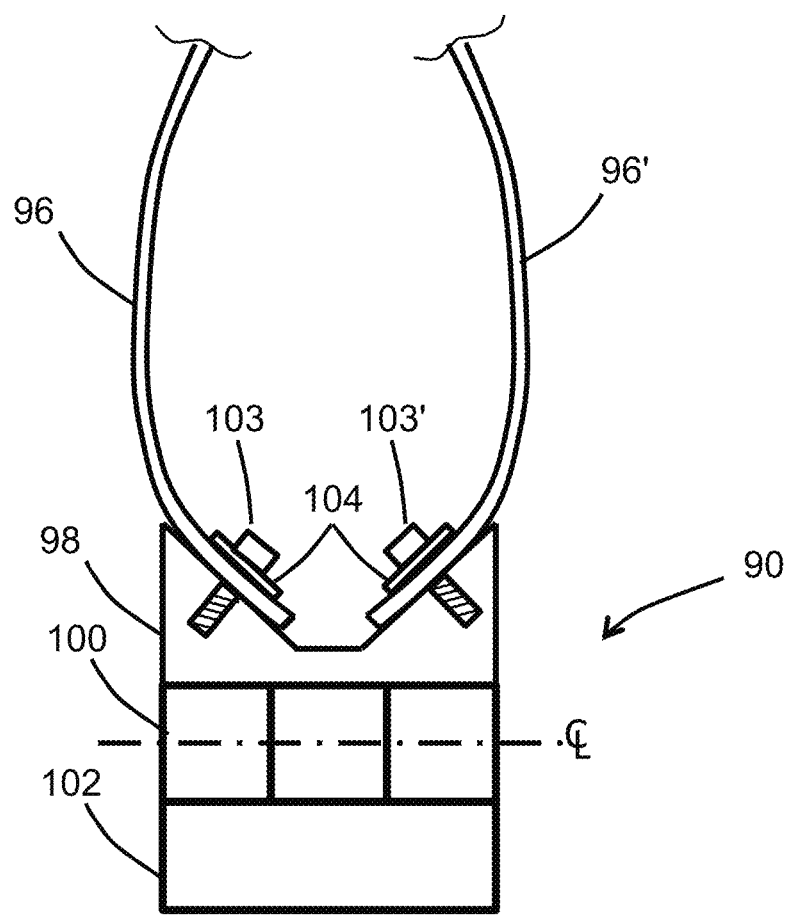

FIG. 126 shows an end view of an example of a hinge block, according to the present invention.

Figure 127:
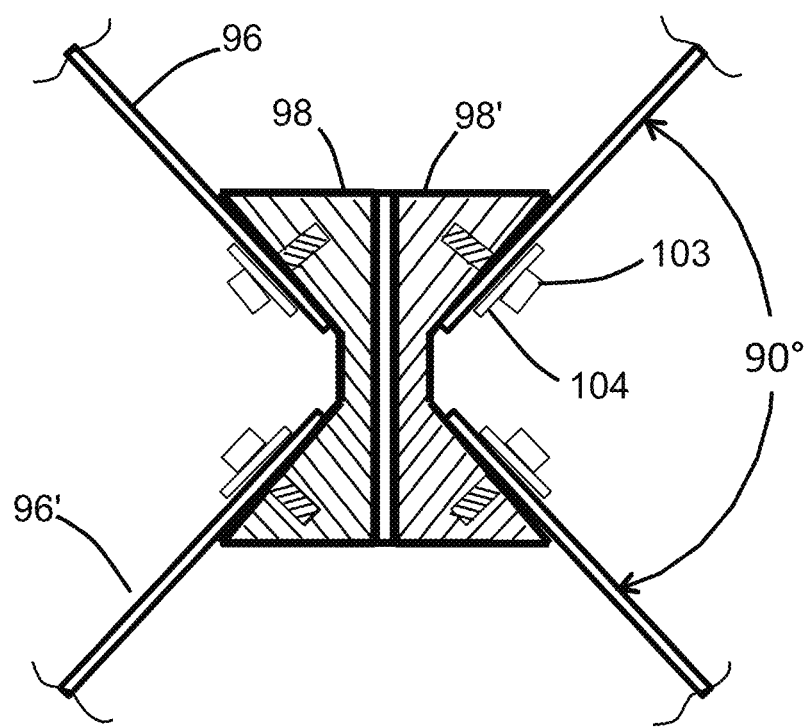

FIG. 127 shows a cross-section view of an example of a hinge block, according to the present invention.

Figure 128:
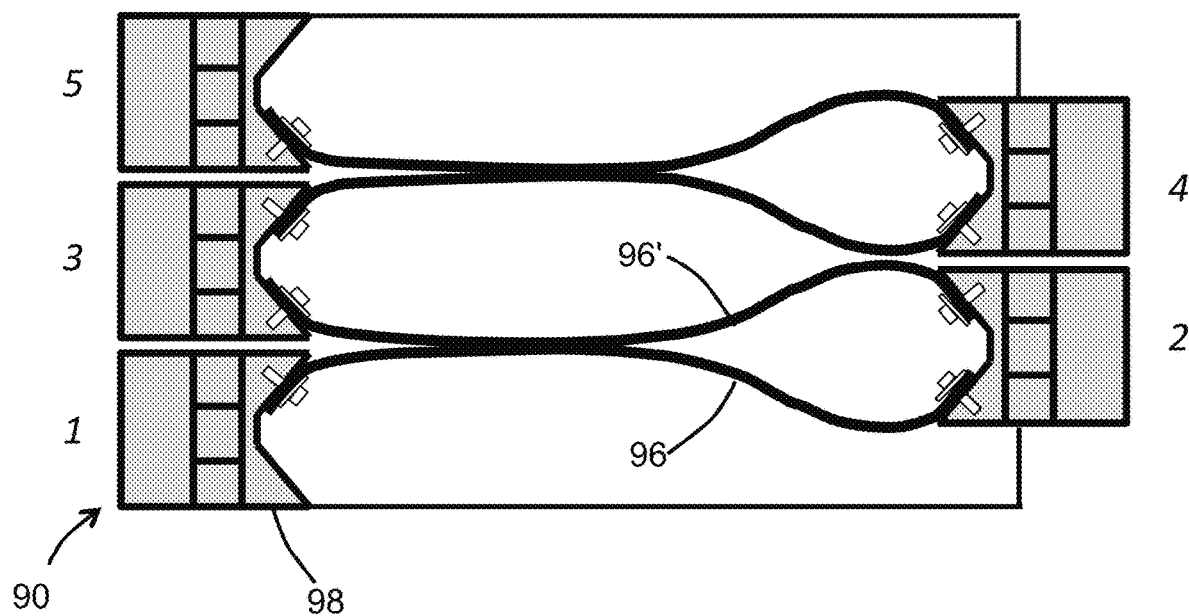

FIG. 128 shows a end view of an example of folded stack of panels, showing hinge blocks No. 1-5 and connecting composite tape, according to the present invention.

Figure 129:
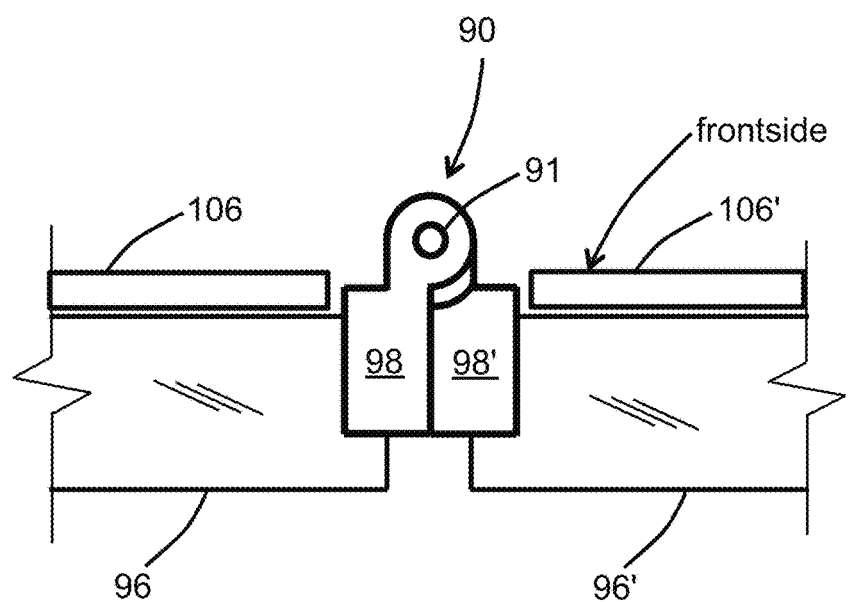

FIG. 129 shows an end view of an example of a hinge block in a deployed array comprising a pair of panels, according to the present invention.

Figure 130:
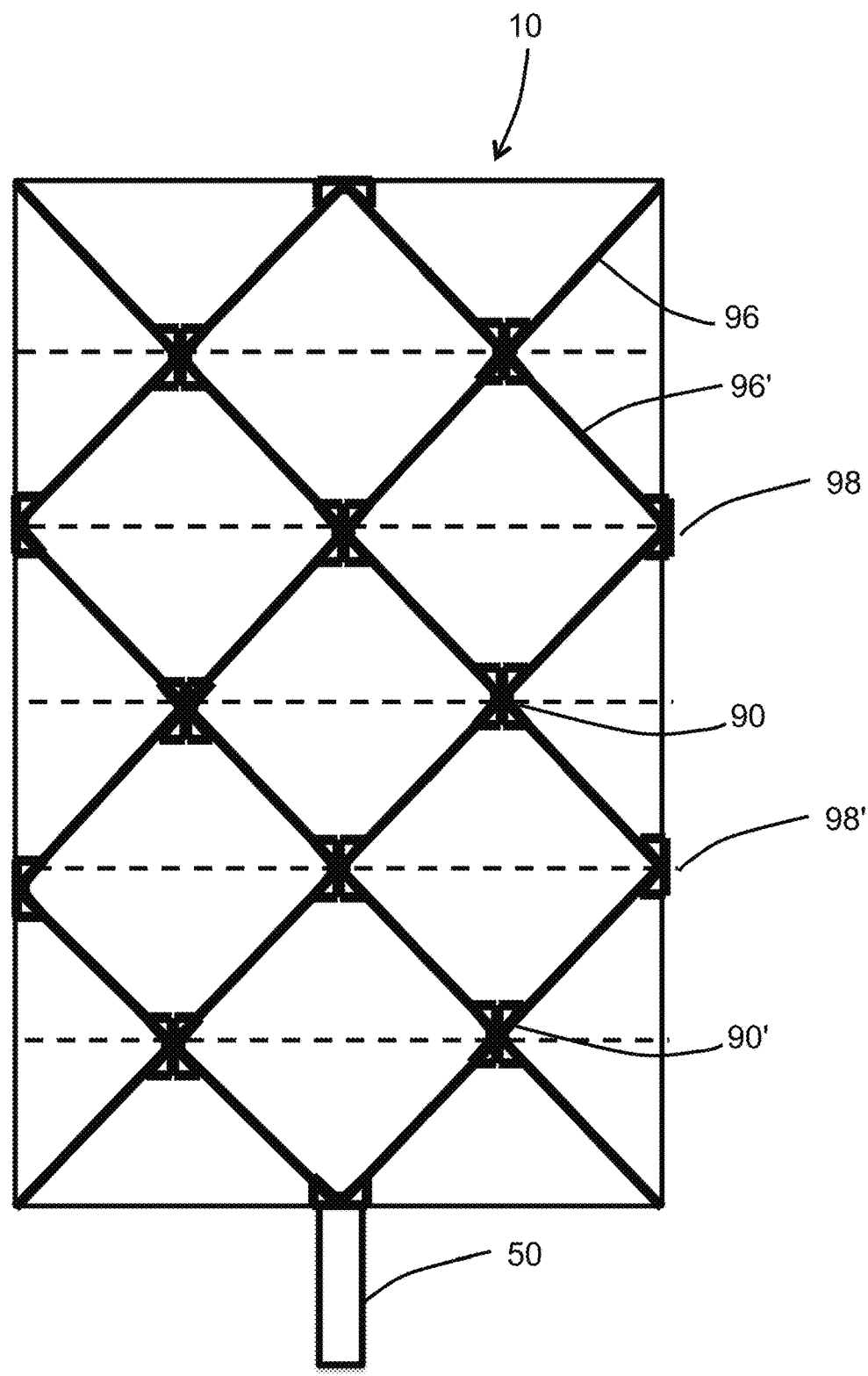

FIG. 130 shows a plan view of an example of a deployed array with supporting lattice structure, according to the present invention.

Figure 131:
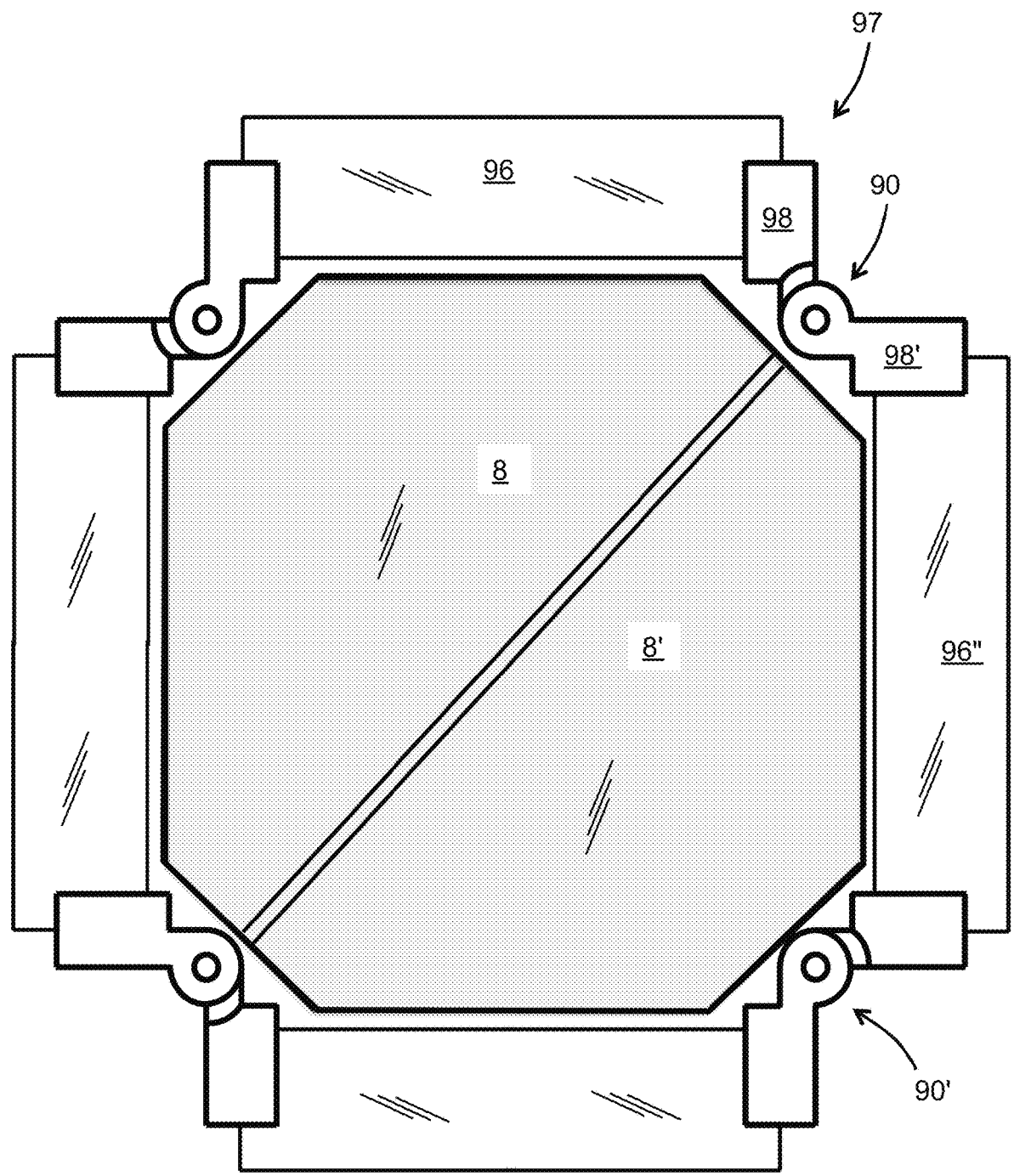

FIG. 131 shows a plan view of an example of a folded stack of panels, according to the present invention.

Figure 132:
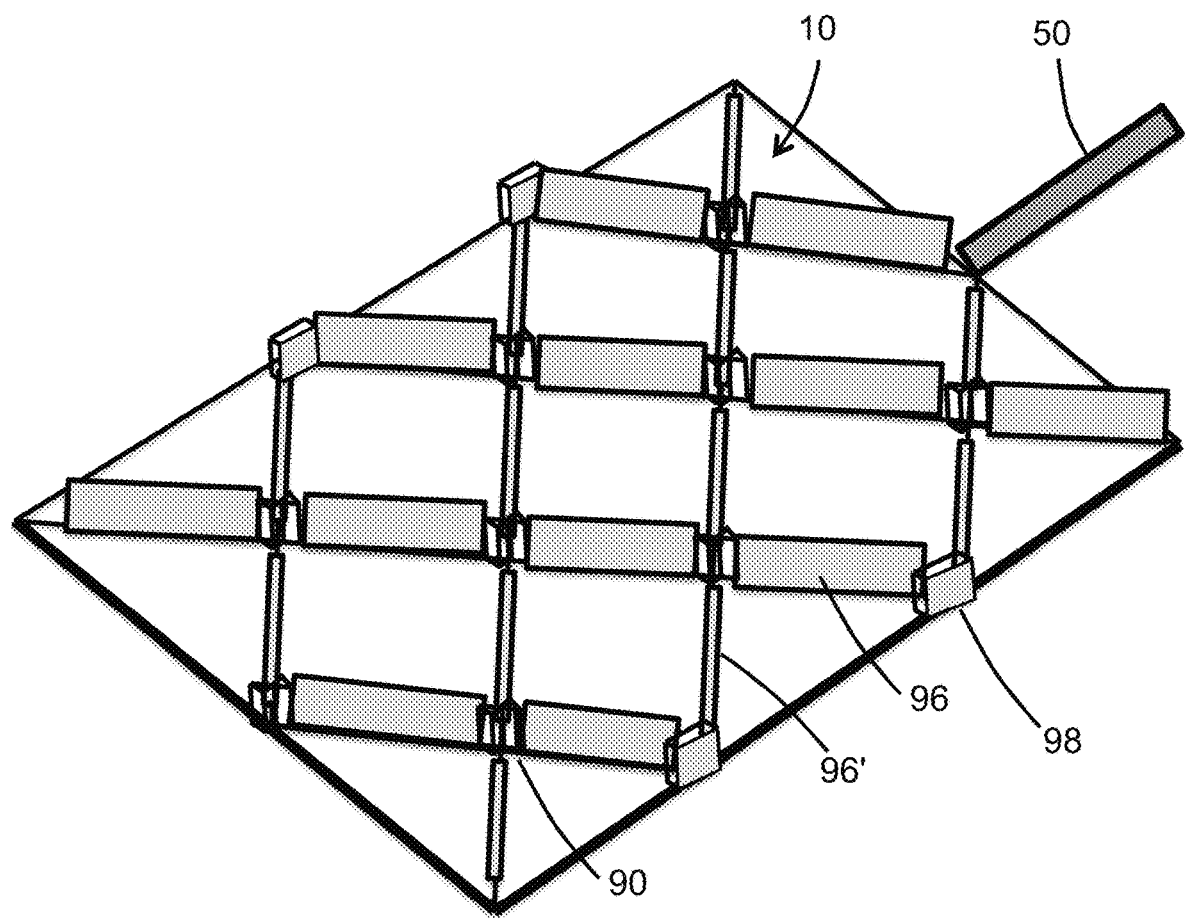

FIG. 132 shows a perspective view of an example of an deployed array with supporting lattice structure, according to the present invention.

Figure 133:
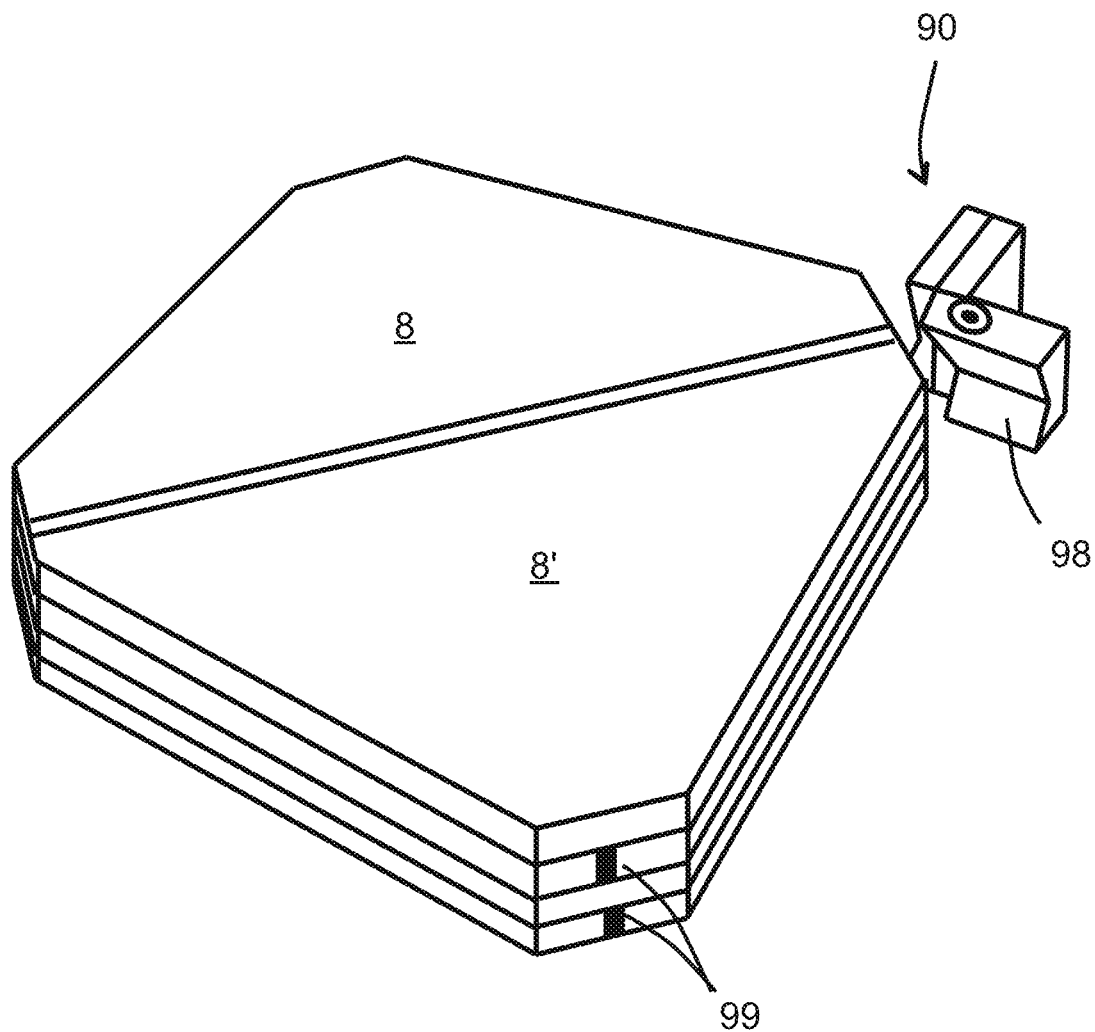

FIG. 133 shows a perspective view of an example of a folded stack of panels, according to the present invention.

Figure 134:
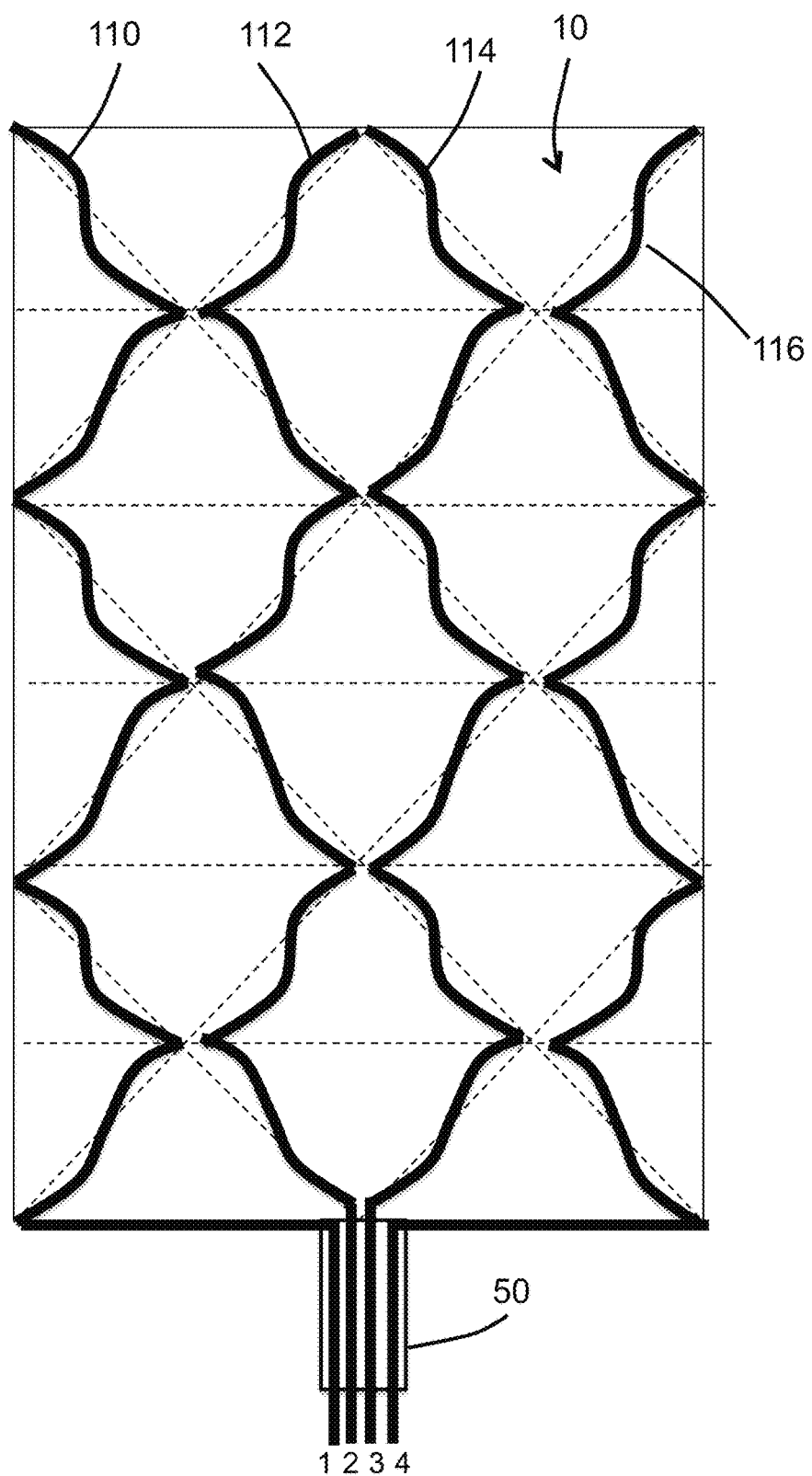

FIG. 134 shows a plan view of an example of an deployed array with electrical wire harnessing, according to the present invention.

Figure 135:
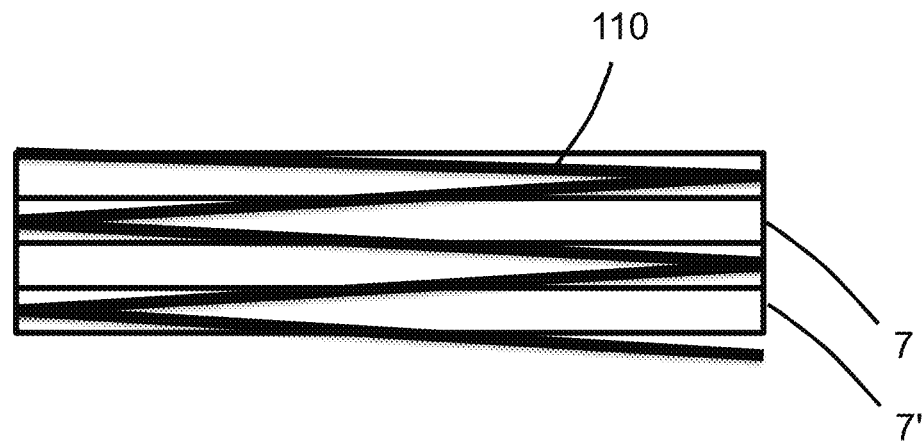

FIG. 135 shows an end view of an example of an folded stack of panels and an electrical wire harness, according to the present invention.

Figure 136:
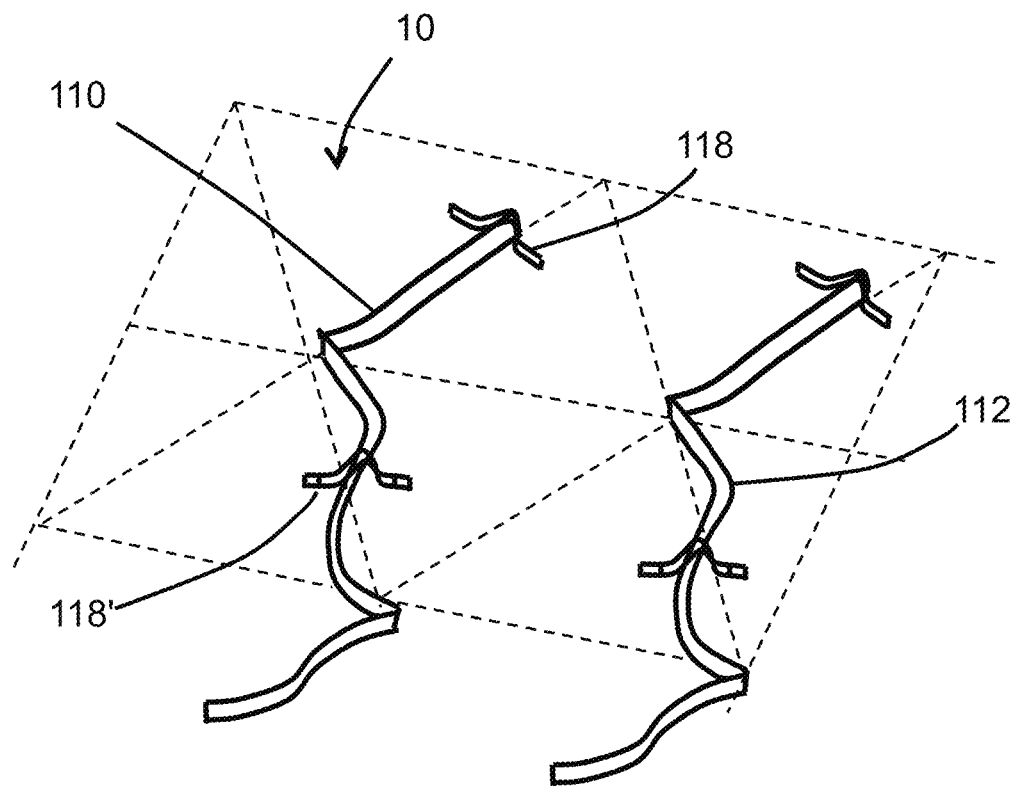

FIG. 136 shows a perspective view of an example of an deployed array with electrical wire harnessing, according to the present invention.

Figure 137:
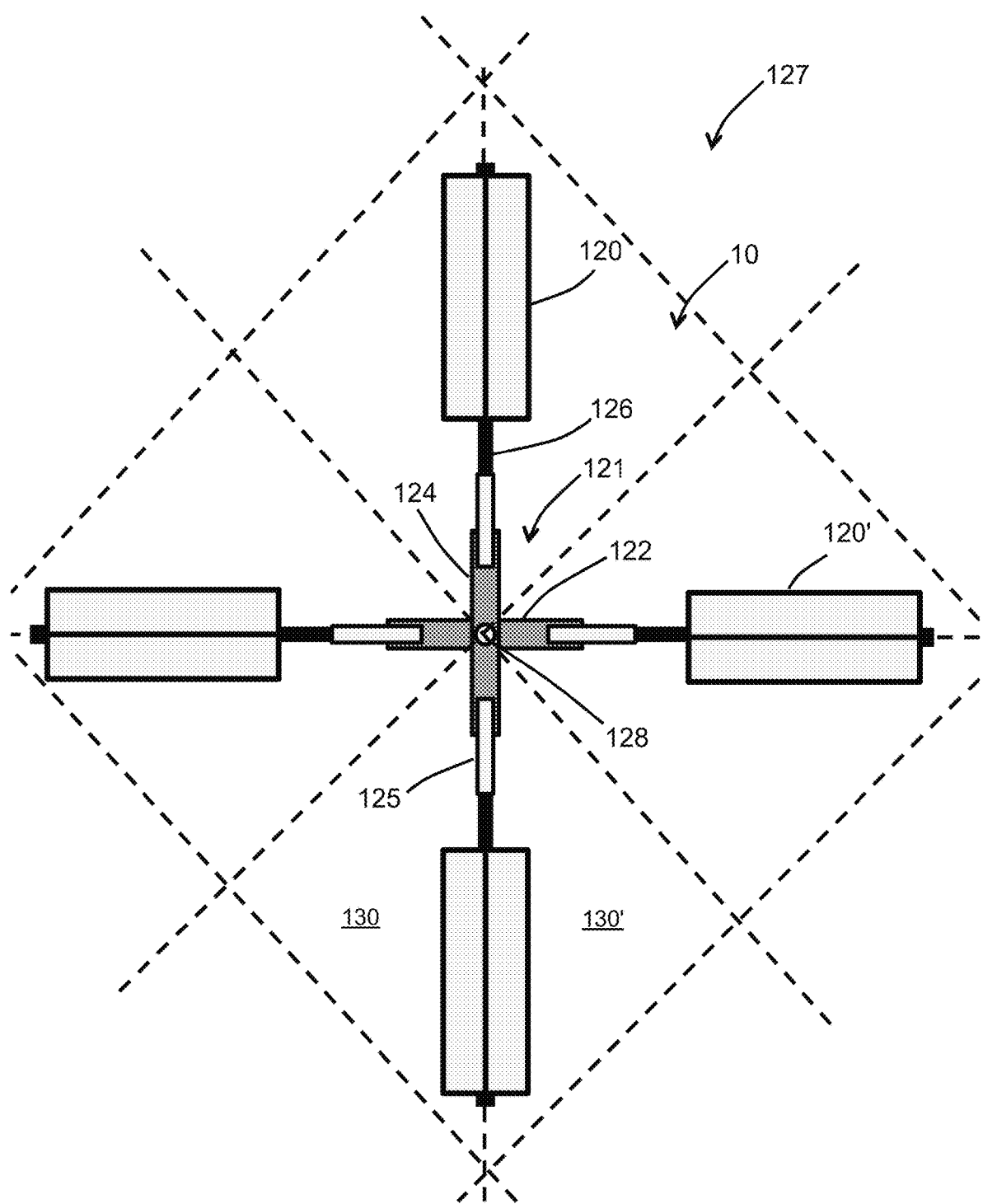

FIG. 137 shows a plan view of a first example of a backside support structure, according to the present invention.

Figure 138:
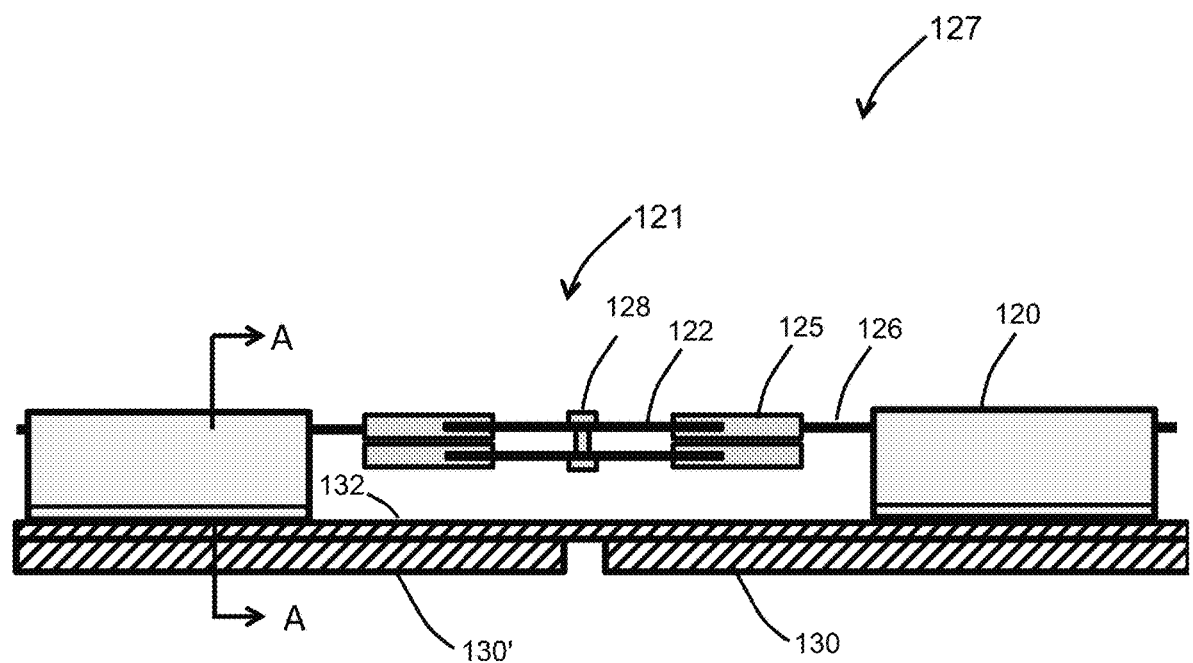

FIG. 138 shows an end view of a first example of a backside support structure, according to the present invention.

Figure 139:
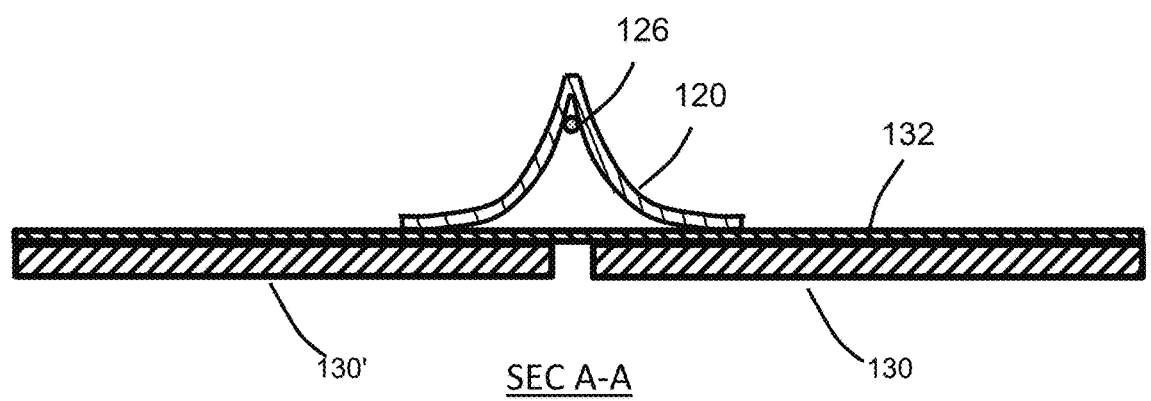

FIG. 139 shows a cross-section end view of a first example of a compliant Z-folding hinge, according to the present invention.

Figure 140:
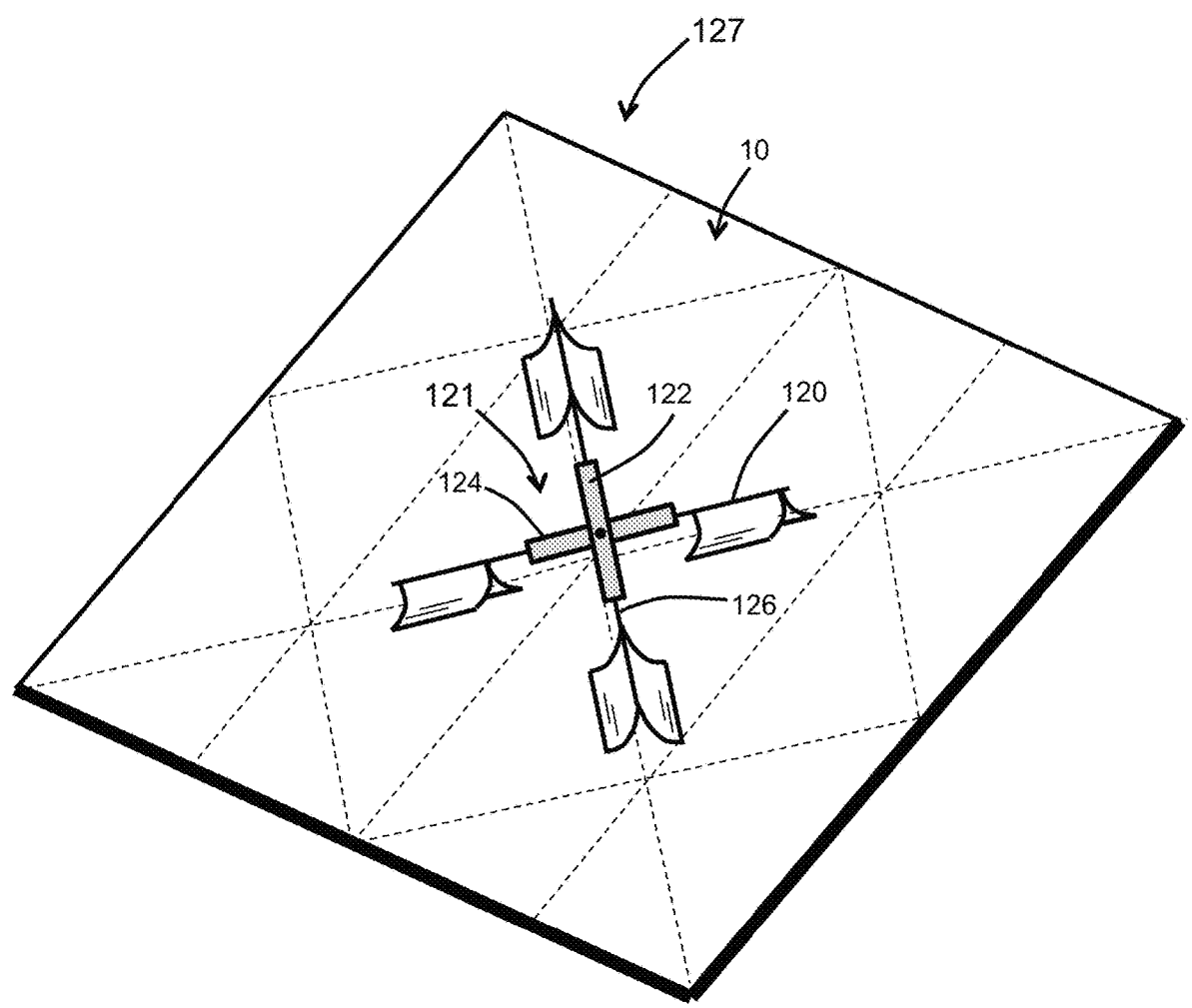

FIG. 140 shows a perspective view of a first example of a deployed array with a backside support structure, according to the present invention.

Figure 141:
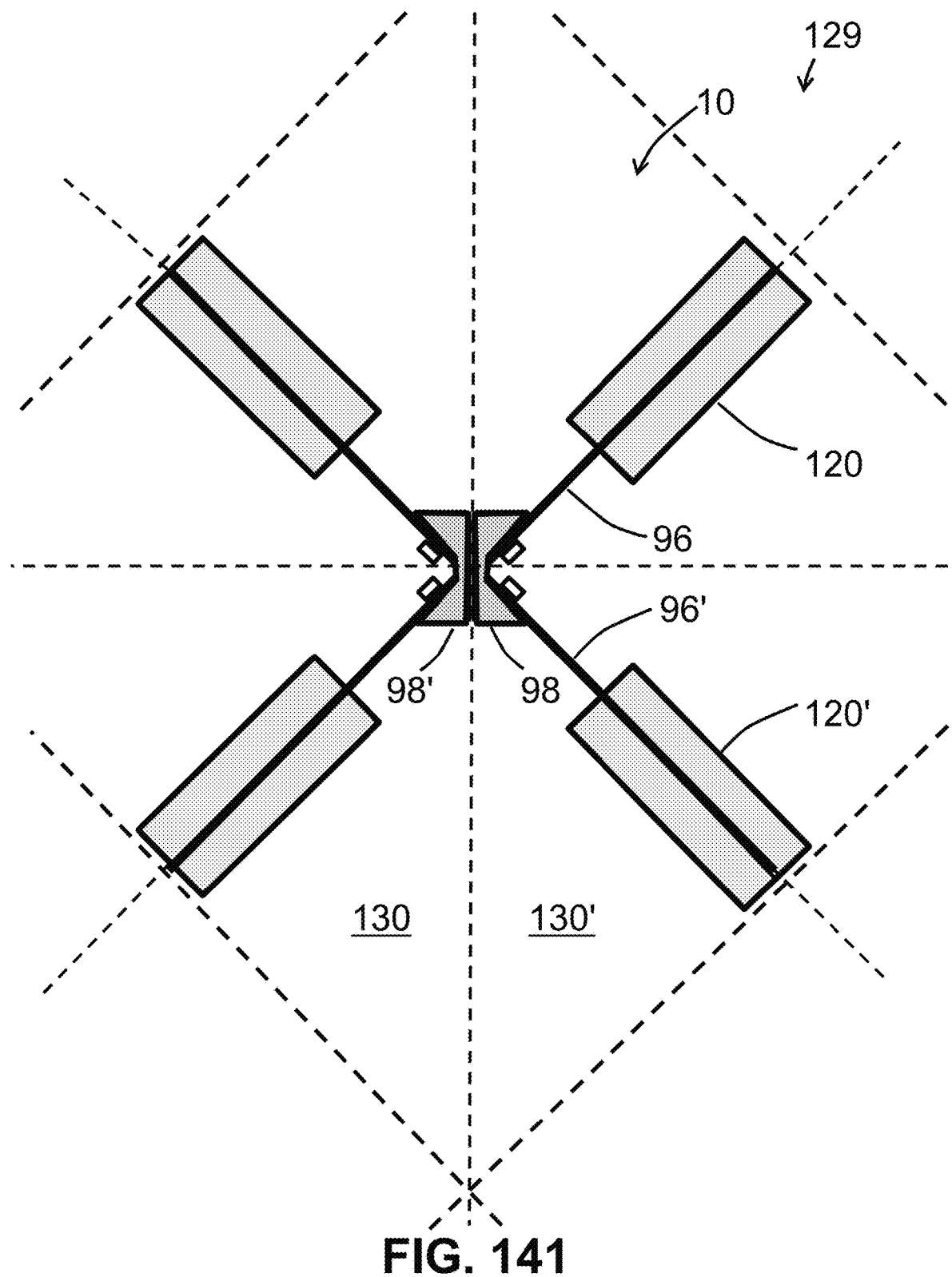

FIG. 141 shows a plan view of a second example of a deployed array with a backside support structure, according to the present invention.

Figure 142:
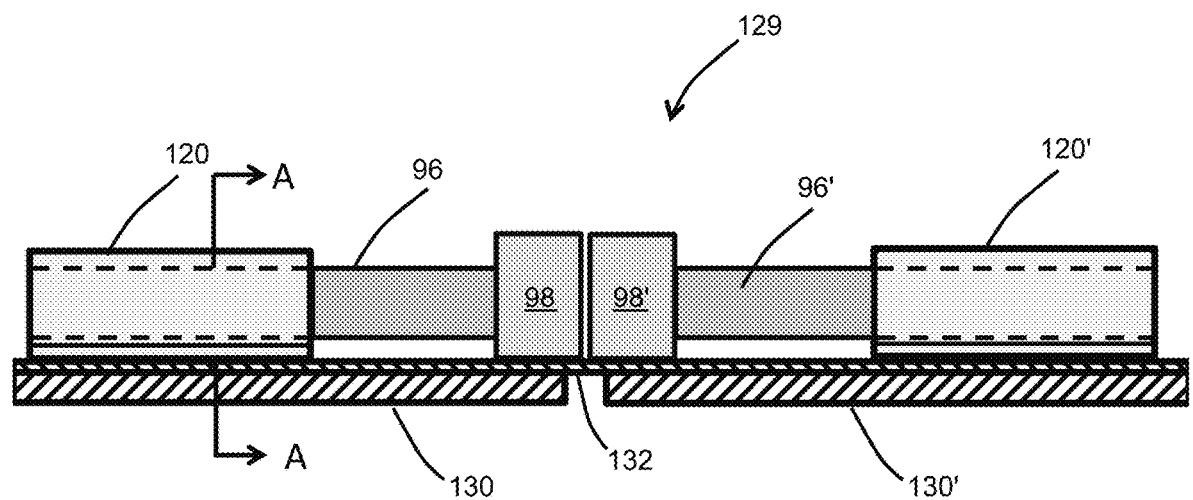

FIG. 142 shows an end view of a second example of a backside support structure, according to the present invention.

Figure 143:
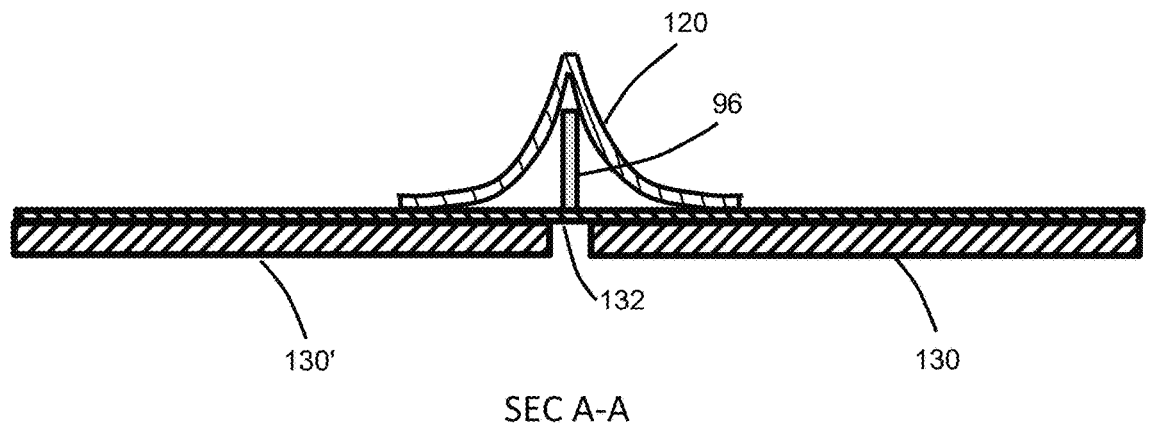

FIG. 143 shows a cross-section view of a second example of a compliant Z-folding hinge with composite tape inside the hinge, according to the present invention.

Figure 144:
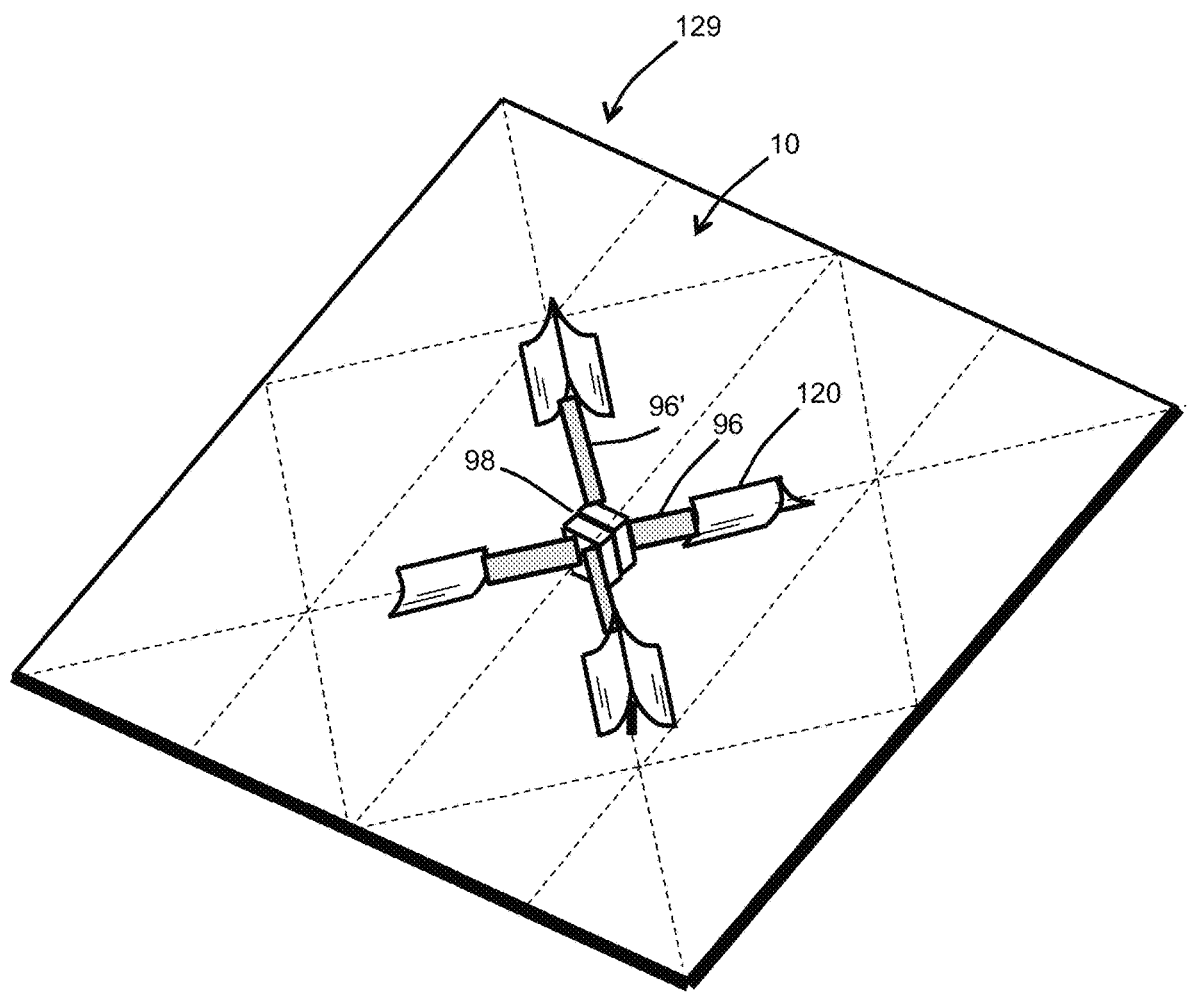

FIG. 144 shows a perspective view of a second example of a deployed array with a backside support structure, according to the present invention.

Figure 145:
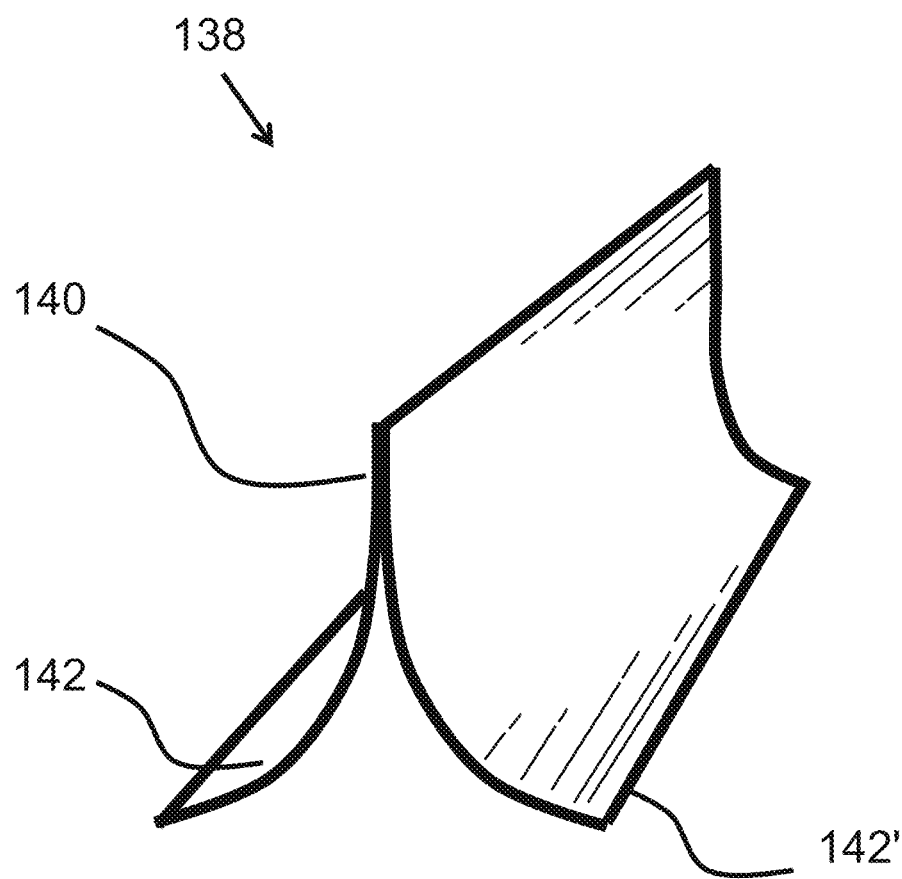

FIG. 145 shows a perspective view of a compliant Z-folding hinge being deployed from a spool.

Figure 146:
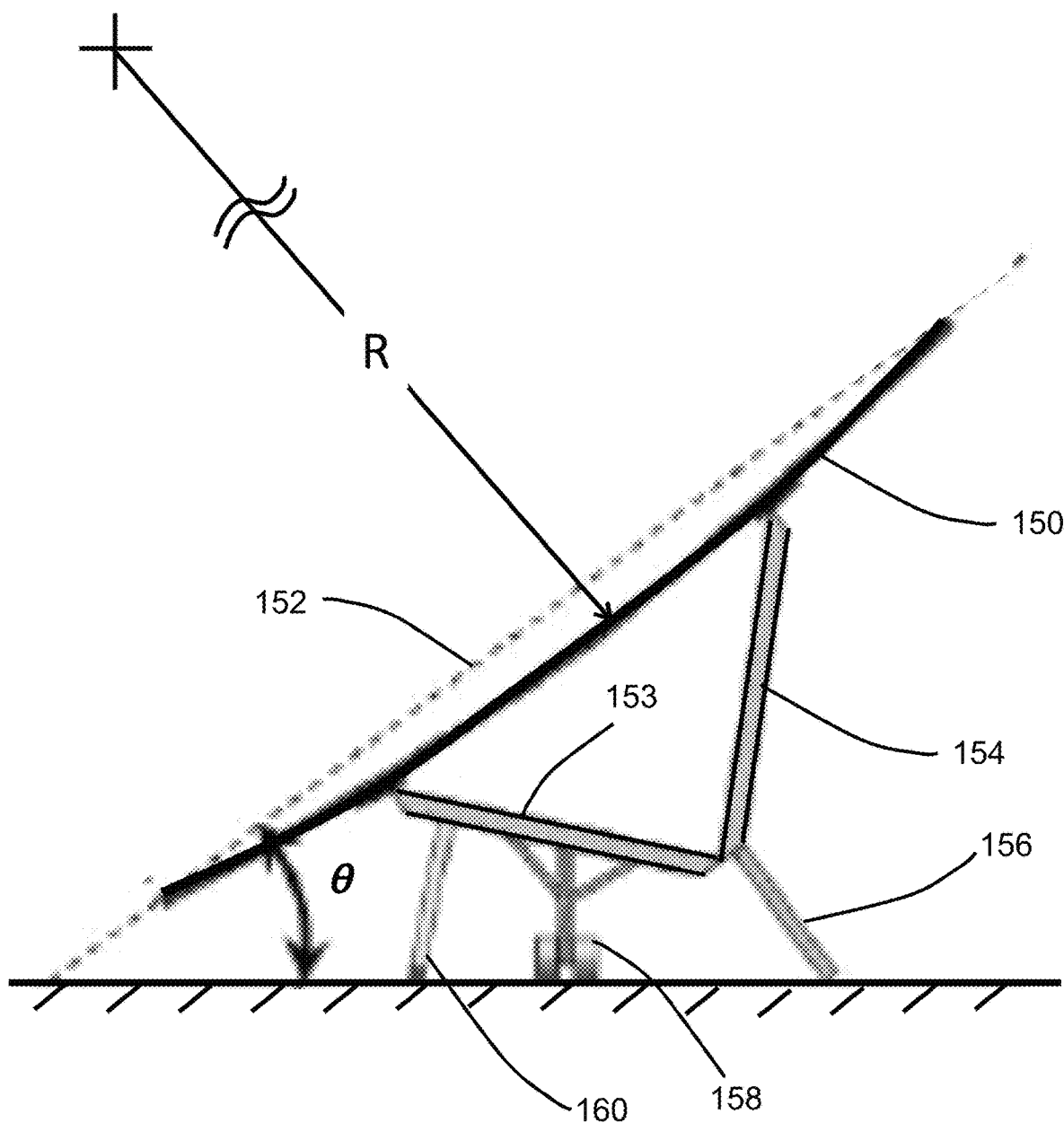

FIG. 146 shows an elevation view of an example of a curved META array deployed on the ground with supporting legs, according to the present invention.

Figure 147:
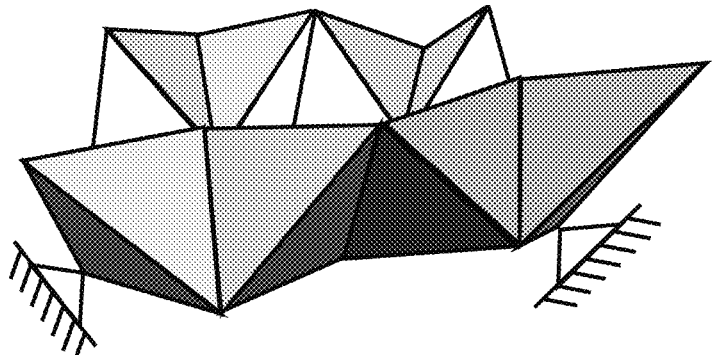
Figure 148:
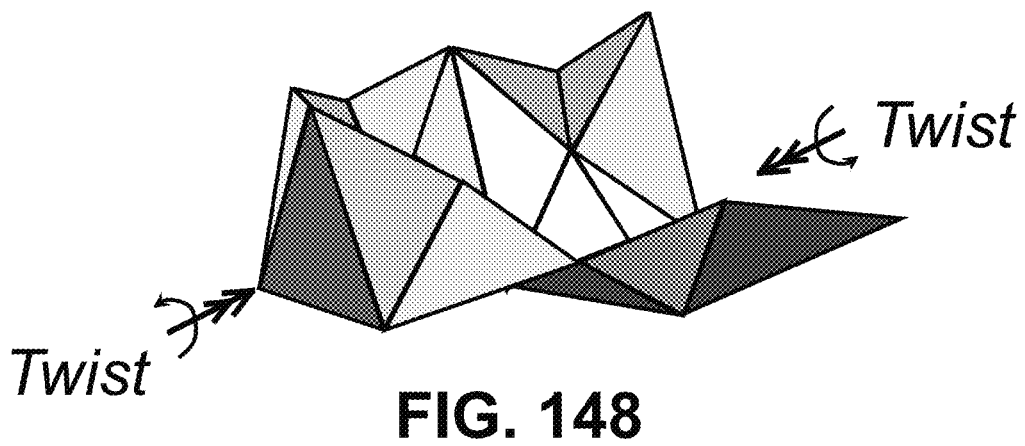
Figure 149:
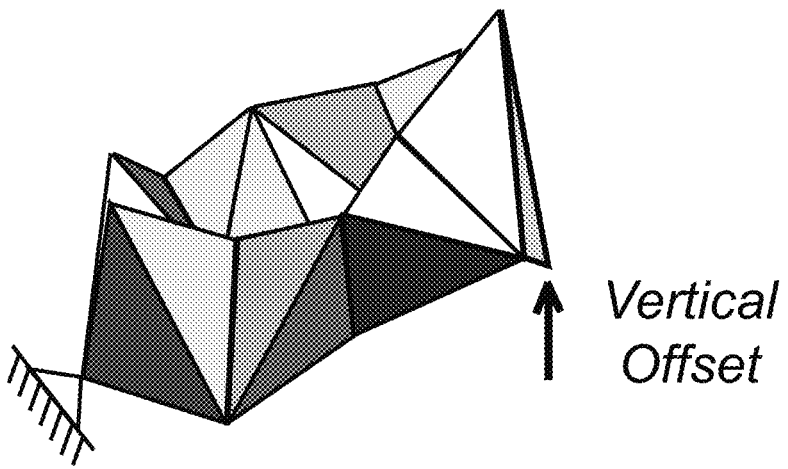

FIGS. 147-149 show a sequence of perspective views of a partially-deployed SOAR array model, in various offset configurations, according to the present invention.

Figure 150:
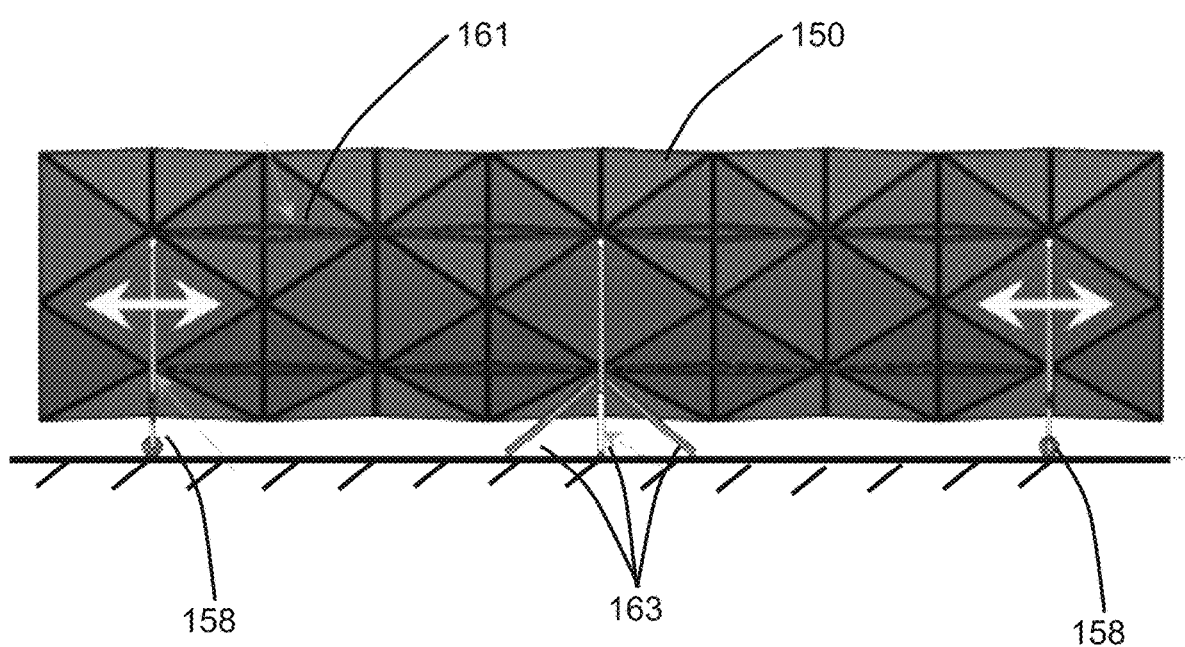

FIG. 150 shows an elevation view of an example of a curved META array deployed on the ground with supporting legs and N=5 units, according to the present invention.

Figure 151:
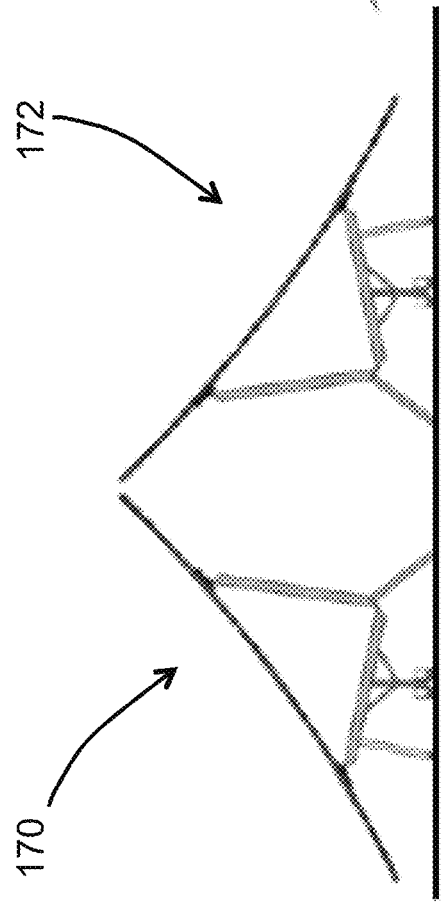

FIG. 151 shows an elevation view of an example of a pair of curved META arrays deployed back-to-back on the ground with supporting legs, according to the present invention.

Figure 152:
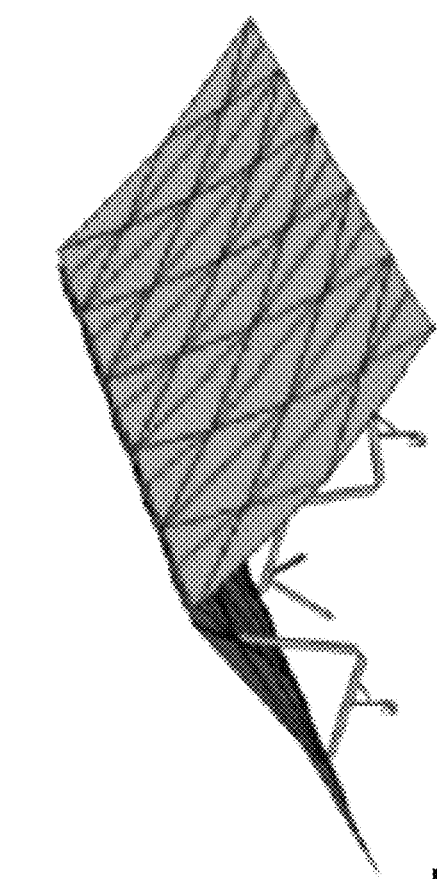

FIG. 152 shows a perspective view of an example of a pair of curved META arrays deployed back-to-back on the ground with supporting legs, according to the present invention.

Figure 155:
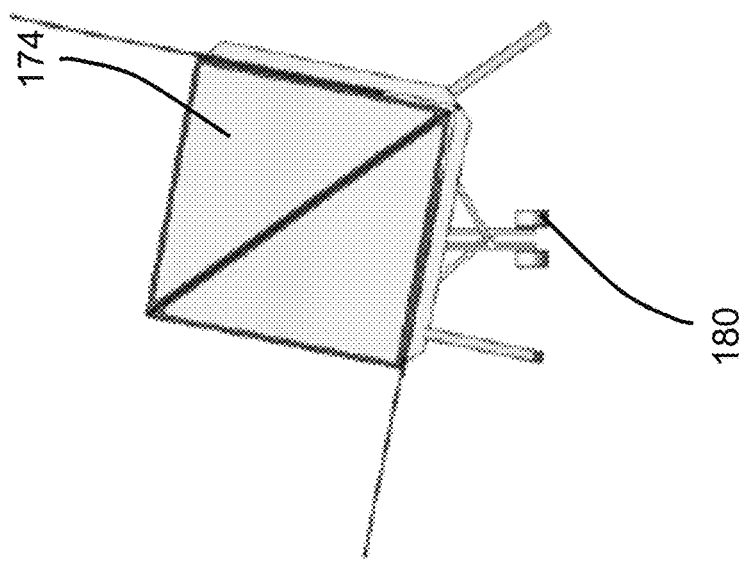
Figure 154:
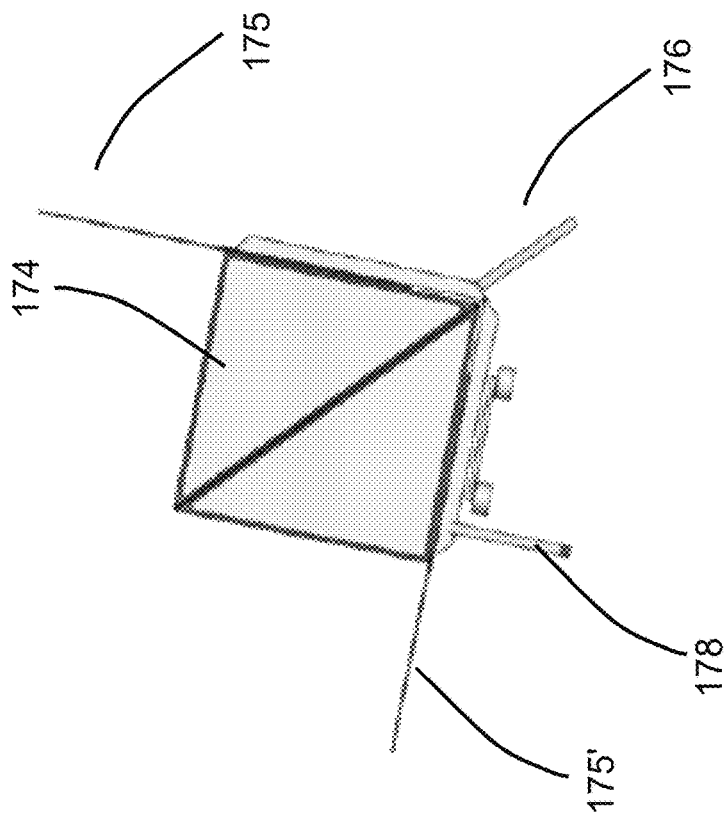
Figure 153:
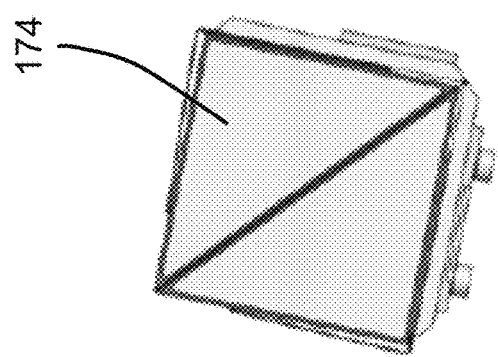

FIGS. 153-155 show a perspective view of a sequence showing a folded META array with the legs being unfolded, according to the present invention.

Figure 156:
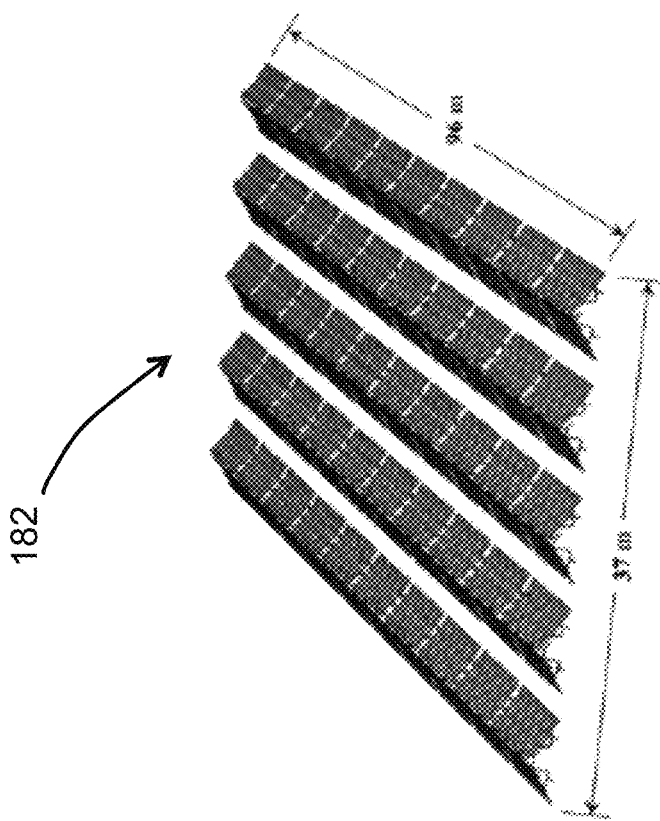

FIG. 156 shows a perspective view of a multiple rows of META arrays deployed back-to-back on the ground, according to the present invention.

Figure 157:
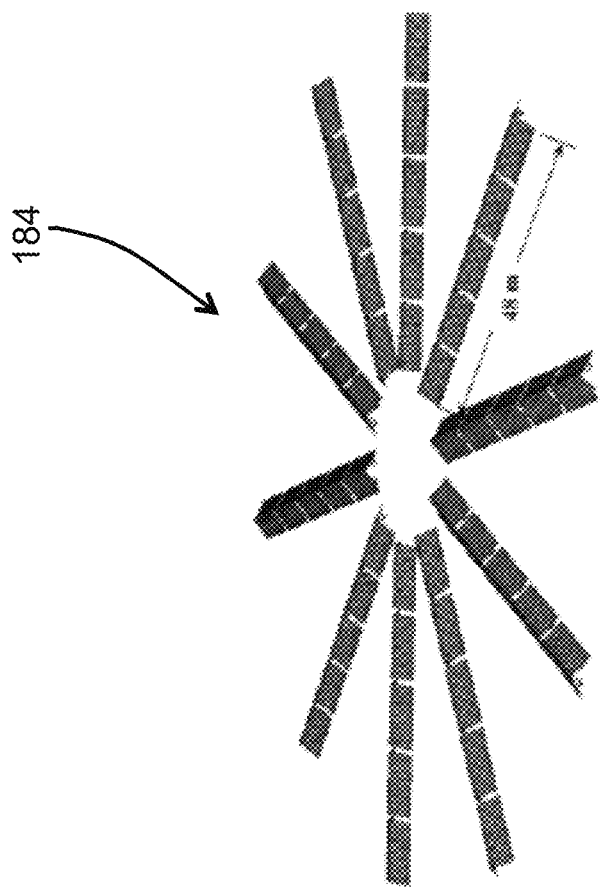

FIG. 157 shows a perspective view of a multiple rows of META arrays deployed in a radial star pattern on the ground, according to the present invention.

Figure 158:
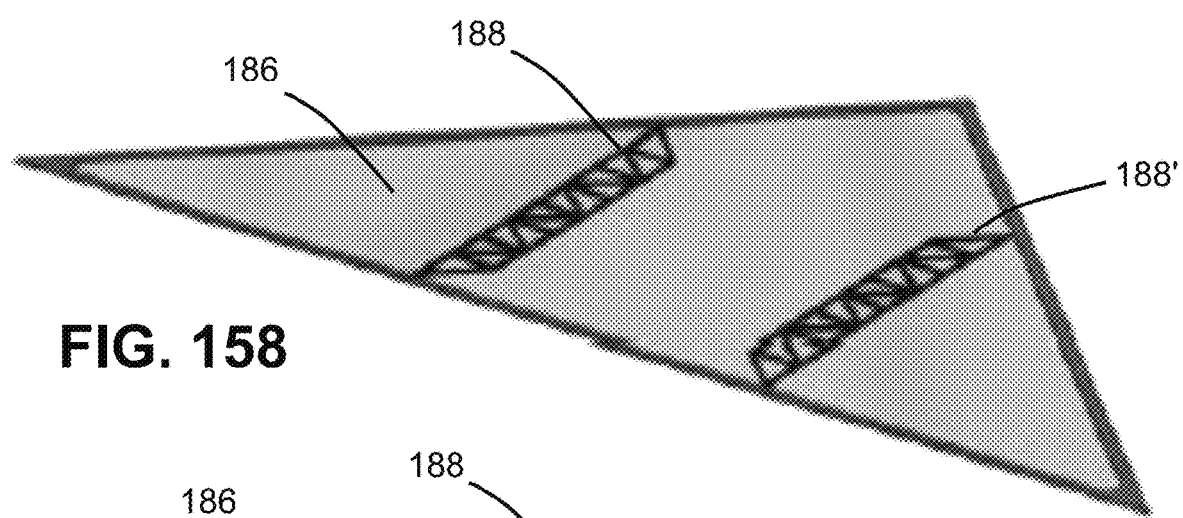
Figure 159:
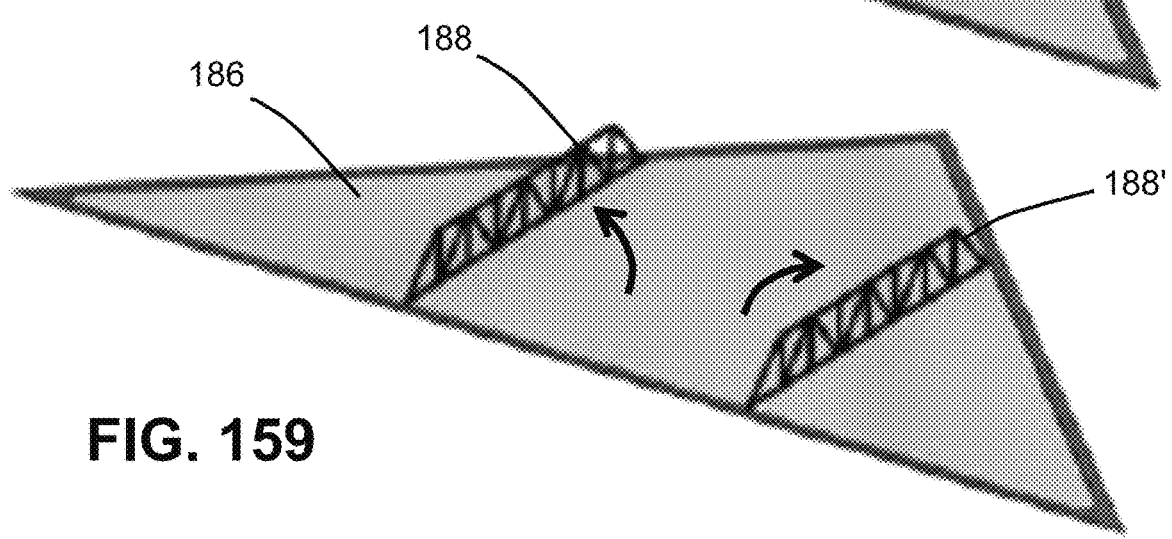

FIGS. 158-159 show a perspective view of a triangular panel element with a pair of truss supports deployed on the backside of the panel, according to the present invention.

DETAILED DESCRIPTION OF THE INVENTION

This novel approach couples the many advantages of a flexible array substrate with a simple supporting structure that expands in two dimensions. This architecture maintains a low areal aspect ratio while also increasing power collection area. For a given deployed area, the reduced length-to-width aspect ratio achieved with two-dimensional packaging over one-dimensional has the significant advantages of reduced overall mass and volume, increased $kW/m^3$ power density, and lower moments of inertia [11, 12]. The goal for a SOAR system is to minimize the stack height for a given stowed length and width, which allows the array to mount on the bus exterior and interface with commercially available array drives. The rectangular array area packages into a square footprint defined by the side stow length, $L_S$, with a repeating arrangement of right-triangular panels. The array is stowed via the unique origami triangular folding pattern that exhibits an ideal 2-D packaging efficiency and does not require folds over other interior folds, unlike a dual Z-fold. The origami folding pattern also exhibits an unique property to insensitivity to panel thickness that allows for the use of high efficiency $3^{rd}$ generation ZTJ-type PV cells with integrated coverglass to support extended mission operation times of multiple years, if desired.

Figure 8:
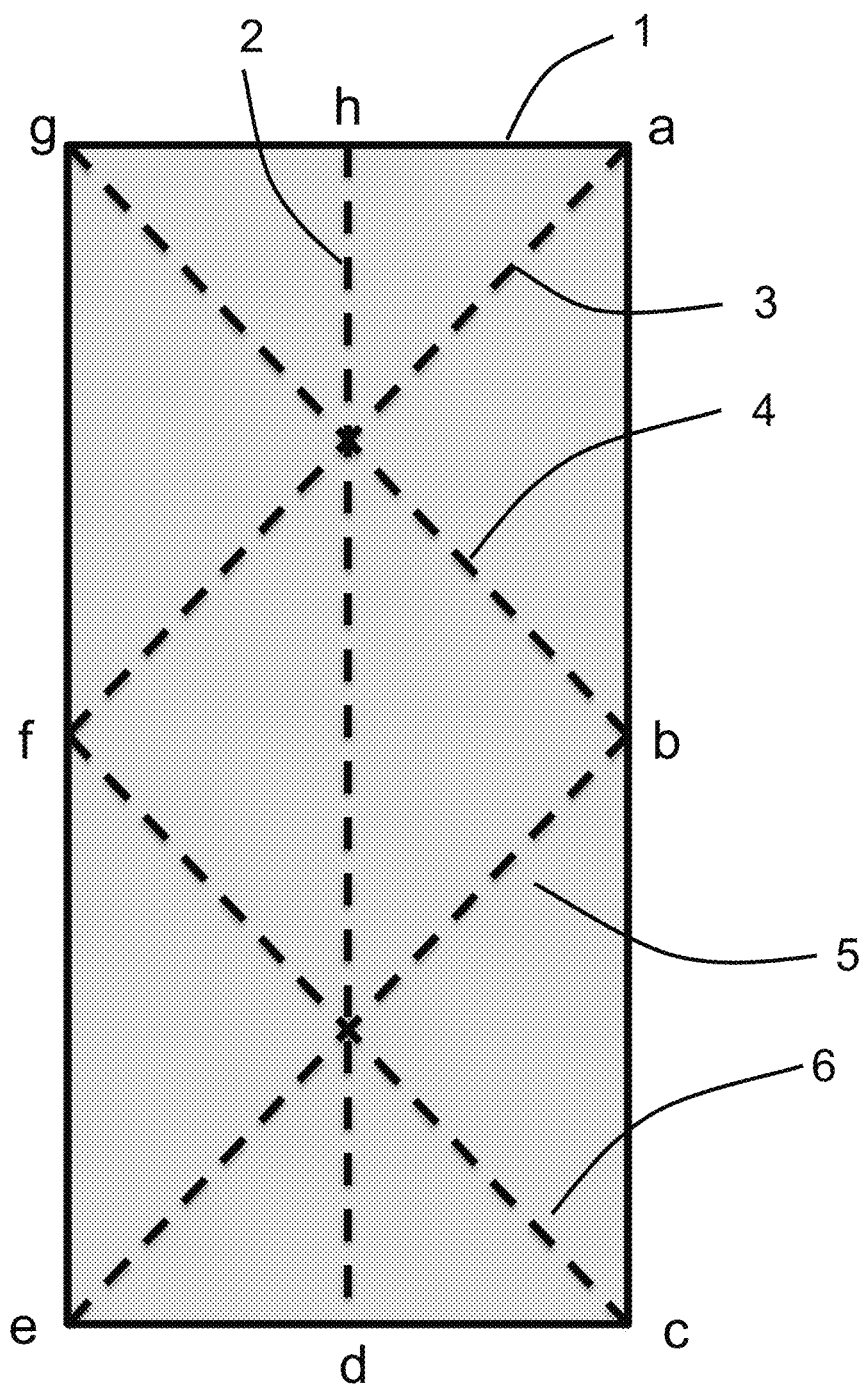
FIG. 8 shows a plan view of an unfolded SOAR origami pattern layout showing fold lines of a basic unit (N=1).

FIG. 8 shows a plan view of the folding pattern layout that defines the triangular SOAR origami pattern, with a basic unit size N=1. This is based on using right triangles (with 45 degree vertex angles). The basic pattern (N=1) begins with a simple rectangle 1 having one side that's twice as long as the other. There are a set of eight station points disposed along the perimeter of rectangle 1, {a, b, c, d, e, f, g, h}, labeled clockwise starting at the upper right hand point of rectangle 1. The first fold line 2 is a vertical line drawn between the midpoints of the short sides (Points "h" and "d"). The second fold line 3 is a 45 degree diagonal drawn between the upper right hand corner and the midpoint of the left long side (Points "a" and "f"). The third fold line 4 is a 45 degree diagonal drawn between the upper left hand corner and the midpoint of the right long side (Points "g" and "b"). The fourth fold line 5 is a 45 degree diagonal drawn between the midpoint of the right long side and the lower left hand corner (Points "b" and "e"). The fifth and last fold line 6 is a 45 degree diagonal drawn between the midpoint of the left long side and the lower right hand corner (Points "f" and "c").

Figure 9:
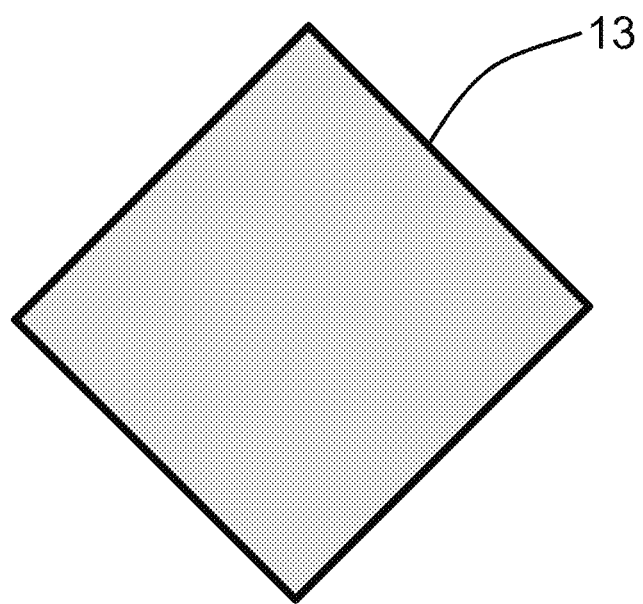
FIG. 9 shows a plan view of a folded SOAR origami pattern layout for a basic unit (N=1).

FIG. 9 shows a plan view of a folded SOAR origami pattern layout for a basic unit (N=1), which folds into a compact, square shape approximately ¼ the area of the unfolded shape.

Figure 10:
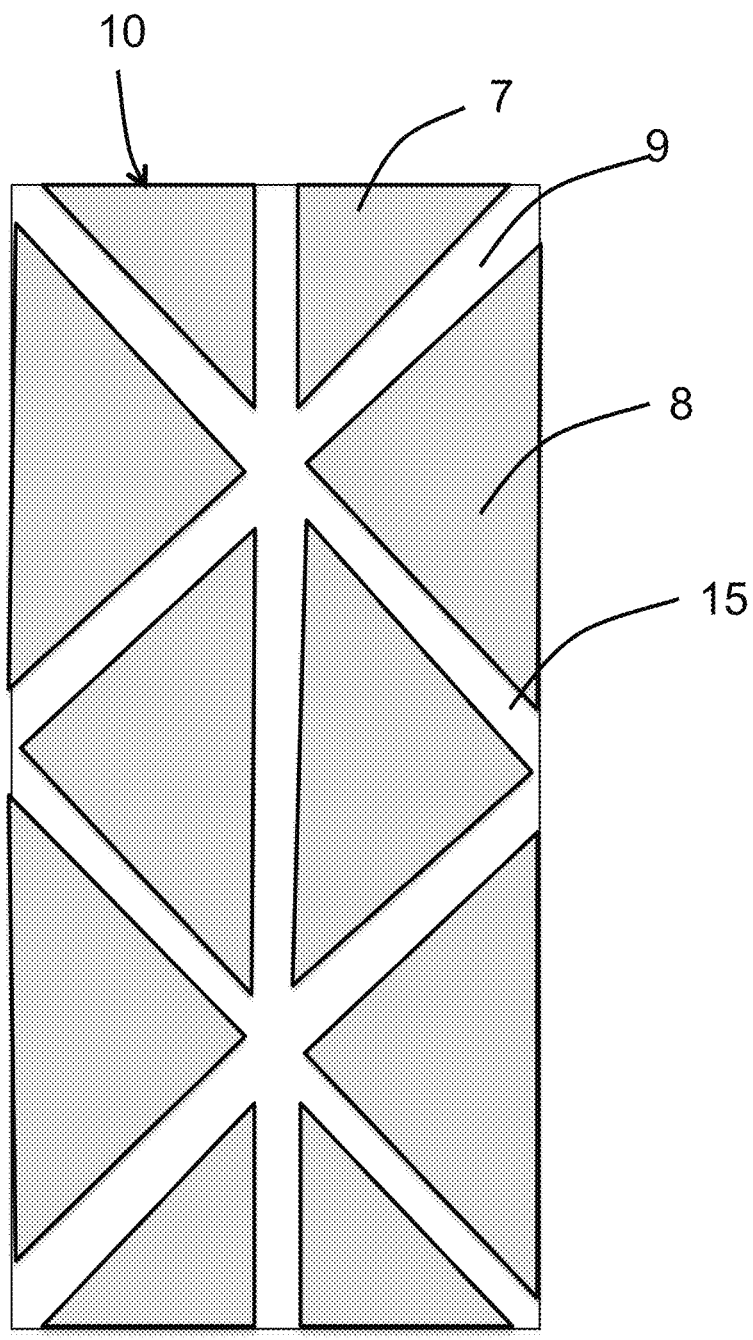
FIG. 10 shows a plan view of an unfolded SOAR pattern layout with panel elements disposed in a grid supported by a supporting membrane, as a basic unit (N=1).
Figure 15:
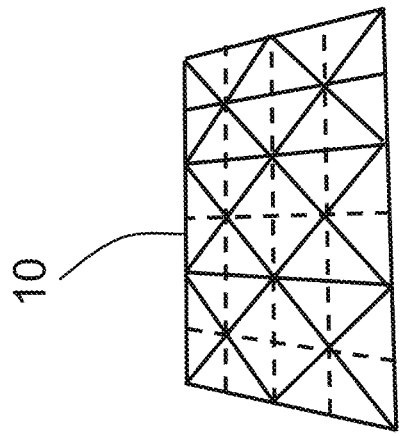
FIGS. 11-15 show a perspective view of a triangular parent folding pattern illustrating a helical TPS pattern and a non-helical SOAR pattern.
Figure 14:
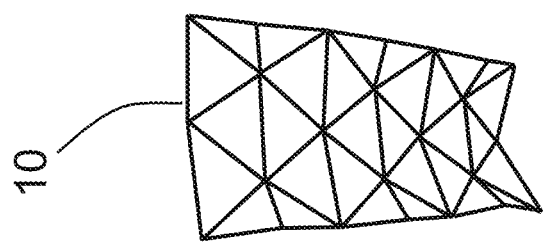
Figure 13:
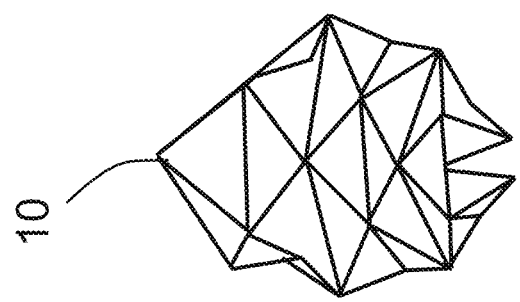
Figure 12:
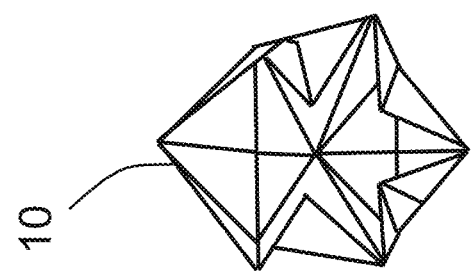
Figure 11:
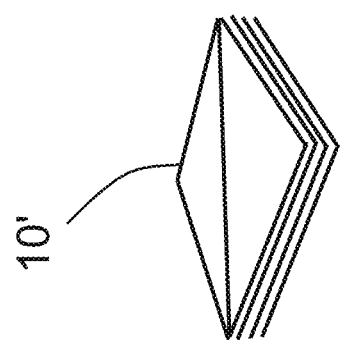

FIG. 10 shows a plan view of an unfolded SOAR pattern layout with semi-rigid panel elements 7, 8 configured as a network connected by a supporting membrane 15, as a basic unit (N=1). The basic unit panel elements comprise two "half-size" right triangles 7, and six "full-size" right triangles 8, for a total of eight panel elements. The panel elements 7, 8 can comprise, for example, photovoltaic cells, active antenna elements, or mirror elements. Alternatively, the panel can comprise a simple membrane with no panel elements, such as in a solar sail. Adjacent panel elements 7 and 8 are separated by a uniform gap, 9. In one embodiment, panel elements 7, 8 are disposed on a flexible, underlying membrane (backplane) substrate 15. In another embodiment, panel elements 7, 8 are disposed with a flexible membrane material 15 disposed in the middle, in-between adjacent panel elements 7, 8.

Figure 16:
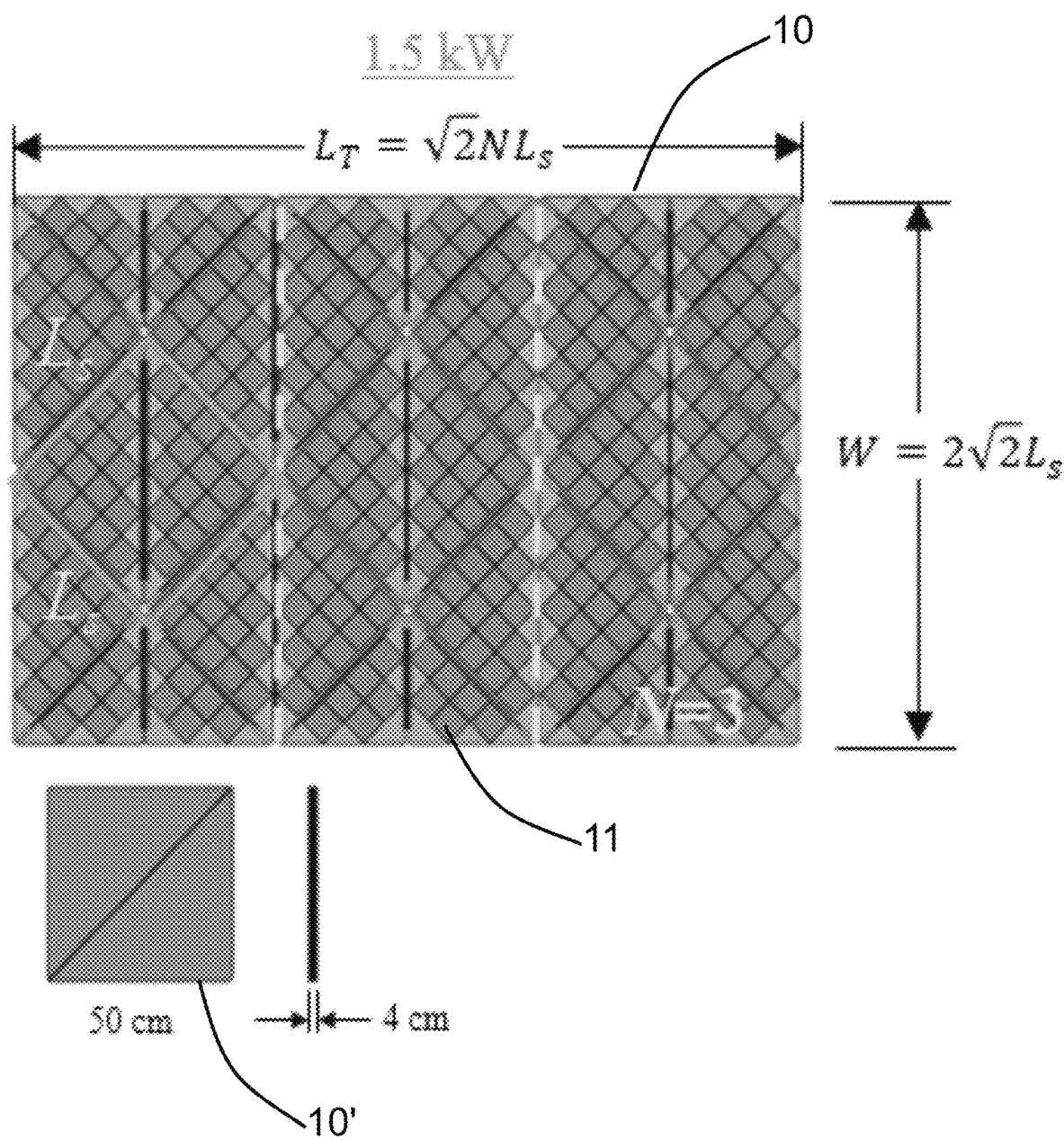
FIG. 16 shows a plan view of a SOAR triangular pattern solar cell layout for a deployed solar array comprising 3 repeating units (N=3).
Figure 17:
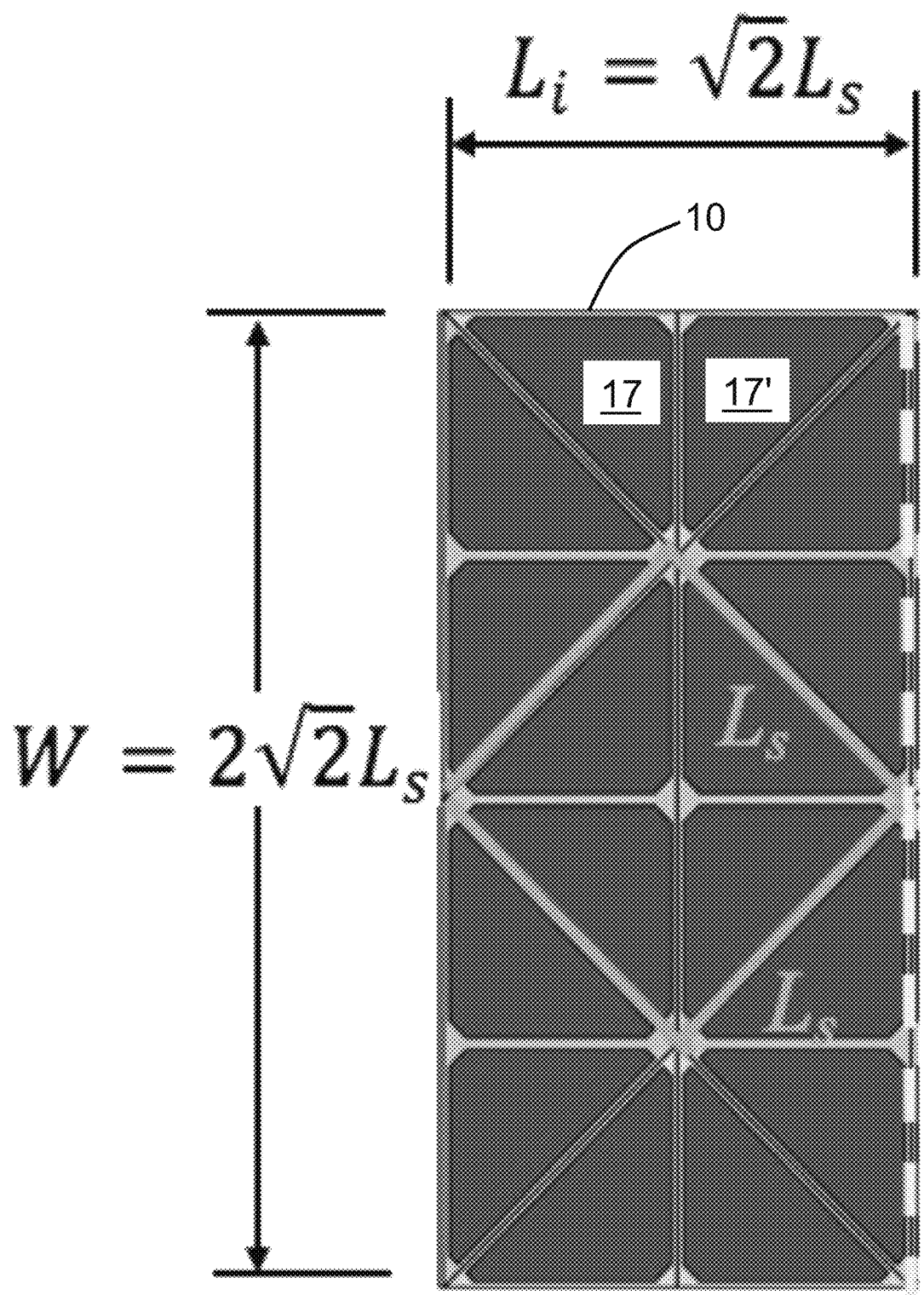
FIG. 17 shows a plan view of a SOAR triangular pattern solar cell layout for a deployed solar array comprising 1 repeating unit (N=1).

The SOAR pattern 10 consists of a repeating arrangement of right-triangular panel segments where the PV cells or antenna elements will be populated. The dimensions of the deployed array, shown in FIGS. 16 and 17, can be defined by a characteristic dimension $L_S$ and the number of repeating length units defined by the scalar integer, N. Overall deployed length, $L_D$, can be readily increased with minor increases to the stowed stack height. Thickness of a unit (N=1) is $4t_p$, where $t_p$ is the thickness of the panel. The triangular areas for PV cell population remain flat and are not subjected to bending loads due to the membrane-like mechanics of the folding pattern. The panel sizes can be optimized to maximize the PV population density. Typical square PV cell 11 dimensions can be 8-12 cm on a side depending on whether 4" or 6" diameter wafers are used. The PV cells or antenna elements can, for example, be circular, oval, square, rectangular, hexagonal, or triangular shaped. For smaller scale systems where $L_S \leq 35$ cm, smaller 1.8 cm square cells available on the market may be used to populate the array panels or an alternative diagonal trim of the PV wafer would maximize this density. The latter option achieves identical wafer utilization as the 'standard' horizontal trim during the manufacturing process, while fully populating each panel. For a 6U CubeSat mission, a SOAR system would have a stowed footprint of 20 cm×20 cm. The deployed length can be tailored to support mission needs without changing this stowed footprint with only a minimal increase to the stowed stack height. For example, a two-wing SOAR array system designed to produce 240 W has a stowed stack height of 1.8 cm for an individual wing. Increasing the capability to 280 W increases the stack height by only 0.3 cm. In the example shown in FIG. 16, each full-sized right triangular panel element comprises 15 individual PV cells, and each half-sized triangular panel element comprises 6 individual PV cells.

The SOAR triangular folding pattern 10 is a novel approach that offers two-dimensional perfect packaging, where there is no empty volume in the stowed state. This unique folding pattern has no instances of folding over and around other parts of the pattern, a relatively low stack height, and the width of each fold line needs to be minimally the thickness of the adjacent panels. Hence, the fold pattern is also insensitive to membrane or panel thickness, unlike the dual Z-fold, Miura-Ori, and many spiral-wrap folding concepts, and is compatible with membrane substrates or flexible (semi-rigid) hinged panels designs. This important attribute also allows to use any thickness of solar cell coverglass to increase operational life for extended missions.

Second, the design of the fold lines is important to preventing damage to the fragile electronics mounted on the panels. Each panel in the array must behave as, or close to, rigid bodies, while any bending loads act only through the fold lines at a global level. If significant bending loads act through a flexible panel, the deformation curvature can lead to delamination or breaking of the fragile electronic components mounted on them. In other words, the tensioned array should behave globally like a membrane, discretized into smaller semi-rigid panels with low-bending stiffness fold lines for the bending deformations to act through.

The SOAR pattern 10 provides scalability from nano-satellites (e.g., CubeSat) to microsatellites with no modifications to the architecture or deployment process by simply altering the characteristic stowed length $L_S$ of the folding pattern. Also, within each individual form factor for any specific satellite class, the array can be readily scaled to tailor to mission power needs. This is achieved through an increase in the deployed length with additional folding units, which has minimal impact on the stowed stack height.

The triangular panel dimensions are a function of the stowed characteristic length and are constant over the array area. Scaling and increasing the deployed length with additional folding units does not impact this panel size. Constant panel dimensions are beneficial for cost reduction measures since layout and harnessing is the same throughout the structure. Panel size can be optimized to maximize the PV areal density using standard sized cells. Compared with radial spiral wrap architectures that typically have relatively small PV cell areas between fold locations to obtain reduced height packaged dimensions. These sections also increase in size with radial distance.

To prevent damage to the fragile solar array tiles and mounted electronics, bending loads acting through the panels must be removed or limited by design. The SOAR folding pattern has 3 degrees-of-freedom (DOF) at each vertex, which results in a structure with flexible, membrane-like mechanics in the deployed state, where the panels act as rigid bodies and bending only occurs at the fold lines. Other single DOF folding patterns can be considered, but these types of patterns have two significant problems. First, the packaging efficiency becomes compromised by creating dead spaces in the pattern and between layers. Second, global deformations of a 1-DOF folding pattern requires significant bending loads to act directly through the potentially-fragile panels. The proposed 3-DOF folding pattern does not exhibit either problem.

CubeSat missions typically do not have the resources for controlled deployment, which eliminates many deployable array architecture options. The SOAR concept however, offers predictable, free deployment kinematics. As the array scales up to larger spacecraft and inertial effects become significant, mechanisms to control deployment can be introduced without modifying the array architecture.

Analysis of the fold kinematics [10] and observations with a prototype demonstrated that the array does not pass through intermediate low energy stable or bifurcation states in the transition to the deployed state. This is important for achieving a highly reliable, deployable system, especially for applications where a free deployment is desired.

Deployable planar surfaces have much utility for space applications in addition to solar array systems. Science and communication antenna gain is directly proportional to aperture size. The relative high costs and complexity associated with deployable apertures with curvature provide motivation for the development of deployable planar arrays, such as phased array and reflect-array antennas. These planar antennas typically are constructed of panels with variable thickness. The SOAR concept can be directly implemented because the architecture is independent of panel thickness while maintaining perfect packaging.

Another potential product extension is deployable thermal radiators. The increasing power consumption of small satellites requires innovative methods to dissipate the associated heat. The same attributes that make SOAR systems attractive as a solar array for small satellites apply to deployable radiator applications.

Two array fabrication methods were identified and evaluated for manufacturability and integration with the supporting substrate. The first was based on a continuous, flexible substrate such as Kapton® polyamide or Vectran® mesh. The size of the substrate is the size of the deployed array. The substrate is tensioned in a fixture and the individual cells are bonded in place. The substrate material function (e.g., Kapton®) is flexible enough to function as the array hinges and is capable of compact folding; and the supporting structure tensions the blanket array in the deployed state.

The second, and currently preferred, option is to mount the PV cells to a thin composite panel. An 8-panel module is fabricated to be compatible with a Pyralux interconnect circuit. The conductive traces that traverse the array fold lines are for electrical connections only. Mechanical hinges will be installed for load transfer and controlling array kinematics. The anticipated fabrication procedure is:

1. Layup composite substrate prepreg on tool.
2. Use dowel pins to locate Pyrelux Flex Circuit for co-cure.
3. Integrate mechanical hinges between panels.
4. Use another fixture to align and apply CICs to substrate.
5. Solder or weld CICs to flex circuit.

Figure 18:
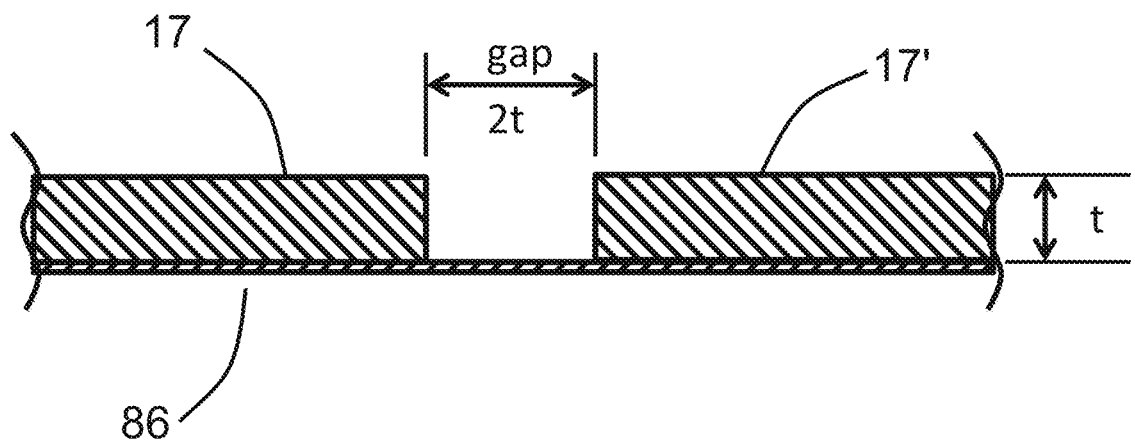
FIG. 18 shows a cross-section view of a pair of unfolded panels bonded to a flexible substrate, where the gap between adjacent panels is at least 2× the thickness of the panel.
Figure 19:
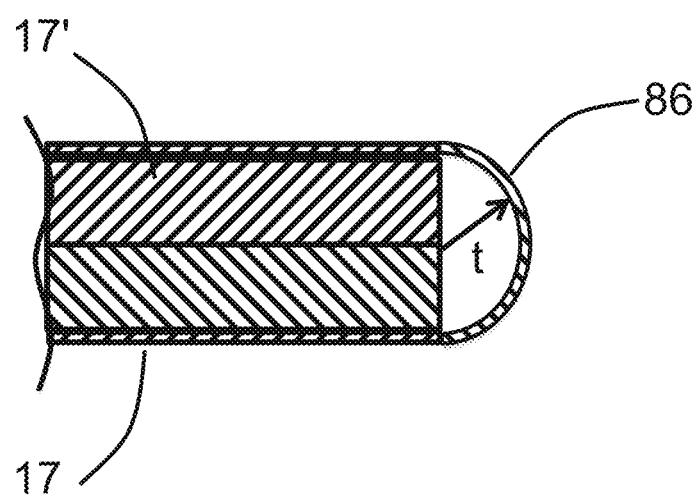
FIG. 19 shows a cross-section view of a pair of folded panels bonded to a flexible substrate, where the gap between adjacent panels is at least 2× the thickness of the panel.
Figure 20:
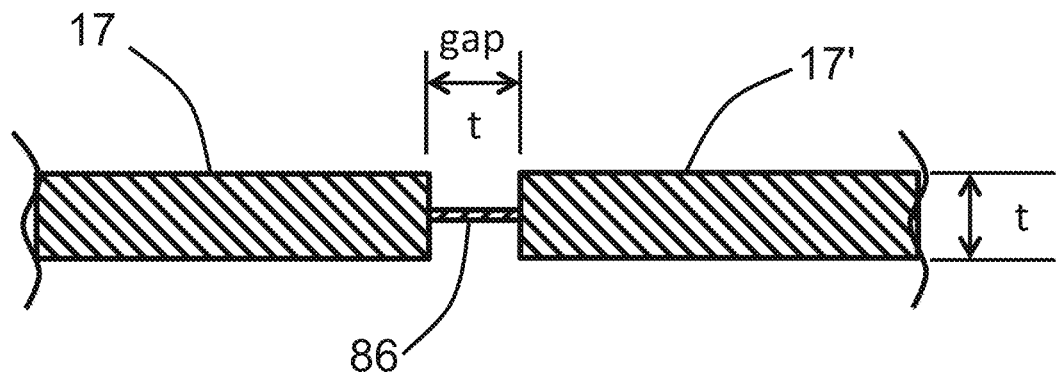
FIG. 20 shows a cross-section view of a pair of unfolded panels bonded to a flexible substrate, where the gap between adjacent panels is at least 1× the thickness of the panel.
Figure 21:
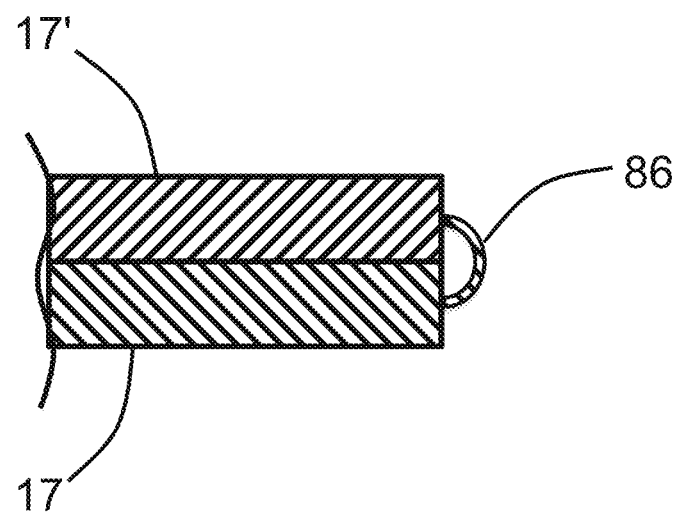
FIG. 21 shows a cross-section view of a pair of folded panels bonded to a flexible substrate, where the gap between adjacent panels is at least 1× the thickness of the panel.

FIGS. 18 and 19 show a cross-section view through a pair of unfolded panels (e.g., PV Cells or antenna elements) 17, 17' bonded to a flexible substrate 86 (such as Kapton® or equivalent polymeric material, such as a polyamide). The gap between adjacent panels 17, 17' should be at least twice the thickness, t, of the panel 17, as shown in FIG. 18 and FIG. 19, to minimize folding strains on the membrane 86 when the panels are folded together. FIGS. 20 and 21 show a cross-section view through a pair of unfolded panels (e.g., PV Cells or antenna elements) 17, 17' bonded together with a membrane 86 disposed in the middle of the panels 17, 17', with a gap between the adjacent panels greater than or equal to 1× the thickness of panels 17, 17'. The thickness of the membrane should be less than or equal to ⅕ (20%) of the thickness, t, of panels 17, 17'. Alternatively, the thickness of the connecting/supporting membrane should be less than or equal to 1/10 (10%) of the thickness, t, of panels 17, 17'. This ensures that the panels can be folded into a compact, square form (as shown in FIG. 19 or FIG. 21), without placing too much strain on the flexible connecting membrane 86 or membrane substrate 86.

Compression Column Structural Support

A number of support structure concepts have been conceived to deploy the flexible, semi-rigid, membrane-like substrate array. Notable structure architectures are: (1) the central compression column, (2) the spread dual-column "picture frame," and the (3) internal lattice support structure. A preferred embodiment of a structural support comprises a central compression column (or columns) and optional lateral spreader bar(s) to tension the blanket array [11, 12, 13, 14]. FIGS. 22-25 show sequential perspective views of a deployment sequence of a pair of opposed SOAR solar arrays 10 on a nano-satellite 18 (Cube Sat) with a supporting compression column structure 20, where the array transitions from a compact, thin, square stack 10' to a large deployed area 10. The central compression column 20 can comprise four hinged tube members that stows on the outer periphery of the array stack 10'. Optional lateral spreader bars (not shown) can be coupled to the array using a compliant interface to maintain tension in the event of structural deformations. Deployment of the SOAR array can be actively controlled using a linear actuator, or freely deployed using damped spring hinges at key joint locations. The support structure is sized to have adequate deployed stiffness, strength, and thermal distortion to satisfy requirements of the specific mission. The stack height listed is for an individual array wing. Packaging efficiency is computed with a conservative stowed volume occupied by the stowed array stack, the spreader bars, and a thick-walled carbon-fiber tube for the compression column with a penalty factor for latching and hinge mechanisms.

The SOAR design has several potential advantages over the Z-folding blanket arrays proposed in concepts such as the NASA Compact Telescoping Array (CTA) [13]. When constraining both systems to equal packaging footprints, SOAR has a slight advantage in reduced array blanket fold thickness, while not requiring additional mechanisms on the array such as guide cables due to the predictable kinematics from the triangular fold pattern. Of more significance is the ability to attach the array at multiple midspan locations directly to the central compression boom (column) to help increase structural stiffness and reduce mass, as shown by Jones [14]. Additional lateral spreader bars at these midspan mounts may be incorporated with minimal impact to packaged stack height. Table 1 shows the estimated performance values for the SOAR concept, which exceeds State of the Art (SOTA) packaging efficiencies for a range of array sizes.

TABLE 1

Estimated performance values for the SOAR concept exceed SOTA packaging efficiencies for a range of array sizes

| Stowed Width (cm) | Stowed Max Height[b] (cm) | Deployed Width (m) | Deployed Length (m) | 2-Wing BOL Power (kW) | Packaging Efficiency[a] (kW/m$^3$) | % of 50 kW/m$^3$ Goal |
|---|---|---|---|---|---|---|
| 18[c] | 0.9* | 0.50 | 0.75 | 0.24 | 195 | 390% |
| 20[c] | 0.9* | 0.58 | 0.84 | 0.30 | 198 | 400% |
| 32 | 0.9* | 0.91 | 1.36 | 0.56 | 124 | 250% |
| 40 | 1.1 | 1.13 | 1.70 | 0.96 | 127 | 250% |
| 48 | 0.9* | 1.36 | 1.36 | 0.96 | 146 | 290% |
| 48 | 1.5 | 1.36 | 2.04 | 1.45 | 121 | 240% |
| 96 | 2.2 | 2.72 | 2.72 | 4.38 | 130[d] | 260% |
| 96 | 3.5 | 2.72 | 4.07 | 6.56 | 86.5[d] | 170% |
| 200 | 6.7 | 5.66 | 5.66 | 20.0 | 64.5[d] | 130% |

[a]Entire volume is applied another 2× penalty factor to account for packaging inefficiencies.
[b]Given as largest value between array stack height and boom diameter.
(*denotes stack height).
[c]Uses smaller 1.9 cm square cells readily available on the market.
[d]Solved with a compression column wall thickness of 3 mm, rather than 1.5 mm.

Figures 30, 31, 32:
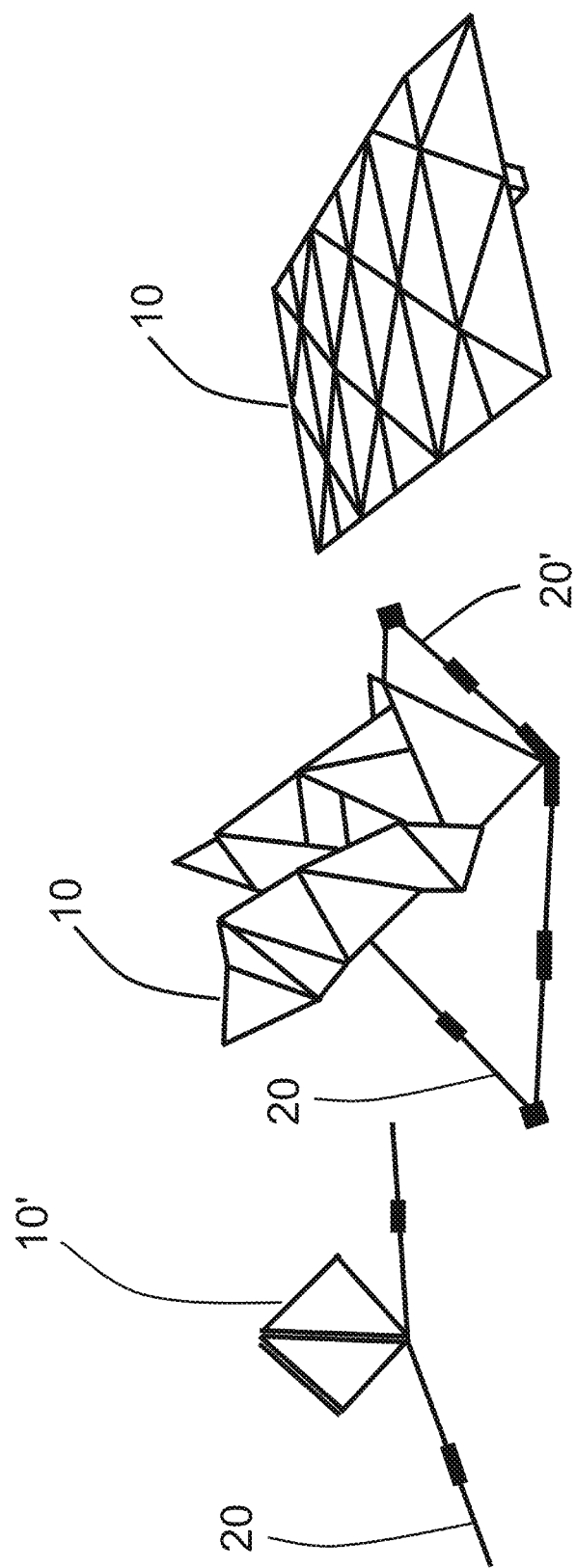
FIGS. 30-32 show sequential perspective views of a deployment sequence of a prototype SOAR solar array with a dual compression column supporting structure, where the array transitions from a compact, thin, square stack to a large deployed area (area expansion ratio=12:1).

FIG. 30-32 show sequential perspective views of a deployment sequence of a prototype SOAR solar array 10 with a dual central compression column supporting structure 20, 20', where the array transitions from a compact, thin, square stack 10' to a large, planar deployed area 10 (with an area-expansion ratio=12:1). Analysis of the fold kinematics [10] and observations from deployment testing of the Phase I prototype demonstrated that the array-folding pattern is deterministic, where its kinematics naturally unfolds the width-wise folds while being deploying along its length. In addition, the folding pattern does not pass through intermediate low energy stable or bifurcation states in the transition to the deployed state. These attributes are important for achieving a highly reliable deployable system, especially for applications where a free deployment is desired.

Figure 33:
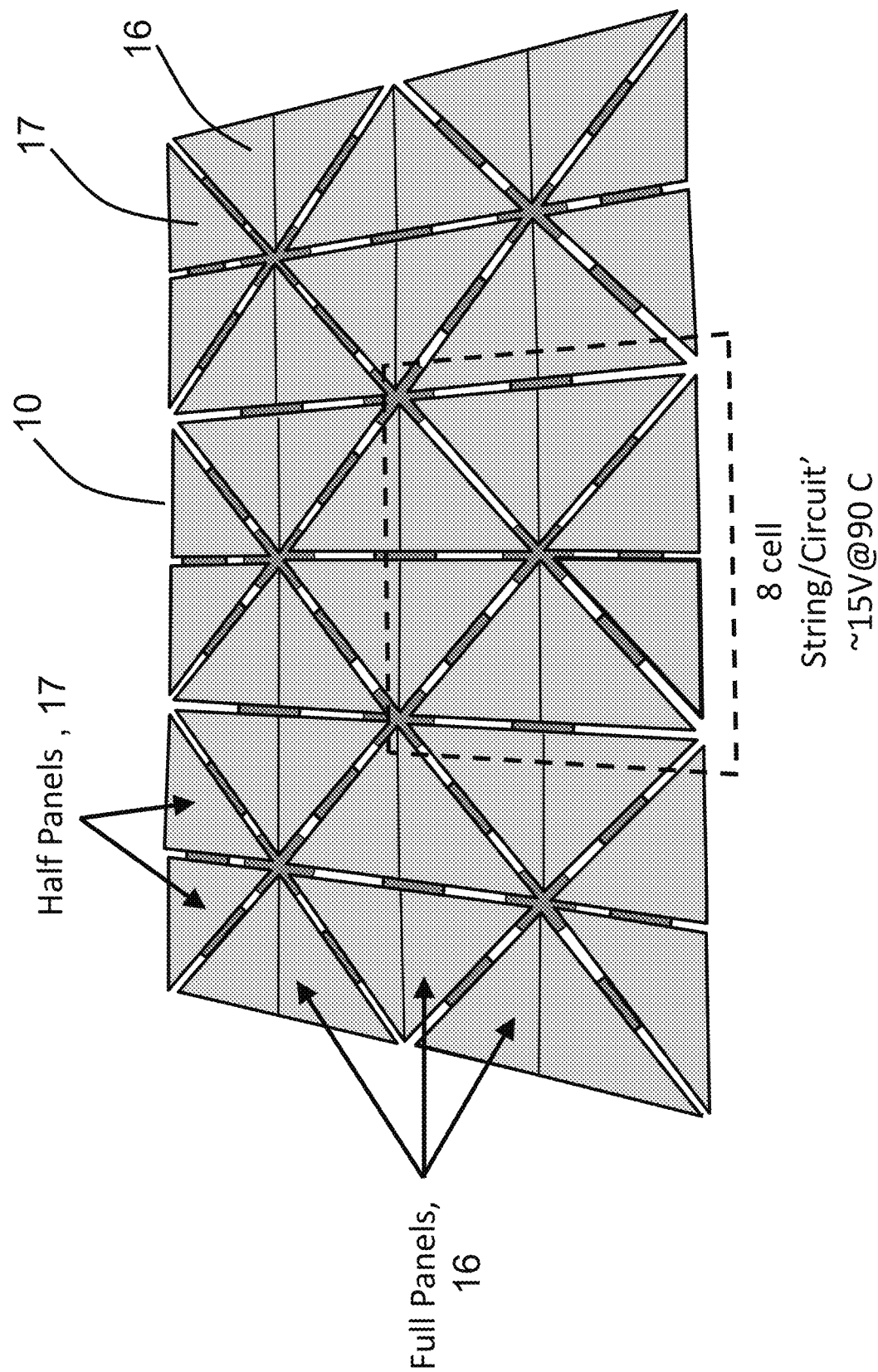
FIG. 33 shows a perspective view of a SOAR triangular pattern solar cell layout for a deployed solar array comprising 3 repeating units (N=3) made up of a mixture of "full" and "half" panels.

FIG. 33 shows a perspective view of a SOAR triangular pattern solar cell layout for a deployed solar array comprising 3 repeating units (N=3), made up of a mixture of "full" and "half" right triangular panels 16 and 17, respectively. The pattern consists of a repeating arrangement of right-triangular panel areas where the PV cells will be populated. For a single fundamental unit (N=1), the array layout consists of 4 "half" panels 17 and 6 "full" panels 16. The fold lines are at the panel-panel gaps. The dimensions of the deployed array can be defined by a characteristic dimension $L_S$ and the number of repeating length units defined by the scalar integer, N. Overall deployed length, $L_D$, can be readily increased with minor increases to the stowed stack height. Thickness of a unit (N=1) is $4t_p$, where $t_p$ is the thickness of the panel. Total array thickness would therefore be $T=4Nt_p$.

Figure 34:
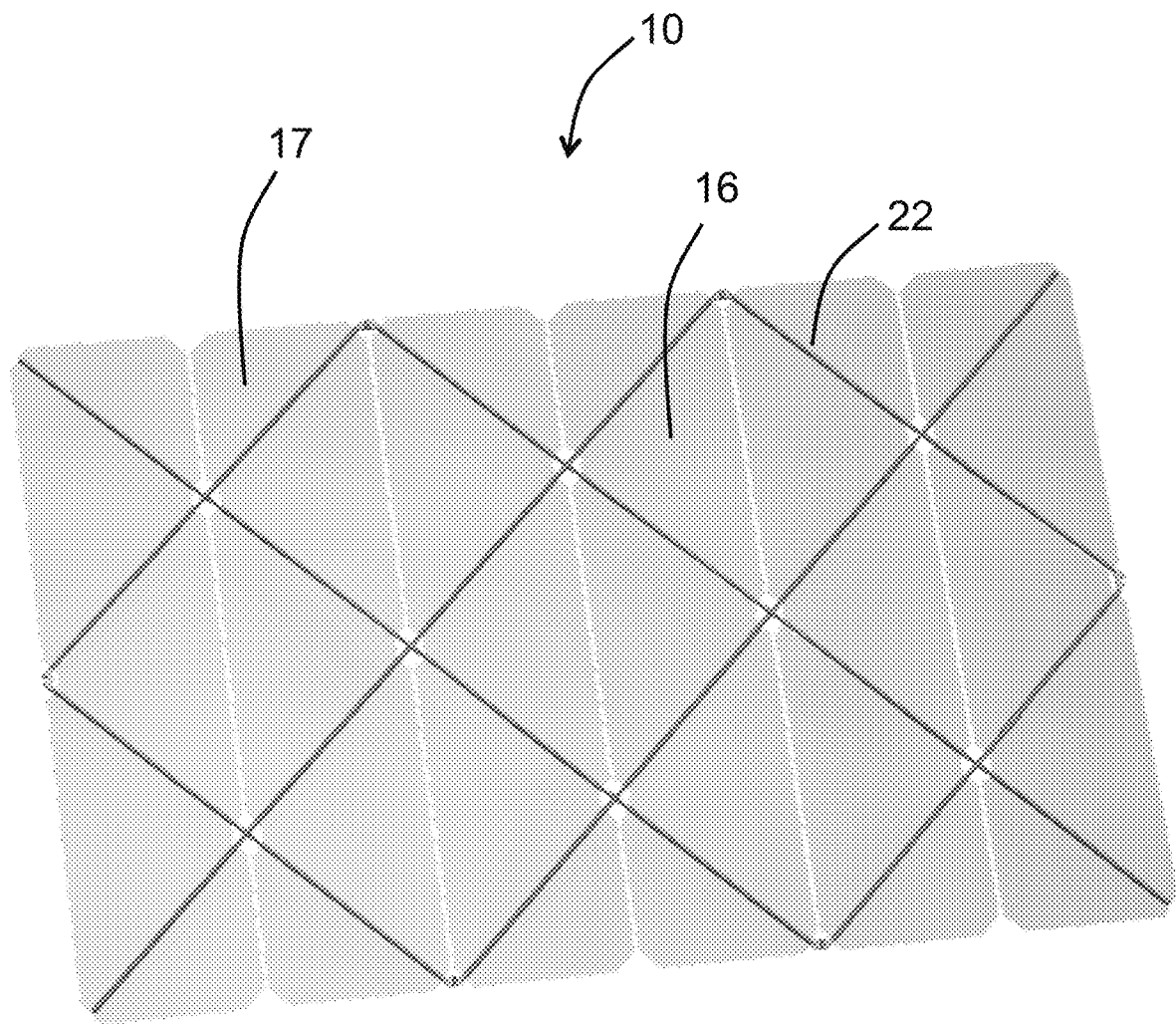
FIG. 34 shows a perspective view of a SOAR triangular pattern solar cell layout for a solar array comprising 3 repeating units (N=3), with the dark lines showing an electrical harness layout pattern along the array's diagonals that border every array panel.

FIG. 34 shows a perspective view of a SOAR triangular pattern solar cell layout 10 for a solar array comprising 3 repeating units (N=3), with the dark lines showing an electrical harness layout pattern 22 along the array's diagonals that border every array panel. Such an electrical lattice harness interconnects and routes power directly from the panels, while neatly packaging about the stowed array stack and deploying in sync with the array structure. This harnessing approach touches at least one edge of every panel (full panel 16, half panel 17) throughout the array and provides a direct connection to the harness for every panel, without requiring any power routed directly between them with any special folding ribbon connection.

FIG. 35A,B shows sequential perspective views of a SOAR triangular pattern solar cell layout 10 for a solar array with $L_S$=20 cm and N=3, in the stowed and deployed states, respectively, with a 6U CubeSat bus simulator 24 on the side.

FIGS. 36-39 show sequential perspective views of a deployment sequence of a SOAR solar array 10 with a dual compression column supporting structure 20, where the array transitions from a compact, thin, square stack 10' to a large deployed area 10, with balanced kinematics that enables free-deployment by stored strain energy. This figure shows the central compression column 20 in multiple deployment states with the folded membrane SOAR array 10. In this approach, the deployment method comprises steps 1): deploying the structure (array), and then 2) applying tension to the membrane array to the desired level. An alternative deployment method is to simply tension the array as the structure deploys, as in a lattice structure design. Lateral spars 26, 26' are attached to the leading edges of the corner panels, respectively, and drive deployment of the corners of the solar array 10 (which 'pulls" the rest of the array into a substantially flat alignment when deployed).

The central column 20 is actually comprised of two independent, side-by-side columns 20, 20', used primarily for balanced kinematics. This enables the array to be free-deployed by strain energy in the boom hinges, which is particularly good for small satellite missions that do not have the resources for a one-time use motor for a controlled deployment. For larger micro-satellite missions and power levels exceeding 1 kW, the inertial forces of a free-deployment become non-trivial. The SOAR concept also allows for a simple motor to quasi-statically deploy the array. Optionally, a single column 20 can be used in place of two side-by-side columns 20, 20'.

In addition, as shown in FIG. 40-41, the dual compression column design improves packaging efficiency by splitting the column perpendicular to the array to not significantly affect the overall cantilever bending stiffness. Each column has a hinge 32 at the mid-span that allows it to collapse with the array to the folded state. The split dimension of the central columns is oriented with the panel stack when stowed and helps reduce the overall packaged thickness of SOAR.

The central columns connect to the array at the opposing central vertices with a 5-axis main hub 70. This hub 70 is shown in FIGS. 89 and 90 for the multiple deployment states (to be described later). For a free deployment, torsion springs can be placed at the column mid-span and end connection joints. A motorized controlled deployment can be achieved using a cable-reel system where the cable is routed through the interior of one of the column members to the mid-span joint, and then connects to the opposing column at the mid-span joint. Retracting the cable pulls the two columns together to the deployed state.

FIG. 42-44 shows sequential perspective views of a deployment sequence of a SOAR solar array 10 with a dual compression column supporting structure, where the compression column comprises a mid-hinge 32 for array deployment, and secondary hinges 34 for compact packaging by wrapping the compression columns around the array stack. Each compression column consists of multiple hinges (32, 34); and first and second column segments 28 and 30, respectively, as shown in FIG. 42. The mid-hinge 32 allows the column 20 to fold in half, and is in line with the panel stack in the stowed state. Greater packaging is achieved with the use of secondary hinges 34, 34' to allow the column to fold along the panel stack's periphery. Tape spring hinges (see, e.g., FIGS. 83-84) made of flexible resilient material, such as fiber-reinforced polymer composite materials, are the preferred choice for the secondary fold hinges 34, 34' for the beneficial properties of low mass, strain energy deployment, and load carrying capability with no additional latch mechanism at full deployment. A simple pin-clevis hinge was selected for the mid-hinge 32 due to the fact that it needs to resist potential transverse bending loads, and the compact fold requirement might fail a tape spring hinge.

FIGS. 42-44 shows sequential perspective views of stowage and initial deployment of a SOAR solar array first and second compression columns, 28, 30, respectively. The image in FIG. 42 shows the compression column 20 collapsed in the same plane as the stowed membrane array 10'. To increase the packaging efficiency when stowed, secondary hinges 34 are incorporated into the column members to fold compression column 20, which increases the overall footprint by a minor amount, i.e., approximately the depth of the column along the periphery of the stacked array, as shown in FIG. 43 (note that only one compression column is shown). A parametric model predicts that the required size of the compression column 20 is within the total stack height of the array subsystem. At the smaller scales considered, manufacturability is the limiting factor in achieving an optimal design. The side view demonstrating the compression member's negligible impact on package dimensions is shown in the first image of FIG. 42.

The lateral spar members 26, 26' are also connected to the central hub fixture 70 that the compression column 20 is mounted to. These members will be directly coupled to the respective panels, with an optional compliant interface. This implementation does add to the array stack height. Therefore, the thickness of these members should be minimized. The loading on the spar components 26, 26' is primarily in-plane to react the membrane tension loads. This is beneficial in terms of packaging since it translates to the spar members not needing to be relatively thick.

FIG. 45 show a perspective view of a partially-deployed SOAR solar array 10 indicating that simply deploying the array at column attachment points 33, 33' at the proximal and distal ends of array 10 does not deploy the corner panels 31, 31'; additional forces are necessary that are applied to lateral spars 26, 26'. The preferred support architecture consists of the central compression column 20 that is mechanically coupled to the center vertices 33, 33' at each end of the array, as shown in FIG. 45. Deploying the initial prototype array (see FIGS. 36-39) in this manner unexpectedly showed that no forces are transmitted to the four corner panels 31, 31' and therefore do not deploy. To solve this problem, tension is applied to the full width of the array in the deployed state via a pair of lateral spars 26, 26' that mount to the compression column 20 at the attachment vertices 33, 33'. It was decided to fix the lateral spars 26, 26' to the respective edges of the corner panels. Thus, driving the deployment of the lateral spars 26, 26' consequently deploys the corner panels 31, 31. This is accomplished thorough the 5-axis Main Hub 70.

FIG. 46 shows a perspective view of dual compression columns segments 28 and 30 with high-strain composite flexure hinges 36, 36' that provide the deployment energy, and that lock-out at end of travel for the initial column deployment. These hinge joints 34, 34' for the secondary folds utilize high-strain composite flexure hinges 36, 36'. The composite hinges use the stored strain energy for deployment and lock-out upon full deployment.

FIGS. 47-50 show sequential perspective views of deployment of a SOAR solar array with dual compression columns 38, 38' arranged in a "picture frame" configuration on the perimeter of the array. Likewise, FIGS. 51-54 show sequential end views of deployment of a SOAR solar array with dual compression columns 38, 38' arranged in a "picture frame" configuration on the perimeter of the array. Here, the dual compression members 38, 38' are moved to the outer edges of the array to create an outer frame. The balanced kinematics for free-deployment are preserved. The advantage is the compression members may be located in-plane with the tension loads, unlike the eccentric loading of the central compression column 20, 20' located behind the array in FIGS. 40-41. However, the primary reason this picture-frame concept was not selected for prototype development is the potential for the array to have a twisted structural stable state, similar to the first-generation Hubble Telescope array when exposed to a non-uniform thermal gradient. Under these conditions, the array tension can vary significantly and create nonlinear dynamics and instabilities on-orbit during operation.

A constraint and deployment release system that maintains the SOAR array in the stowed configuration was developed that comprises a tensioned wire disposed through the panel stack and at key support structure locations. Deployment is initiated by severing the wire using a heated element (e.g., a fuse).

FIGS. 89-90 show perspective views of a 5-axis Main Hub 70. Multiple rotation axes at the structure-array coupling locations are required to support the complex deployment kinematics required of the compression column support system. Main Hub 70 comprises a spar hub 72 that is pinned to a column hub 74 with a first clevis hinge pin 73. Two rigid hinge pins 75, 75' are embedded at 90 degrees relative to each other in the spar hub, which connect a pair of rotatable lateral spar beams 26, 26' to the spar hub 72. The column hub 74 has fourth and fifth hinge pins 77, 77' that are parallel to each other, and connect the column hub 74 at 90 degrees to the dual central compression columns 28, 28'. A total of four torsion springs 76, 76'. 76", 76''' are deployed at the lateral spar hinges 75, 75' and at the central compression column hinges 77, 77' to provide sufficient stored elastic spring energy to deploy the array when released. Main hub 70 can be made of aluminum alloy, which can be anodized, for example. Alternatively, spherical joints can be used in the main Hub 70 to manipulate the lateral spars 26, 26'.

A compliant interface (e.g., spring, folded element, soft material) may be located between the SOAR array 10 and lateral spar components 26, 26', to reduce loads transmitted to the array during and after deployment.

FIGS. 91-94 show magnified sequential perspective views of the deployment of the 5-axis Main Hub from the packaged state to the deployed state. During deployment, from stowed to deployed configuration, the spar hub 72 rotates 90 degrees relative to the column hub 74; the lateral spars 26, 26' rotate 180 degrees relative to the spar hub 72; and the central compression columns 28, 28' rotate 90 degrees relative to the column hub 74.

Internal Lattice Structural Support

Research into a promising alternative structural support concept (see FIGS. 57 through 82) was conducted concurrently with the tensioned array and compression beam concept. The alternative design consists of an integrated lattice support structure with multi-axis compliant hinges, positioned at the panel intersection points. The hinges between adjacent rigid triangular panels can comprise composite hinges, such as compliant Z-folding [15, 22] hinges 40, as shown in FIG. 56. This concept takes advantage of the unique folding kinematics of the SOAR pattern, such that the entire lattice structure stows only about the periphery of the folding pattern to preserve the packaging efficiency of the folded array. In addition, this structure may be free-deployed using the stored strain energy in the distributed compliant mechanisms. However, if required, deployment control can be achieved by using a simple motor or rotary damper to spool out rate-restraining cables (not shown).

The primary design challenge for the integrated lattice structure support concept relates to the folding kinematics of the origami-packaging scheme. Each fold vertex experiences multiple large rotations between stowage and deployment, while each fold line can also rotate axially along their lengths. These multi-degree-of-freedom rotations can be difficult to design mechanisms for, and to control, without careful consideration of the overall deployment kinematics. However, if designed properly with controlled kinematics, the combination of strain energy at each joint can lead to a highly deterministic self-deployment, where the entire array unfolds simultaneously and minimizing risk of damage to the solar cells from self-contact.

Another design challenge is the allowable design space for the lattice structure, which is primarily constrained by the thickness of the folded panel stack. FIG. 57 shows a plan view of a stowed lattice support structure concept, and FIG. 58 shows an end view of a stowed lattice support structure concept. FIG. 58 shows the allowable design space around the outer edge of the stowed folding pattern, which only requires the stowed structure to exist outside the fold pattern itself. The red dashed lines in FIG. 59 illustrate the height limits for the multi-axis compliant hinges 42 at each fold vertex, where the figure shows three hinges within a stowed stack height. With an anticipated panel thickness of approximately 0.8-1.0 mm (0.032"-0.040") and four panels per fold vertex, each multi-axis compliant hinge is constrained to a height of roughly 3.2-4.3 mm (0.128"-0.168"). With larger, higher power solar array designs, this height constraint is not expected to increase significantly, even if there is a thicker layer of cover glass over the solar cells or a thicker substrate the cells are mounted to for handling and fabrication reasons. Therefore, the structural depth of the lattice members and overall array stiffness may be constrained by this dimension and limit its use for larger collection areas without unique strategies and mechanisms to increase the structural depth without violating this constraint.

However, whether this stack height constraint truly limits in collection area of the lattice concept or if it is not at all an issue will be determined in the following parametric analysis and detailed design study phases for this structure. The notional structure and its prototype is presented herein based on insights gained from multiple physical models and CAD models.

While many integrated lattice structure concepts were investigated early on and not shown here for clarity, studying the folding kinematics revealed the lattice structure can be simplified into a set of crisscrossing beams 48a, 48b as shown in FIGS. 60-68, with each beam stowing helically about the array 10. At each lattice junction, the crossing beams only require a one-DOF joint to keep them coupled during deployment and to retain the ability to transfer structural loads through to one another when deployed. FIGS. 60-68 illustrate an example of the stowing progression of two straight, perpendicular lattice beams 48a, 48b, shown in red and yellow, folding helically around the fold vertices of the stowed SOAR array 10. The illustrated crisscrossing beams also rotate relative to one another to become nearly parallel when stowed in folded package 10'. Note that all of the remaining lattice spars fold helically and uniformly throughout the stow progression.

With the lattice beams 48a, 48b folding helically, the structural design can take advantage of the natural tendency of a straight rod bent into helix to always push radially outward about its largest curvature in effort to become straight again. In other words, if a uniform set of lattice beams is stowed helically, the release of their strain energy should also gently force the folding pattern out radially and lengthwise simultaneously to self-deploy the entire array in a deterministic fashion, much like what FIG. 22 shows.

FIGS. 69-A,B show perspective views of a SOAR solar array 10 with high-strain composite hinges 42 between deployed and stowed states. With the verification of the folding kinematics complete, a conceptual prototype with high-strain composite hinges was then designed and built to validate the expected self-deploying characteristics, shown in FIG. 69-A,B. The prototype was built around using solar cells optimally cut from a 4" wafer to produce a minimally-sized system with an $L_S$=11.3 cm, smaller than the final intended design to primarily reduce prototype fabrication time. As stated earlier, an important design constraint is folded panel stack height, which would not change significantly in larger systems, so the smaller prototype should capture the overall folding mechanics and design challenges that a larger system would.

FIGS. 70-71 shows a perspective view of a stowed SOAR solar array 10' with collapsible, multi-axis composite hinges 42, 42' located at opposite corners at the panel intersections. As shown in FIGS. 71 and 70 and in FIGS. 74-78, the multi-axis composite hinge 42 has a mid-span hinge pin 52 deployed perpendicularly through the thickness of the hinge. This hinge pin 52 allows the compliant composite tape hinge 42 to rotate from a deployed "cruciform" shape to a collapsed compact co-linear form when the SOAR array is stowed, as showed in FIG. 73. As shown in FIG. 72, the multi-axis hinge 42 comprises a pair of uni-directional composite tapes 54, 54', which are configured in an "over and under" geometry, which permits the four legs 56 of the joint to rotate about the axis of the perpendicular hinge pin 52. The uni-directional tape segments 54, 54' are joined to the structural columns 56 with a band joint 58.

FIGS. 79-82 shows perspective views of a deployed SOAR solar array 10 with high-strain composite hinges 42 at interior intersections between panels (b); pin/clevis hinges 44 at an exterior side location in (c); and fixed hinge plates 46 at the central vertex ends of array 10 in (a) and (d). These figures illustrate the lattice support mechanisms in more detail. At the base of the solar array, the yoke 50 attaches directly to the lattice structure with rigid hinge plate 46 to provide a rigid connection to control and orient the supported, deployed array. This also provides a clean pathway for electrical wiring to be routed from the solar cells and along the lattice members to the yoke and onto to the host spacecraft. The lattice joint between crossing helical beams is enabled by the use of cruciform-shaped high-strain composite tape springs 46 (see U.S. Pat. No. 8,434,196, which is incorporated herein by reference) to allow the small radius folds about the stowed array, while providing structural stiffness when deployed. The tape springs 46 are joined with a single-axis revolute hinge (not shown) at the folding vertex to allow the helical members to collapse during stowing and extend while deploying. The lattice beams 48 themselves can be designed with long sections of solid rod only, or they can be made of continuous high-strain composite material disposed continuously along an entire length of the side of a triangular panel element. Each lattice beam 48 can be made to be single continuous tape springs, if desired, with no rigid rods used.

The hinges 44 along of the lengthwise edges of the array only require a single-axis DOF to enable folding, as shown. The end piece 46 at the tip of the array simply joins the intersecting ends of the lattice beams for added rigidity. Note: each of these mechanisms may be replaced with metal pinned hinges with torsional springs driving the deployment, as in the simple kinematic validation model, or have additional features, such as hardstops to limit over-rotation of joints and latch mechanisms to lock the deployed array into its final shape. In addition, the lattice structure can be easily augmented for greater structural stiffness with other well-known high-strain composite hinge designs, such as tubular integrated folding hinges, or dual concave composite tape hinges as shown in FIGS. 83-84, or integrated composite TRAC booms [15] that fold with panels and greatly add deployed structural depth. Alternatively, the dual concave tape hinge in FIG. 84 can be a dual convex tape hinge (not shown), or a combination of single convex and single concave tapes (not shown). Alternatively, in any of these dual composite tape hinges, a viscoelastic polymeric material may be disposed, for example, in the gap between the two tapes (not shown), to provide a slower, more controlled release when the bent hinge "springs back" to its straightened low-energy state.

FIGS. 85-88 show a physical conceptual prototype that was constructed with 3D-printed panels and hinge components, small slivers of a high-strain composite laminate for the composite tape hinges 42, and brass wire for the straight lengths of the lattice beams 48. As shown, the prototype exhibits the same kinematics of folding as the prior simple hinge model with no noticeable binding issues. Even though the tape spring material used was not ideal for this particular design, they produced enough combined restoring force to be observable, where each tape spring lattice joint deployed their adjoining panels for a noticeable and controlled self-deployment effect. Thus, the lattice design concept was validated.

The unique self-deployment mechanics observed in the lattice structure can prove to be useful. The helical mechanisms enabling it may be simplified into small embedded flexures near the fold vertices and be distributed throughout the SOAR array to improve deployment reliability and unfolding kinematics.

A significant and important contribution of the internal lattice structure concept is a methodology to electrically connect all of the array panels and provide a clean route for the collected power to the spacecraft bus, without altering SOAR packaging efficiency. This would be accomplished by simply placing all electrical wiring where the lattice members are shown in FIG. 134. This electric harnessing approach, as illustrated conceptually in FIG. 134, inherits all of the benefits of the lattice structure; with neat stowage around the outer edge of the panel stack and ideally located on the backside of the array. In addition, the lattice harness touches at least one edge of every panel throughout the array and provides a direct connection of each panel to the electrical harness lattice, without requiring any special electrical connection to fold between panels.

With a lattice structural support system, there is no need to use a 5-axis main hub.

The decision between free-release versus rate-controlled deployments depends on the required array size, spacecraft size, and available resources. Mechanical designs of the system and components were performed to be directly compatible with both options with minimal superficial modifications.

The initial mechanical design focused on the array, lateral spars, and central compression components only. All pin-clevis hinges were designed to have an integrated torsion spring. Even when considering the larger array sizes where Ls≈50 cm, the small, required dimensions severely limited the trade space for sizing the torsion springs. To maintain the desired nesting of the compression column and array, the maximum diameter of the springs was limited to the dimension of the compression column. The number of coils and the number of springs at each joint could be increased, but at the expensive of increased packaging volume.

The preferred deployment system configuration shown in FIGS. 95-97 includes a yoke member 80 to deploy structure away from the spacecraft bus (not shown). Integration of this component required additional joints and energy sources to deploy. The relatively large number of joints was not in-line with the goal of controlled deployments. The focus switched to designing a centralized power source. However, the torsion spring features were retained to provide initial deployment torques at all joints to assist in initiating motion.

A four-bar (or 3-bar) parallel linkage yoke mechanism 80 was developed to couple the deployment of the yoke with the compression columns. The yoke assembly 80, shown in FIGS. 95-97, consists of three long linkages. The two lower long-links are coupled to each compression column 20, 20'. This triangular cross section footprint also gives high bending stiffness. The overall length can be easily modified to adjust the offset of the array from the spacecraft. This mechanism allows the deployment energy to be located within the spacecraft bus, minimizing the mass of the cantilevered system. As shown in FIGS. 95-97 the yoke can be driven by any type of actuator or passive spring, both linear and rotary.

FIGS. 98-100 show perspective views of a parallel four-bar linkage that couples the yoke 80 deployment to the compression column deployment via a flexible torsion band 82. The deployment of the yoke mechanism 80 is coupled to the compression column via a flexible band 82, shown by the red line in FIGS. 98-100. In the stowed configuration, the yoke linkages are parallel to the column main hub fixture 70. During deployment of the yoke 80, the relative angle between the linkage and the hub fixture 70 changes. The band 82, which is fixed to a drum 84 on the link, is connected to the compression column end fitting, which has the same curvature as the link drum 84.

The SOAR design was applied to an array size estimated to generate 112 W at beginning of life (BOL) and stow within a 20 cm×20 cm footprint. This scale was selected due to the challenge of minimizing the components and the relatively high demand of CubeSat programs and their increasing power consumption demands.

A preliminary PV panel stack design assumed a 0.15 mm (0.006 in) thick cover glass and 0.25 mm (0.010 in) thick carbon fiber reinforced polymer (CFRP) substrate for a total panel thickness of 0.81 mm (0.032 in). Evaluation of the mass properties of the PV stack materials showed that and equivalent panel mass can be achieved using a constant thickness CFRP panel with the same thickness of 0.81 mm (0.032 in), which was commercially available. Therefore, the fabricated test article array has approximately the same mass and thickness of a functional PV stack.

A prototype array was fabricated. A continuous sheet of ⅟₃₂"-thick carbon fiber composite plate was machined to remove the bulk of the material at the hinge lines. Small amounts of material connecting adjacent panels remained to maintain panel alignment during the assembly process. The Kapton® film with a thickness of 0.05 mm (0.002 in) was then bonded to the back surface. At this point the PV cells would be populated onto the panels. The front and backside of the test article array is shown in FIGS. 32(*a*)(*b*). The support structure was then integrated by bonding the lateral spars, and assembling the compression column in-place. Finally, the interconnecting tabs were carefully removed using a rotary tool with abrasive cutoff wheel.

FIG. 103 shows a perspective view of the SOAR solar array prototype with wrapped, dual compression columns 28, 30 in the packaged (stowed) state.

FIG. 104 shows a perspective view of the SOAR solar array prototype with a dual compression column in the deployed (unfolded) state, held by structural yoke 80.

FIGS. 105-108 shows perspective views of the prototype SOAR solar array, showing sequential still images captured from video recording of compression column primary deployment, illustrating that the tape spring hinges successfully deployed the column. The compression boom secondary fold hinges were fabricated from fiberglass composite material. The hinges use the stored strain energy in the stowed state to drive the deployment and lock-out at full deployment. Packaging and testing of the boom was performed to demonstrate functionality. The compression column successfully deployed as designed.

Parametric Modeling and Scaling Study

A scaling study of the SOAR solar array was performed. Many of the important structural and system-level decisions for SOAR were made based on this research and explain the key parameters for designing volumetric-efficiency, rather than mass-efficiency.

The parametric model is based on the tension necessary to achieve the required natural frequency of the array, modeled as a simple tensioned cable [16], and the critical buckling load of a compression column 20 reacting to that tension.

The critical design parameters were identified as:
A solar array collection area must have a low aspect ratio. Increases in length incur significant volumetric and mass penalties at a cubic rate for equivalent collection areas.
A square array (N=2), or low-aspect ratio rectangular array (N=3), is always preferred; however, longer arrays may still be accommodated with penalties.
Volumetric efficiency, not mass-efficiency, is typically the primary driving design requirement for small satellites.

High-volumetric efficiency and power density (kW/m³), up to 2 kW, may be achieved with thick-walled tubes or solid-rod compression columns.

Surprisingly, thin-walled tubes have very poor volumetric-efficiency and power density at large scale, even though they are highly mass efficient. This includes thin-walled rollable booms.

High power arrays, greater than 3-4 kW, would benefit more by using proven commercial deployable truss structures, like an ATK coilable truss, due to significantly larger deployed lengths, non-trivial tension loads, and increased risk aversion from larger, critical asset missions.

The scaling study is based on a back-of-the-envelope (BOTE) analytical model to identify the critical design parameters of the SOAR solar array. The basis of the analytical model is a simplifying the fundamental frequency of a tensioned 2-D solar array to a tensioned 1-D cable [16] with the array mass equally distributed along it as a mass per unit length. LoadPath's prior experience and research with tensioned precision structures [17, 18, 19] has shown this to be an adequate BOTE estimate, where actual response frequency or stiffness is often slightly greater than the tensioned cable prediction.

The compression column 20 is modeled to a specified fraction of the Euler buckling load, reacting to the array tension. The specified fraction is defined a 2% of Euler buckling load, which is found to adequately account for eccentric loading, fabrication error, and preventing nonlinear thermal distortion magnifications that can shorten the compression column by bowing and affecting the array tension significantly [20]. Although not mentioned in the reference, this fraction also ensures both the first cantilever bending and torsional modes of the compression column have a greater than or equal natural frequency to the array frequency requirement. Cantilever bending was modeled with a tip mass equal to half the array mass, and the first torsional mode was modeled with the tip lateral spreader bar and half the array mass distributed along it, as a worst case. Additionally, a lateral spreader bar was modeled as a 1:3 cross-sectional ratio rectangular tube, sized for a tip displacement of 1% of the bar half length from the distributed tension load.

The solar array design is based on populating the array triangular panels in a grid of 8 cm square ZTJ 1-per solar cells. For smaller array sizes, an alternative 1.9 cm square solar cell currently on the market was used to populate the array panels. Both cell types have are roughly 30% efficient BOL at room temperature and similar mass per collection area.

The governing equation for SOAR scalability is shown in Eq. 1. It should be noted that a cantilevered beam scales identically to the SOAR tensioned structure model, as shown by Mikulas [21]. $f_0$ is defined as the required array natural frequency; E is the compression column elastic modulus; $\rho$ is the array areal density; w is the away width; L is the array length; d is the column width; and $\alpha$ is the wall thickness ratio of the column inner dimension divided by it's outer dimension.

This equation describes several different important aspects of scalability. Suppose $f_0$, E, and $\rho$ are defined by system requirements and overall array design, the remaining parameters governing the array mass and volume are the areal dimensions of the array and the width and wall thickness of the compression column. The scaling equation shows that the compression column width directly scales with array length, such that the ratio of $d^4/L^4$ remains constant for a given design. However, array width has a significantly lesser linear effect on overall mass and volume. For example, if only array width is increased, the ratio of $d^4/w$ must be constant, resulting in a much smaller change in compression column width dimensions than when increasing length. This suggests that a wider array, rather than longer, is more structurally efficient for an equivalent collection area. This further validates the structural efficiency conclusions for array design made by Banik [11].

However, the most significant result from the parametric study is the effect of the wall thickness ratio parameter $\alpha$ on the compression column sizing. FIG. 109 shows the related $(1-\alpha^4)$ scaling term against is parameter value, $\alpha$, where $\alpha$=zero indicates a solid rod, and a value close to one is a thin-walled tube.

$$f_0^2 \propto \left[\frac{E}{\rho}\right]\left[\frac{d^4}{L^4}\frac{(1-\alpha^4)}{w}\right] \qquad \text{Eq. (1)}$$

For a set array length and width, simply altering the thickness ratio term can have a great effect on the compression column sizing, particularly when the column wall thickness becomes a small fraction of the overall width. For example, if a thin-walled tube inner width and outer width has a 9:10 ratio, the scaling term is approximately 0.25 and the column width must be increased 41% to satisfy a constant $d^4(1-\alpha^4)$ term for an equivalent performing structure. Conversely, solid rods to thick-walled tubes with ratios up to about 6:10 have very little effect on the compression column width and keep it minimized.

This observation is particularly important because small satellites are volumetrically constrained, rather than mass constrained. This change in recent paradigm has altered the design tendencies for small satellite structures significantly. Rather than highly mass-efficient truss systems deployed quasi-statically with an active control system, small satellite structures are often small, dense, and deployed dynamically by strain energy. The decades of prior work to achieve increasingly mass-efficient structural designs are generally no longer valid. For example, a CubeSat is roughly a 10 cm cube per U with a 1.33 kg/U requirement. This is roughly equivalent to filling a CubeSat with 10 cm diameter spheres of solid aluminum. Hence, for CubeSats, packaging volume is a significantly more important design requirement than mass.

Designing for volumetric efficiency is a topic that is generally unexplored in the space structures community due to the recent innovation of small satellite missions. The SOAR scaling study delved into this topic and identified two important metrics for an efficient volumetric structural design:

A solar array collection area must have a low aspect ratio. Lengthwise deviations from a square array can quickly incur large volumetric penalties, because the supporting structure width scales directly with length to meet the same natural frequency requirement. In other words, the volume of a solar array support structure scales approximately cubically with array length.

The wall thickness ratio of the supporting beam or compression column 20 has a strong influence on volumetric efficiency when the wall thickness becomes significantly smaller than the column width or diameter. For example, a thin-walled tube with a wall thickness of 0.022" and diameter of 3" has the same structural performance as a thick-walled tube with 0.25" wall thickness and 1.5" diameter. However, the thick-walled tube occupies only 25% of the total volume of the thin-walled tube.

The obvious drawback for a volumetric-efficient design is the increased mass of the structural components, when compared to a mass-efficient design. At a certain point, the increase in structural mass may become problematic and begin to exceed host spacecraft mass requirements. However, this clear understanding of how the SOAR compression column scales provides a great tool to optimally balance both mass and volume based on the requirements of a particular mission or host spacecraft.

For small satellite missions with low mass constraints, the scaling study clearly shows that carbon-fiber solid rods or thick-walled tubes are the optimal choice, where as thin-walled tubes are less than ideal. For volume-constrained systems, a square cross-section tube profile is preferred over a circular tube cross-section. For larger satellites with power requirements up to 2 kW, a thick-walled tubular column becomes the preferred option because of the nice balance of both mass and volumetric efficiency. For even larger arrays beyond 3-4 kW, the package dimensions, array deployed lengths, tension loads, and risk requirements increase to non-trivial magnitudes to the point where venerable commercial deployable truss structures, like ATK's coilable truss, may become a better option over a rollable boom. However, rollable structures, like composite slit tubes or AFRL's TRAC booms, are designed specifically to stow into a unique form factor, provide good mass-efficiency, and potentially minimize deployment complexity by eliminating a number of mechanical joints in a folded tube column. Our extensive experience with designing, fabricating, and testing rollable tubes and tape springs provides a unique insight on the design idiosyncrasies of a rollable tube boom. The primary drawback for rollable tubes is the volume occupied by the roll when stowed. To reduce the rolled volume, the laminate must be made thinner so the roll may be forced into a smaller diameter with a large complex constraint mechanism to prevent the roll from billowing and jamming against its interior container walls.

Alternatively, if a bistable laminate design is used to avoid the need for a complex rolled constraint mechanism, the stable roll diameter of these laminates scale directly with deployed tube diameter. Unfortunately, SOAR scaling studies for rollable booms showed poor volumetric scaling, primarily due to the laminate being thin. This requires a larger deployed boom diameter for an equivalent structural stiffness, which then results in both a larger roll diameter and roll width.

FIGS. 110-112 show model results illustrating the packaged power density of various SOAR array designs with three different compression column types: (a) Solid Rod Column, (b) Tubular Column, and (c) Slit-Lock Column. It is easy to observe the most significant design parameter is the largest characteristic length $L_S$. Maximizing $L_S$ and selecting a low aspect ratio with N=2 array units provides the highest power densities for a given array BOL power. In addition, regardless of the column type selected, increasing aspect ratio and array length by increasing the number, N, of units incurs a significant power density penalty, varying from a few percent reduction to halving it per unit added.

FIGS. 110-112 also directly compare the volumetric efficiency of various column designs. The solid rod is modeled as a high-modulus carbon-fiber unidirectional rod. The tubular column is modeled with a 1 mm wall thickness and the same carbon-fiber material. The slit-lock rollable tube is modeled with a 0.23 mm thick bi-stable laminate composed of carbon-fiber unidirectional sandwiched between thin layers of astroquartz plain-weave. The laminate is a space-qualified, bi-stable laminate that LoadPath frequently fabricates and uses. It has stiffness properties close to aluminum of the same thickness.

As predicted by the parametric scaling study, the solid rod compression column leads to the most volumetrically-efficient array design. The slit-lock rollable boom performs poorly. This is especially clearly evident when the array becomes larger and longer. However, FIGS. 110-115 shows that the mass efficiency of the various column designs being the opposite. The solid rod column has a very poor mass-efficiency, while the slit-lock rollable boom has the highest mass-efficiency with the smallest mass fraction relative to the array mass. Interestingly, the thick-walled tubular column exhibits an optimal balance of both volumetric-efficiency and mass-efficiency, and scales well with larger solar array designs.

FIGS. 116-117 illustrate how a compression boom diameter scales with various array sizes, lengths, and power levels. With each increase in array length, the boom radius must also roughly scale equivalently. The sensitivity of each length increase is gauged primarily by the wall-thickness of each boom. The solid rod has the least sensitivity, while the rollable slit-lock boom has the most. Hence, boom diameter directly and negatively affects volumetric efficiency and power density of a SOAR solar array system. Even though rollable booms may be rolled into a small package, they can require large canisters and cannot be forced into a small roll radius without being made even thinner, which, in turn, makes the boom larger in diameter, flattens as a wider roll, and becomes more sensitive to scaling.

The ability of the SOAR array to accept and use alternative types of deployable booms is one of its most important attributes. Each mission, host spacecraft, and installation volume is different and can widely vary. Although high-strain composite rollable boom are not volumetrically efficient, they still may be a feasible choice due to the ability to extend linearly with a simple motorized scheme, but it requires a rollable tube with a locking feature to close the cross-section to prevent low torsional vibration modes. An alternative boom design with two open cross-section rollable booms, used in a picture frame fashion, was also considered, but was deemed too complex to implement, is not mass and volumetrically efficient, and is susceptible to thermal distortions.

Based on the results of this analytical feasibility study, it was clear that different boom designs will be required to maintain a high power density across all anticipated SOAR power levels. For small satellites with power levels less than 500 W per array, a solid compression rod would provide the highest power density with negligible mass-penalties. For larger satellites with power requirements up to 2 kW, a thick-walled tubular column becomes the preferred option because of the nice balance of both mass and volumetric efficiency. For even larger arrays beyond 3-4 kW, the package dimensions, array deployed lengths, tension loads, and risk requirements increase to non-trivial magnitudes to the point where venerable commercial deployable truss structures, like ATK's coilable truss, may become a better option over a rollable boom.

A detailed finite element model, shown in FIG. 119, was constructed to verify the design model elements. The deflected (magnified) first vibration mode of the finite element model is shown in FIG. 120. This analysis step is performed for the structure using the stress field solved in the previous tensioning step. The applied effective temperature needed to tension the array was adjusted to yield a first vibration mode to 0.7 Hz, which is above the 0.5 Hz requirement. This translated to a 0.3 N compressive load in the center column members. Static loads analyses were then performed by applying a 0.1 g gravitational load, which was double the 0.05 g requirement. The deformed shape of the array when the gravitational load was applied normal to the array is shown in FIG. 121. The tip displacement was 9.4 mm. The loading applied in-plane, orthogonal to the column length resulted in a tip displacement of only 1.3 mm. For both cases the maximum stress is an order of magnitude less than the material yield stresses.

A scaled finite element model of the array was created to correlate the predicted tension load to yield a first vibration mode of at least 0.5 Hz with the design model. The model was also used for a preliminary investigation on having in-plane compliant hinges versus the continuous Kapton polyimide film used in the $L_S$=18.5 cm model. The hinge geometry is based on the Triangular Rollable and Collapsible (TRAC) boom technology developed at the Air Force Research Laboratory. FIG. 122 shows the finite element model, with compliant Z-folding hinges modeled. The booms were originally designed to function similarly to a typical STEM boom. SOAR can utilize the collapsible feature of this component to achieve the perfect packaging of the origami fold pattern. The predicted strains are too high for basic flexure-type hinges due to the small panel thickness. Another perceived benefit is the in-plane compliance from the material elasticity may be sufficient to eliminate needing a compliant interface between the lateral spar members and the array as discussed previously.

A concern remains, however, that the compliant Z-folding hinge design may not provide sufficient in-plane compliance to effectively decouple the array tension from thermal and structural deformations. Multiple analysis runs were performed where the tip boundary condition was displaced a defined amount to tension the array. A frequency analysis was then performed to determine the first vibration mode. The frequency as a function of array tip displacement is presented in Table 2. These results indicated that a tip displacement of 0.75 mm results in a change in the compression column loading by a factor of 5. The compression column would have to be designed to withstand this load increase and be dimensionally stable within this range. Further analysis is needed to determine what in-plane compliance is required to enable such a compliant Z-folding hinge design.

TABLE 2

The fundamental frequency and reaction loads were calculated for various axial tip displacements for the Ls = 35 cm model.

| Applied Tip Displacement (m) | Reaction Force (N) | Fundamental Frequency (Hz) |
| --- | --- | --- |
| 100 | 0.84 | 0.29 |
| 250 | 2.33 | 0.47 |
| 350 | 3.46 | 0.57 |
| 500 | 5.33 | 0.70 |
| 1000 | 12.4 | 1.06 |

A horizontal (orthogonal to the gravity vector) deployment configuration was selected to minimize the effects of gravity on the deployment kinematics of the prototype test membrane array. This configuration required the mass of the structure to be negated using a gravity offload or compensation system. The limited scope and timeframe of this effort did not support the design and fabrication of a specialized system to minimize the parasitic loading on the structure. The chosen solution subject to these bounds utilized fixed cable system with in-line extension springs. The cables were mounted to the ceiling of the laboratory, approximately 75 inches above the test article. The test article was positioned as low as possible to maximize the separation distance. The array in the horizontal deployed state attached to the gravity-offload system with vertical offload lines in place is shown in FIG. 123, where the mass of each panel is negated using soft vertical extension springs to reduce the induced loads for the full range of travel.

The offload line mounting points were located at the mid-travel point between the initial and final locations. This minimizes the parasitic lateral loads for the full range of travel of the array panels. A free-deployment test was performed by manually restraining the array in the stowed state and then releasing. Captures frames from the deployment video are shown in FIG. 33. Three deployment tests were performed with similar results. The array fully deployed as shown in the figure; however, the flexure latches located at the mid hinge in the compression columns failed to engage and lock-out. The compression columns rebounded and would not return to the deployed state using the deployment torque from the torsion springs integrated at all relevant hinge locations. The array was then manually deployed by actuating the compression columns to full deployment, in a locked-out state.

The available torque was insufficient to overcome the lateral resistive loading of the gravity-offload system. Relocating the offload mounting points such that the lines are vertical at full deployed would eliminates this lateral load. However, when stowing the array the forces from the offload cables due to the relatively large amount of spring extension would be excessive and could cause damage to the structure.

The testing successfully demonstrated that the SOAR architecture functions as designed. The compact packaging was achieved and the multiple deployment trials showed repeatable array kinematics that did not present potential failure modes. With minor improvements to the structure design and offload system, future testing will confirm that the SOAR architecture is highly reliable and repeatable. The completed analysis and test tasks confirm the selected folding central compression column is the preferred architecture to deliver a high performance solar array system.

FIG. 124 shows a plan view of an example of a hinge block 90 in a collapsed (folded) position, according to the present invention. Hinge block 90 comprises a left block 92 and right block 94, joined by a hinge pin (clevis pin) 91. Joined to left block 98 is composite tape segment 96, and joined to right block 98' is composite tape segment 96'. Hinge block 98 may comprise an optional lockout mechanism (not illustrated), to maximize rigidity of the array when fully-deployed. Optionally, hinge block 90 may contain a spring (e.g., a torsion spring, or other type, not shown) to increase the deployment force (torque).

FIG. 125 shows a plan view of an example of a hinge block 90 in an extended (deployed) position, according to the present invention. Right block 98' has been rotated 90° relative to left block 98.

FIG. 126 shows an end view of an example of a hinge block 90, according to the present invention. Composite tape segments 96 and 96' are joined to V-shaped block 98 with a pair of hex-headed bolts 103 and washers 104.

FIG. 127 shows a cross-section view of an example of a hinge block, according to the present invention. Composite tape segments 96 and 96' are joined to V-shaped block 98 with a pair of hex-headed bolts 103 and washers 104.

FIG. 128 shows an end view of an example of folded stack of panels (not shown), showing five hinge blocks 98 (No. 1-5) and connecting composite tapes 96 and 96', according to the present invention. When in the folded configuration, as illustrated, even-numbered hinge blocks 98 are located ½ of the height above the location of the odd-numbered hinge blocks 98, in a staggered arrangement.

FIG. 129 shows an end view of an example of a hinge block 90 in a deployed array comprising a pair of panels 106 and 106', according to the present invention. As illustrated, the top most part of hinge block 90 pokes through the frontside of array 10, in-between adjacent panels 106 and 106'. A hole needs to be disposed in the frontside of the array 10 to accommodate this configuration.

FIG. 130 shows a plan view of an example of a deployed array 10 with supporting lattice structure, according to the present invention. The supporting lattice structure comprises a lattice configuration of composite tape segments 96, 96', joined by hinge blocks 90, 90' and end blocks 98 and 98'.

FIG. 131 shows a plan view of an example of a folded stack of panels 8, 8', surrounded by a structural ring 97 comprising four hinge blocks 90, 90', etc. joined to four segments of composite tape 96, 96', etc., according to the present invention. Composite tapes 96, 96' are joined at their mid-spans (or, at multiple places) to panels 8, 8' by bonding or by a mechanical fastener (not shown). Hinge blocks 90, 90', etc. are not directly attached to panels 8, 8'.

FIG. 132 shows a perspective view of an example of an deployed array 10 with supporting lattice structure 90, 96, 96', according to the present invention. Composite tape segments 96, 96', etc. are disposed perpendicular to the plane of array 10, to maximize the bending stiffness of the segments.

FIG. 133 shows a perspective view of an example of a folded stack of panels, 8, 8', and an example of one of the four corner hinge blocks 90, according to the present invention. Composite tapes 96, 96' are not illustrated.

FIG. 134 shows a plan view of an example of an deployed array 10 with four electrical wire harnesses (ribbons) 110, 112, 114, and 116, according to the present invention. Wire harnesses (ribbons) 110, 112, 114, and 116 Zig-Zag along the diagonals of array 10, and form a tail of bundled harnesses at the yoke 50. This Zig-Zag configuration follows only along the diagonal fold lines of array 10, which places the electrical harnesses on the outer periphery of the stack of folded panels when the array is stowed and packaged. Each panel in the array has at least one diagonal fold, which means every panel also has an edge on the outer perimeter of the stowed array stack. This harnessing approach touches at least one edge of every panel element throughout the array and provides a direct connection to the harness for every panel without requiring any power routed directly between them with any special folding ribbon connection. The S-shape of the ribbon is the result of the ribbon needing to fold and deploy, while keeping strain low. The S-shape can be either in the stowed or deployed state (or in-between), because one has to select where the zero strain state is. Notably, none of the electrical wire harnesses 110, 112, 114, and 116 cross-over each other, which is a preferred configuration. Also, no electrical connector is needed that tightly folds 180° with the array panels, in this configuration.

FIG. 135 shows an end view of an example of an folded stack of panels and an electrical wire harness 110, according to the present invention. In the folded configuration, wire harness 110 Zig-Zags down the side of the stack of panels 7, 7', etc.

FIG. 136 shows a perspective view of an example of an deployed array 10 with electrical wire harnessing 110, according to the present invention. Wire harnesses (ribbons) 110 and 112 are attached at their mid-spans or ends to the backside of array 10 using mechanical bonding or strips of adhesive tape 118, 118'.

FIG. 137 shows a plan view of a first example of a backside support structure, according to the present invention. The support structure comprises a generally cross-shaped, cruciform structure 127 with four arms disposed at 90°. The support structure comprises a collapsible cruciform tape spring 121 disposed at the center of the structure 127. Collapsible cruciform tape spring 121 comprises a pair of composite tape springs 122 and 124 pinned in their centers with hinge pin 128. Each end of the tape spring 122, 124 is attached to a clip 125, 125' respectively, which, in turn, is attached to a rod (or beam) element 126, 126', which is attached to compliant Z-folding hinges 120 and 120'. Compliant Z-folding hinges 120, 120' are attached to the backside 132 of the underlying panels with 130, 130', for example, adhesive tape (not shown).

FIG. 138 shows an end view of a first example of a backside support structure 127, according to the present invention. The support structure comprises a collapsible cruciform tape spring 121 disposed at the center of the structure 127. Collapsible cruciform tape spring 121 comprises a pair of composite tape springs 122 and 124 pinned in their centers with hinge pin 128. Each end of the tape spring 122, 124 is attached to a clip 125, 125' respectively, which, in turn, is attached to a rod element 126, 126', which is attached to compliant Z-folding hinges 120 and 120'.

FIG. 139 shows a cross-section end view of a first example of a compliant Z-folding hinge 120, according to the present invention. Support rod (or beam) 126 is disposed at the interior apex of compliant Z-folding hinge 120, and compliant Z-folding hinges 120 is attached to the backside 132 of underlying panels 130, 130' by bonding or by mechanical fastener.

FIG. 140 shows a perspective view of a first example of a deployed array 10 with a backside support structure 127, according to the present invention. The support structure comprises a collapsible cruciform tape spring 121 disposed at the center of the structure 127. Collapsible cruciform tape spring 121 comprises a pair of composite tape springs 122 and 124 pinned in their centers with hinge pin 128. Each end of the tape spring 122, 124 is attached to a clip 125, 125' respectively, which, in turn, is attached to a rod element 126, 126', which is attached to compliant Z-folding hinges 120 and 120'. Note: the electrical harnesses (not shown) can be routed along the spines of the compliant Z-folding hinges and be integrated or embedded into the compliant Z-folding hinge to make the connection to the panels.

FIG. 141 shows a plan view of a second example of a deployed array with a backside support structure 129, according to the present invention. Support structure 129 comprises a pair of V-shaped blocks 98, 98' disposed in the center of the structure 129, which each have a pair of composite tape segments 96, 96' attached to the block 98. Segments 96, 96' are attached to compliant Z-folding hinges 120, 120', respectively, which are attached to the underlying panels (not shown).

FIG. 142 shows an end view of a second example of a backside support structure 129, according to the present invention. Support structure 129 comprises a pair of V-shaped blocks 98, 98' disposed in the center of the structure 129, which each have a pair of composite tape segments 96, 96' attached to the block 98, 98'. Segments 96, 96' are attached to compliant Z-folding hinges 120, 120', respectively, which are attached to the underlying panels 130, 130'.

FIG. 143 shows a cross-section view of a second example, of a compliant Z-folding hinge 120 with composite tape 96 inside the hinge 120, according to the present invention. Composite tape 96 is disposed perpendicular to the plane of the underlying panels 130, 130'.

FIG. 144 shows a perspective view of a second example of a deployed array 10 with a backside support structure 129, according to the present invention. Support structure 129 comprises a pair of V-shaped blocks 98, 98' disposed in the center of the structure 129, which each have a pair of composite tape segments 96, 96' attached to the block 98, 98'. Segments 96, 96' are attached to compliant Z-folding hinges 120, 120', respectively, which are attached to the underlying panels 130, 130'.

FIG. 145 shows a perspective view of a continuous compliant Z-folding hinge 138 being deployed from a takeup spool 144. Compliant Z-folding hinge 138 comprises a vertical spine 140 on the upper side, and on the lower side is made of two open, outwardly curved sidewalls 142 that are splayed outwards in an upside-down "Y" shape.

Modular Extendable Terrestrial Array (META)

FIG. 146 shows an elevation view of an example of a curved SOAR array deployed on the ground with supporting legs, according to the present invention. This design is called a Modular Extendable Terrestrial Array (META), and is designed for use on the ground on the planet Mars, or on the Earth. The META system can deploy and retract using motorized actuation of the support wheels 158 and/or pantograph assemblies (not shown). Array retraction is a design feature and may be performed autonomously by actuating the pantograph deployment mechanisms in reverse. Hence, the deployment of META array 150 is reversible. As shown in FIG. 146, rather than unfolding into a completely flat rectangular surface when fully deployed (as in the SOAR array), the META array 150 intentionally has a slight cylindrical curvature (Radius=R) along its length, constrained by hard stops to prevent over-rotation of the panels. This ensures that the folding pattern kinematics for retractibility are maintained. This allows for META to quickly retract and stow in anticipation of a severe dust storm or prepare to be moved to an alternate location. The cylindrical shape of array 150 has an added structural benefit of increased stiffness compared to a planar surface (152). The overall array tilt angle, θ, can be simply adjusted to optimize the power generation capability for various location latitudes by modifying the relative length of the support base frame members 153, 154, 158, 158, and 160. The supporting base frame may be anchored to the ground for a permanent installation and to help survive strong winds. Note: the triangular panels of the META array are the same shape and size over the entire META array, which reduces cost since the layout and electrical harnessing is the same throughout the structure. High efficiency, triple junction solar cells (e.g., $GaInP_2/GaAs/Ga$) can be used, in particular, for the Mars mission.

Because the SOAR folding pattern exhibits 3 degrees of freedom (DOF) at each triangle vertex, the array has great natural flexibility and can easily accommodate uneven terrain by slightly bending, twisting or offsetting. These contortions are absorbed by slight changes in angles along the fold lines and hinges, rather than straining/bending the individual semi-rigid panel elements (which may contain fragile solar cells). This is shown in FIG. 147-149, which illustrates the great degree of flexibility of a SOAR array. FIG. 147 shows a partially-deployed SOAR array in an "ideal" configuration; FIG. 148 shows a partially-deployed SOAR array that has been twisted about it's long axis (representing uneven terrain); and FIG. 149 shows a partially-deployed SOAR array that has been displaced by a vertical offset (representing uneven terrain). The great degree of natural flexibility of the SOAR architecture can be seen, where uneven terrain is taken up by changes in the angles along the fold lines and hinges, rather than through strains in the semi-rigid triangular panel elements. This greatly reduces potential material stresses on the panel elements during deployment and correctly places the forces on the pantograph deployment actuators instead. This provides the ability for the deployment mechanisms to directly control and accommodate for these contortions by slightly altering the lengths of the pantograph arms relative to each other.

FIG. 150 shows an elevation view of an example of a curved META array deployed on the ground with supporting legs and N=5 units, according to the present invention. Pantograph actuators 161, 161', etc. (which can comprise linear actuators, such as motorized linear lead-screws) or STEM booms are stretched out and form compression columns that provide tension forces to expand the META array outwards when deployed. The main base support frame comprises tripod support legs 163.

Dust contamination on a Martian surface is a critical condition, as dust can degrade solar array performance significantly in a short period of time. The META system is expected to employ both passive dust mitigation strategies (such as operating the array at 45 degree tilt angle), and active techniques, such as electrostatic dust removal methods, to ensure solar cells operate at their peak efficiency throughout their lifetime. The active method uses a series of embedded electrodes in a high dielectric strength, transparent substrate, actuated by a low power, low frequency signal that creates an electric field wave that travels across the surface and removes from 96-99% of accumulated dust.

FIG. 151 shows an elevation view of an example of a pair of curved META arrays deployed back-to-back on the ground with supporting legs, according to the present invention. This back-to-back, dual-tilt configuration is efficient for managing wind loads on the array, and provides a more uniform power level throughout a day.

FIG. 152 shows a perspective view of an example of a pair of curved META arrays deployed back-to-back on the ground with tripod supporting legs and wheels, according to the present invention.

FIGS. 153-155 show a perspective view of a sequence showing a stowed/folded META array with the legs 176, 178; wheels 180; and pantograph actuators 175, 175' being unfolded during deployment, according to the present invention.

FIG. 156 shows a perspective view of a multiple rows of META arrays deployed back-to-back on the ground, according to the present invention.

FIG. 157 shows a perspective view of a multiple rows of META arrays deployed in a radial star pattern on the ground, according to the present invention.

FIGS. 158-159 show a perspective view of a triangular panel element 186 with a pair of truss supports 188, 188' deployed on the backside of the panel, which fold flat when the array is folded and stowed, according to the present invention.

Note that a lattice structural support system can be used in place of pantograph compression/tension columns, as described earlier with respect to the SOAR array. Also, there may be 3 sets of tripod base frames for stiffness and deployment control. The third would be at the bottom corner of the tripod base, near where the central tripod leg attaches.

LIST OF REFERENCES

Note: all References listed herein are hereby incorporated by reference in their entirety.

[1] Reynolds, W., Jeon, S., Banik, J. Murphey, T., "Advanced Folding Approaches for Deployable Spacecraft Payloads.", Proceedings of the ASME 2013 International Design Engineering Technical Conferences and Computers and Information in Engineering Conference, Portland, Oreg., DETC2013-13378, Aug. 4-7, 2013.

[2] Reynolds, W., Murphey, T., Footdale, J., Murphey, T., "Elastic Spiral Folding for Flat Membrane Apertures", $1^{st}$ AIAA Spacecraft Structures Conference, National Harbor, Md., AIAA 2014-1037, Jan. 13-17, 2014.

[3] Banik, J., Murphey, T., "Synchronous Deployed Solar Sail Subsystem Design Concept", $48^{th}$ AIAA Structures, Structural Dynamics and Materials Conference, Honolulu, Hi., AIAA-2007-1837, Apr. 23-26, 2007.

[4] Footdale, J., "Deployable Structures with Quadrilateral Reticulations", $50^{th}$ AIAA/ASMA/ASCE/AHS/ASC Structures, Structural Dynamics and Materials Conference, Palm Springs, Calif., AIAA-2009-2606, May 4-7, 2009.

[5] Murphey, T., Banik, J., Reynolds, W., Stiles, L., "Deployable Shell with Wrapped Gores", U.S. Pat. No. 8,462,078.

[6] Sakamoto, H., et al., "Repeatability of Stored Configuration of a Large Solar Sail with Non-Negligible Thickness", $54^{th}$ AIAA/ASMA/ASCE/AHS/ASC Structures, Structural Dynamics and Materials Conference, Boston, Mass., Apr. 8-11, 2013.

[7] Greschik, G., "Error Control Via Tension for an Array of Flexible Square Antenna Panels", $51^{st}$ AIAA Structures, Structural Dynamics and Materials Conference, Orlando, Fla., Apr. 12, 15, 2010.

[8] Jeon, S., Murphey, T. W., and Ardelean, E., "Structural Determinacy and Design Implications for Tensioned Precision Deployable Structures", $54^{th}$ AIAA/ASMA/ASCE/AHS/ASC Structures, Structural Dynamics and Materials Conference, Boston, Mass., Apr. 8-11, 2013.

[9] Jeon, S. and Murphey, T. W., "Fundamental Design of Tensioned Precision Deployable Space Structures Applied to an X-Band Phase Array", $48^{th}$ AIAA Structures, Structural Dynamics and Materials Conference, Honolulu, Hi., AIAA-2007-1837, Apr. 23-26, 2012.

[10] Kling, D., Jeon, S. K., Banik, J. A., "Novel Folding Methods for Deterministic Deployment of Common Space Structures", $3^{rd}$ AIAA Spacecraft Structures Conference, Jan. 2-4, 2016.

[11] Banik, J. A. and Carpenter, B. F., "Analytical Representation of Space Solar Array Scaling Performance," Photovoltaic Specialist Conference (PVSC), $42^{nd}$ IEEE, New Orleans, La., June 2015.

[12] Lake, M. S., Francis, W. H., Craven, K. and Murphey, T. W., "Robust, Highly Scalable Solar Array System," Proceedings of the $3^{rd}$ AIAA Spacecraft Structures Conference, San Diego, Calif., January 2016.

[13] Mikulas, M. M., Pappa, R., Warren, J., and Rose, G., "Telescoping Solar Array Concept for Achieving High Packaging Efficiency", AIAA Scitech Conference, 5-9, Jan. 2015, Kissimee Fla.

[14] Jones, T. C., Watson, J. J., Mikulas, M. M., and Bart-Smith, H., "Design and Analysis of Tension-Aligned Large Aperture Spacecraft," $49^{th}$ AIAA/ASME/ASCE/AHS/ASC Structures, Structural Dynamics, and Materials Conference, Schaumburg, Ill., April 2008.

[15] Murphey, T. W., Banik, J., "Triangular Rollable and Collapsible Boom", U.S. Pat. No. 7,895,795, March, 2011.

[16] Blevins, R. D., "Formulas for Natural Frequency and Mode Shape," Krieger Publishing Company, Malabar, Fla., 2001.

[17] Footdale, J., Jeon, S., Murphey, T., "Static Shape and Modal Testing of a Deployable Tensioned Phased Array Antenna," $53^{rd}$ AIAA/ASME/ASCE/AHS/ASC Structures, Structural Dynamics, and Materials Conference, Honolulu, Hi., April 2012.

[18] Jeon, S. and Murphey, T., "Fundamental Design of Tensioned Precision Deployable Space Structures Applied to an X-Band Phased Array," $53^{rd}$ AIAA/ASME/ASCE/AHS/ASC Structures, Structural Dynamics, and Materials Conference, Honolulu, Hi., April 2012.

[19] Jeon, S., Murphey, T. W., and Ardelean, E., "Structural determinacy and design implications for tensioned precision deployable structures," $54^{th}$ AIAA/ASME/ASCE/AHS/ASC Structures, Structural Dynamics, and Materials Conference, Boston, Mass., 8-11 Apr. 2013

[20] Lake, M. S., Francis, W. H., Craven, K. and Murphey, T. W., "Robust, Highly Scalable Solar Array System," Proceedings of the $3^{rd}$ AIAA Spacecraft Structures Conference, San Diego, Calif., January 2016.

[21] Mikulas, M. M., Murphey, T., and Jones, T. C., "Tension Aligned Deployable Structures for Large 1-D and 2-D Array Applications," $49^{th}$ AIAA/ASME/ASCE/AHS/ASC Structures, Structural Dynamics, and Materials Conference, Schaumburg, Ill., April 2008.

[22] Jorgensen, J. R., Louis, E. L., Hinkle, J. D., Silver, M. J., Zuckermandel, B., Enger, S, "Dynamics of an Elastically Deployable Solar Array: Ground Test Model Validation", AIAA Conference 1942, January 2005.

What is claimed is:

1. A structural origami array, comprising:
a plurality of semi-rigid triangular panel elements disposed on a thin, flexible substrate in a structural origami pattern; wherein each panel element has a thickness=t; and
a compression column attached to proximal and distal ends of the array that is capable of spreading out the array into a substantially flat, tensioned membrane when deployed;
wherein the compression column comprises one or more hinges; and
wherein each hinge comprises a self-locking, high-strain composite tape hinge.

2. A structural origami array, comprising:
a plurality of semi-rigid triangular panel elements disposed on a thin, flexible substrate in a structural origami pattern; wherein each panel element has a thickness=t;
a first compression column attached to proximal and distal ends of the array that is capable of spreading out the array into a substantially flat, tensioned membrane when deployed; and further comprising a second compression column, disposed parallel to the first column, and attached to distal and proximal ends of the array;
wherein each compression column comprises one or more hinges; and
wherein each hinge comprises a self-locking, high-strain composite tape hinge.

3. The structural origami array of claim 2, wherein the substrate is continuously disposed on a bottom surface of the panel elements, and wherein adjacent panel elements are spaced apart from each other with a gap distance that is greater than or equal to twice the panel's thickness, t.

4. The structural origami array of claim 2, wherein the first and second compression columns form a picture frame structure surrounding an outer perimeter of the array when the array is deployed.

5. The structural origami array of claim 2, wherein each panel element comprises one or more photovoltaic cells.

6. The structural origami array of claim 2, wherein each panel element comprises one or more antenna elements.

7. The structural origami array of claim 2, wherein the flexible membrane substrate comprises a polyamide material.

8. The structural origami array of claim 2, wherein the array is stowed by collapsing and folding the array into a compact, square package; and wherein the compression columns are bent at their hinges and wrapped around an outer perimeter of the square package when the system is folded in a stowed configuration.

9. The structural origami array of claim 2, further comprising a pair of lateral spar stringers attached to leading edges of corner panels of the array at proximal and distal ends of the array, respectively.

10. The structural origami array of claim 9, wherein each end of each compression column is attached to a 5-axis main hub that is attached to the proximal and distal ends of the array, respectively.

11. The structural origami array of claim 10, wherein each 5-axis main hub comprises a spar hub that is hingedly pinned to a column hub with a clevis hinge pin.

12. The structural origami array of claim 11, wherein the spar hub is configured to rotate 90 degrees relative to the column hub when the array is completely unfolded or folded.

13. The structural origami array of claim 10, wherein the 5-axis main hub comprises:
first and second set of hinge pins embedded in a spar hub that constrain a pair of lateral spar stringers to rotate about axes of the first and second set of pins, respectively; wherein first and second pin axes are oriented at 90 degrees relative to each other;
third and fourth set of hinge pins embedded in a column hub that constrain a pair of compression columns to rotate about axes of the third and fourth set of pins, respectively; wherein third and fourth pin axes are oriented parallel relative to each other; and
a fifth hinge pin that constrains the spar hub to rotate about an axis of the fifth pin relative to the column hub;
wherein the first, second, third, fourth, and fifth hinge pins rotate during folding or unfolding of the array.

14. The structural origami array of claim 13, further comprising a torsion spring coupled with each of the first, second, third, and fourth hinge pins.

15. The structural origami array of claim 2, wherein each compression column comprises a thick-walled column.

16. The structural origami array of claim 2, further comprising a tripod base support frame with adjustable-length legs for supporting the array on uneven ground.

17. The structural origami array of claim 16, further comprising three sets of tripod base support frames with adjustable-length legs for supporting the array on uneven ground.

18. The structural origami array of claim 2, wherein the array is retractable, and can be retracted after having been partially deployed into a cylindrical shape with a radius=R.

19. The structural origami array of claim 2, wherein each panel element has a pair of foldable truss elements deployed on a backside of the panel element.

20. The structural origami array of claim 2, further comprising one or more electrical wiring harnesses disposed along diagonals disposed in-between adjacent panel elements.

21. The structural origami array of claim 20, wherein each electrical wiring harness comprises an electrically conductive ribbon that is oriented substantially perpendicular to a plane of the array.

22. The structural origami array of claim 21, wherein each ribbon has a Zigzag or S-shape when not tensioned.

23. The structural origami array of claim 2, wherein every corner of each triangular panel element is chamfered.

24. The structural origami array of claim 2, further comprising a rigid structural yoke attached to a proximal end of the array.

25. The structural origami array of claim 2, wherein strain energy stored in bent, high-strain, composite hinges of a folded and stowed array of panel elements is sufficiently large so as to make the array self-deploying when the stowed array is released and deployed.

26. The structural origami array of claim 2, wherein the one or more self-locking, high-strain composite hinges are selected from the group consisting of: a tubular integrated folding hinge, a dual-concave composite tape hinge, an integrated composite Triangular & Rollable Collapsible (TRAC) boom, a dual-convex tape hinge, or a combination of single-convex and single-concave tape hinges.

27. The structural origami array of claim 2, wherein each triangular panel element is a right triangular panel element.

28. The structural origami array of claim 27, wherein a repeating rectangular unit of the origami pattern comprises six full-sized triangular panel elements and four half-sized triangular panel elements, with two of the half-sized elements being disposed at a proximal end of the repeating unit, and another two of the half-sized elements being disposed at a distal end of the repeating unit.

29. The structural origami array of claim 2, wherein each high-strain composite tape hinge further comprises a viscoelastic polymeric insert disposed in a middle of the hinge.

30. A structural origami array, comprising:
a plurality of semi-rigid triangular panel elements disposed on a thin, flexible substrate in a structural origami pattern; wherein each panel element has a thickness=t; and
a compression column attached to proximal and distal ends of the array that is capable of spreading out the foldable array into a substantially flat, tensioned membrane when deployed;
wherein the substrate is continuously disposed on a bottom surface of the panel elements, and wherein adjacent solar panels are spaced apart from each other with a gap distance that is greater than or equal to twice the panel's thickness, t;

further comprising a pair of parallel compression columns attached to distal and proximal ends of the array;

wherein each panel element comprises one or more photovoltaic cells;

wherein each compression column is hinged with one or more self-locking, high-strain composite tape hinges;

wherein the array is stowed by folding the array into a compact, square package;

and the compression columns are bent at their hinges and wrapped around an outer perimeter of the square package when folded in a stowed configuration;

further comprising a pair of lateral spar stringers attached to leading edges of corner panels of the array at proximal and distal ends of the array, respectively; and wherein each end of each compression column is attached to a 5-axis main hub that is attached to the proximal and distal ends of the array; and wherein strain energy stored in bent, self-locking, high-strain, composite hinges of a folded and stowed stack of panels is sufficiently large so as to make the array self-deploying when the array is released and deployed.

* * * * *